United States Patent [19]

Ichikawa et al.

[11] Patent Number: 5,293,179
[45] Date of Patent: Mar. 8, 1994

[54] WORK CONVEY METHOD AND APPARATUS

[75] Inventors: Fumio Ichikawa, Kamakura; Kunio Ohtaki, Ryuugasaki; Eiichi Kato, Tsukuba; Tsuyoshi Orikawa, Kasukabe, all of Japan

[73] Assignee: Canon Kabushiki Kaisha, Tokyo, Japan

[21] Appl. No.: 793,092

[22] Filed: Nov. 15, 1991

[30] Foreign Application Priority Data

Nov. 20, 1990 [JP] Japan ............................ 2-312771
Nov. 20, 1990 [JP] Japan ............................ 2-312772
Nov. 20, 1990 [JP] Japan ............................ 2-312773

[51] Int. Cl.⁵ ............................................ G01D 15/16
[52] U.S. Cl. ............................ 346/140 R; 414/786; 414/773; 414/416; 414/404; 414/751; 414/225; 414/737; 414/783
[58] Field of Search ............... 414/222, 225, 226, 416, 414/417, 403, 404, 754, 758, 761, 762, 763, 764, 765, 766, 773, 783, 737, 751, 752, 753, 626, 627, 786; 53/249, 235; 346/140 R

[56] References Cited

U.S. PATENT DOCUMENTS

| | | | |
|---|---|---|---|
| 3,300,064 | 1/1967 | Baer | 414/773 |
| 3,448,865 | 6/1969 | Schroder | 414/751 X |
| 3,503,527 | 3/1970 | Devol | 414/758 X |
| 3,749,256 | 7/1973 | Hill et al. | 414/773 |
| 3,929,234 | 12/1975 | Warren | 414/416 X |
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 5,007,788 | 4/1991 | Asano et al. | 414/404 X |

FOREIGN PATENT DOCUMENTS

| | | | |
|---|---|---|---|
| 0037064 | 10/1981 | European Pat. Off. | 414/773 |
| 59-123670 | 7/1984 | Japan . | |
| 59-138461 | 8/1984 | Japan . | |
| 140957 | 6/1987 | Japan | 414/758 |
| 2-15615 | 8/1990 | Japan | 414/331 |
| 1019806 | 2/1966 | United Kingdom | 414/416 |

Primary Examiner—Frank E. Werner
Attorney, Agent, or Firm—Fitzpatrick, Cella, Harper & Scinto

[57] ABSTRACT

In a work convey apparatus according to the present invention, a plurality of workpieces are conveyed from a tray for storing a large number of non-processed workpieces, which are aligned at a first pitch with surface to be processed facing down, to a process machine. The apparatus is provided with a first convey robot for picking up the plurality of workpieces from the tray while the positions of the workpieces are left unchanged, and conveying the workpieces, a work reverse unit including a reverse arm, arranged in a convey range of the first convey robot, for reversing the positions of the workpieces so that the surfaces to be processed of the workpieces face up to be inclined at a predetermined angle, a pitch conversion unit, arranged within an access range of the reverse arm, for converting a pitch between the received workpieces into a second pitch, and a second convey robot, arranged between the pitch conversion unit and the process machine, for conveying the workpieces between the pitch conversion unit and said process machine.

17 Claims, 27 Drawing Sheets

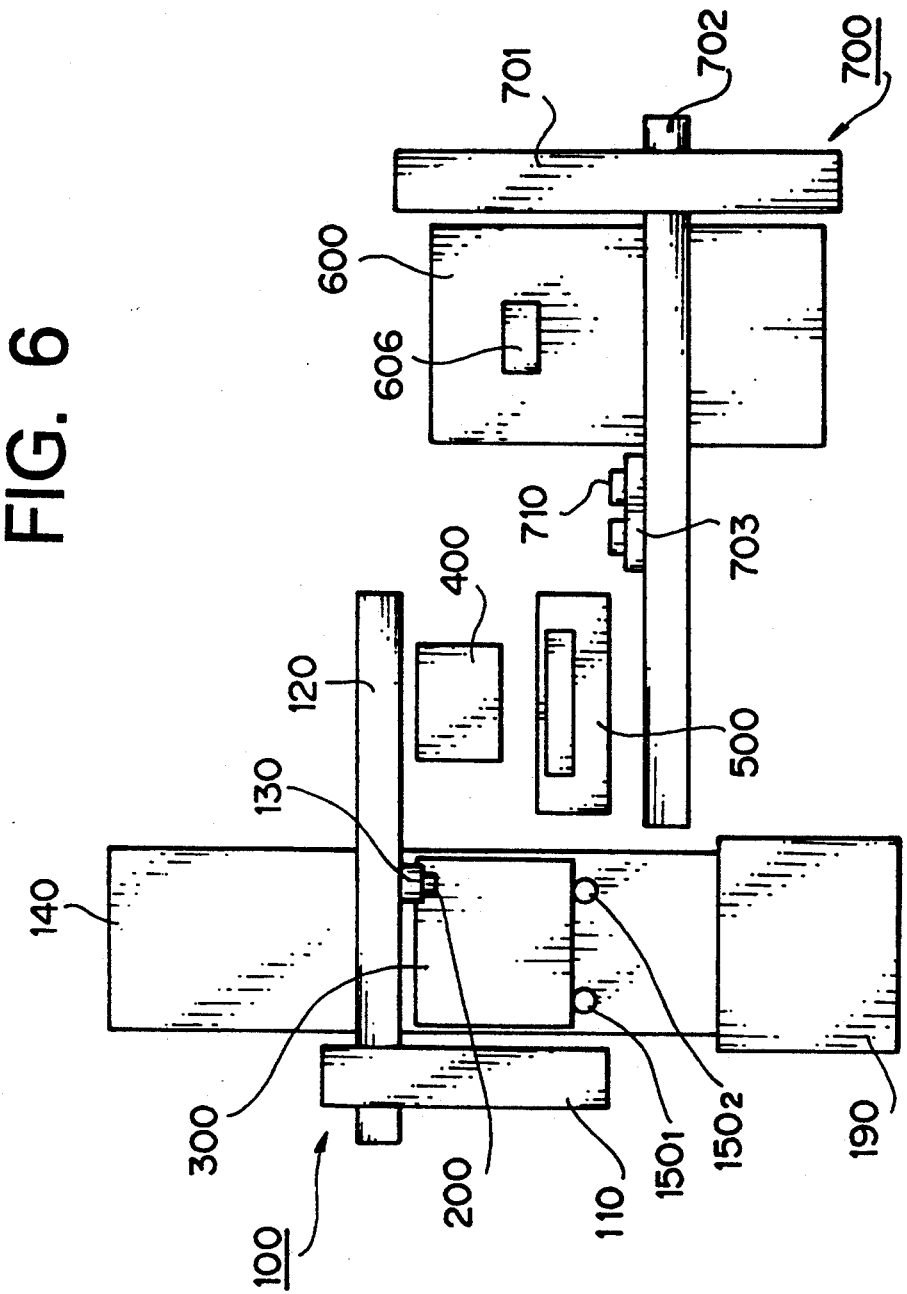

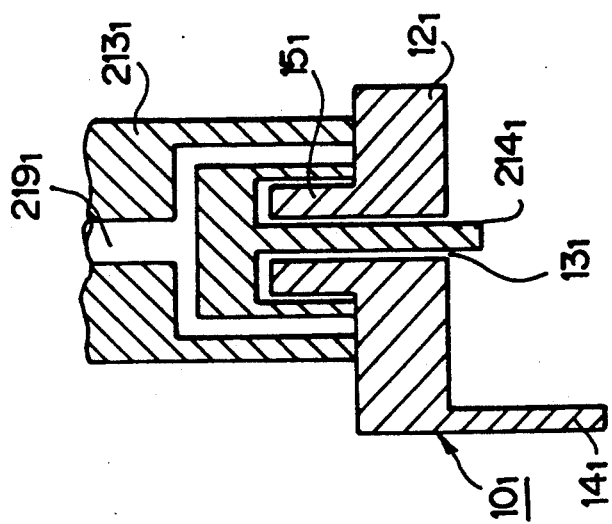
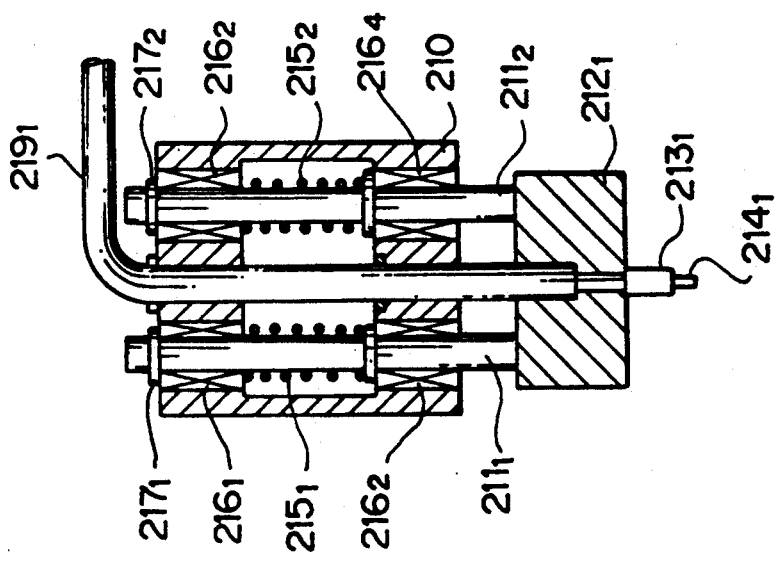
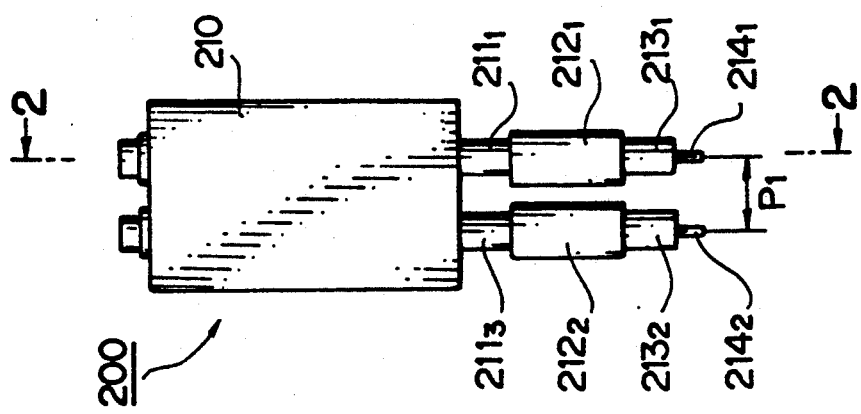

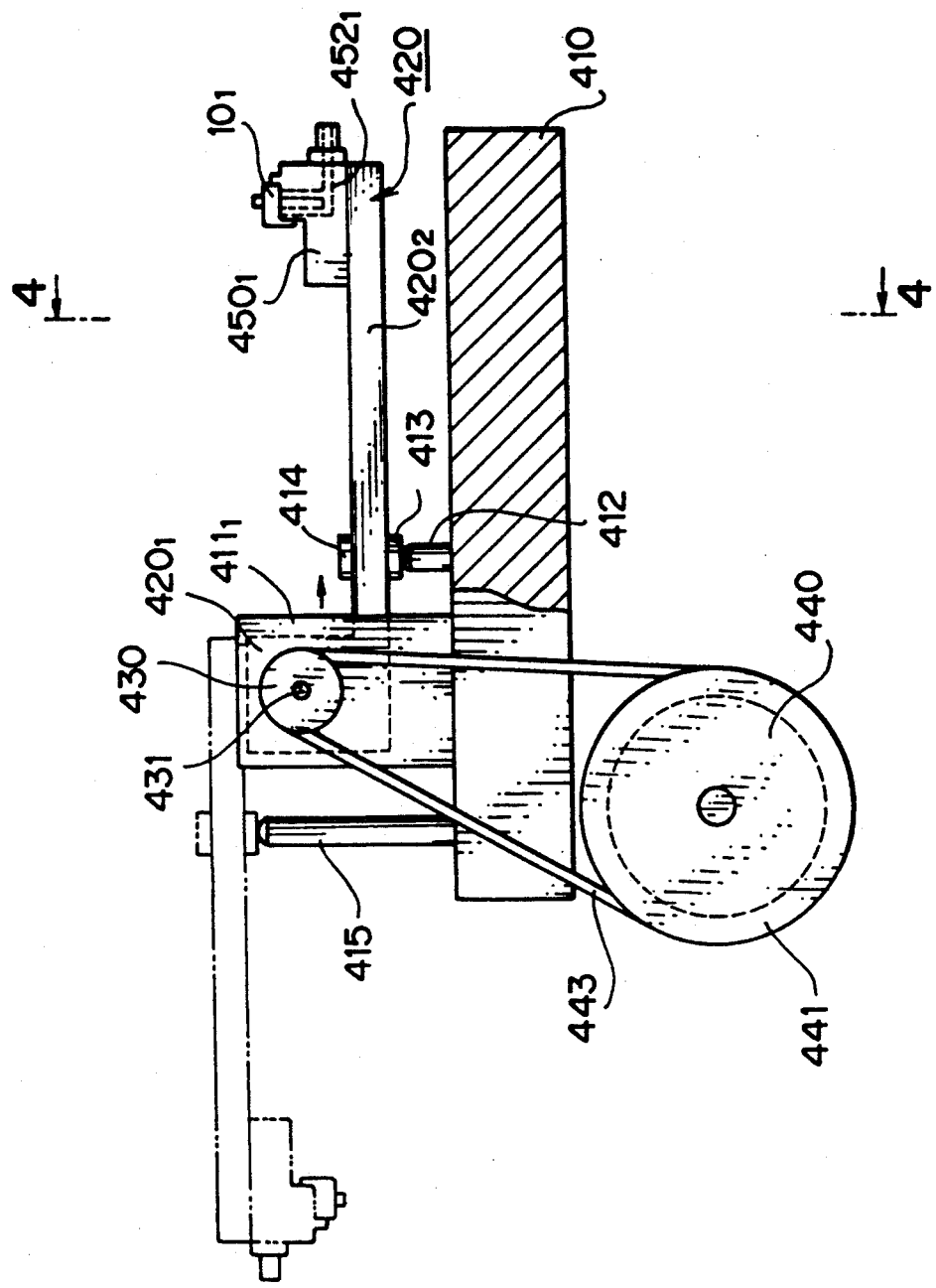

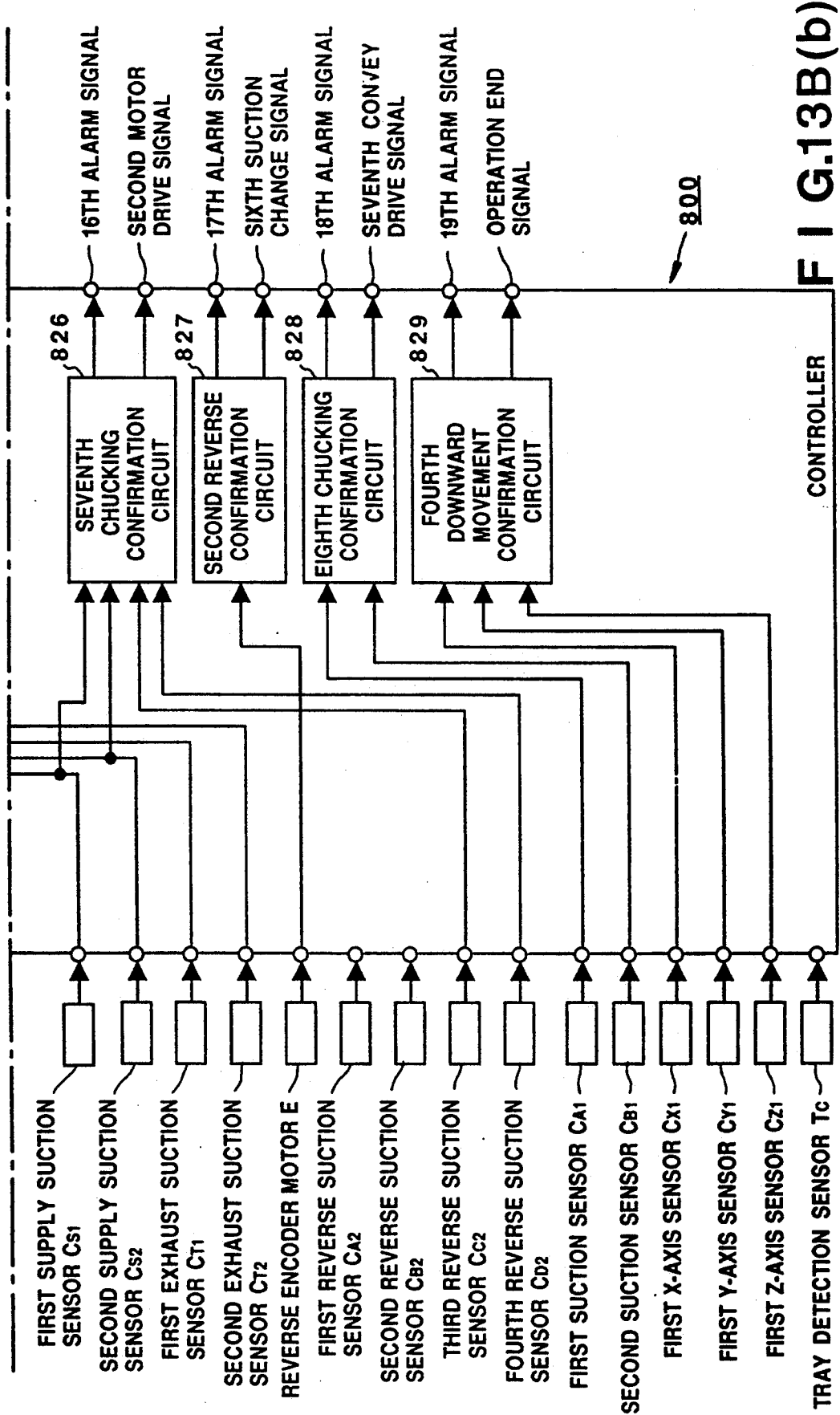

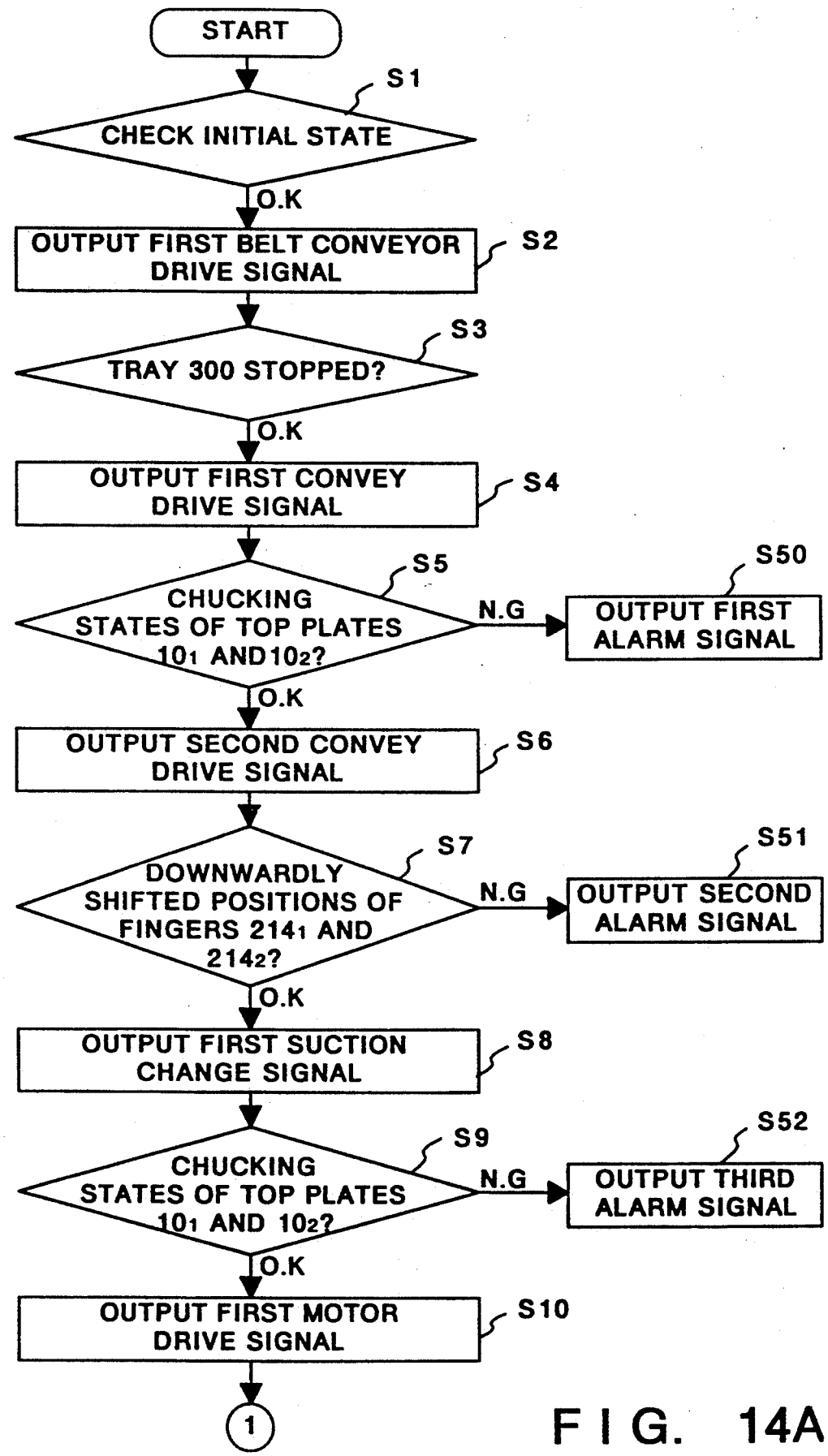
F I G. 14A

WORK CONVEY METHOD AND APPARATUS

BACKGROUND OF THE INVENTION

The present invention relates to a work convey method and apparatus and, more particularly, to a work convey apparatus for conveying a top plate of a recording head for an ink-jet recording apparatus between a tray and a laser process machine.

FIG. 1 is a schematic perspective view showing an arrangement of a recording head of an ink-jet recording apparatus (bubble-jet recording apparatus).

A recording head 1101 has a liquid chamber 1130 for storing an externally supplied ink, and an array of a plurality of nozzles 1133. Each nozzle 1133 has an electro-thermal converter 1132 for generating thermal energy for forming an ink droplet to be discharged from a discharge port 1131 in accordance with image data.

The recording head 1101 is one adopted particularly in a bubble-jet recording apparatus among ink-jet recording apparatuses. The typical arrangement and principle of the bubble-jet recording apparatus are disclosed in, e.g., U.S. Pat. Nos. 4,723,129, 4,740,796, and the like, and can be applied to both so-called on-demand type and continuous type apparatuses. For example, an on-demand type bubble-jet recording apparatus will be explained below. The electro-thermal converters 1132 are arranged in correspondence with a sheet or a liquid channel (nozzles 1133), which holds a liquid (ink). Each electro-thermal converter 1132 generates thermal energy according to a drive signal, thereby causing film boiling on a heat application surface of the recording head 1101. As a result, a bubble having a one-to-one correspondence with the drive signal is formed in the liquid (ink), and the liquid (ink) is discharged as a droplet from the corresponding discharge port 1131 by expansion and shrinkage of the bubble. The drive signal to be supplied is preferably a pulse signal, as disclosed in U.S. Pat. Nos. 4,463,359, 4,345,262, and the like. As for the rate of temperature rise on the heat application surface of the recording head 1101, conditions disclosed in, e.g., U.S. Pat. No. 4,313,124 are preferably adopted.

In addition to the arrangement of the recording head 1101 shown in FIG. 1, the recording head used in the bubble-jet recording apparatus may adopt an arrangement wherein a heat application section is arranged in a bent region, as disclosed in, e.g., U.S. Pat. Nos. 4,558,333 and 4,459,600, or an arrangement wherein a slit common to a plurality of electro-thermal converters is used as a discharge section of the electro-thermal converters, as disclosed in, e.g., Japanese Patent Laid Open No. 59-123670, or an arrangement wherein apertures for absorbing a pressure wave of thermal energy are formed in correspondence with discharge sections, as disclosed in, e.g., Japanese Patent Laid-Open No. 59-138461. Note that in the above-mentioned recording head, a length corresponding to a predetermined width (the width of a maximum recording medium which can be used in recording by a recording apparatus) is assured by combining a plurality of recording heads. Alternatively, one recording head may be constituted to have a length corresponding to the predetermined length.

The above-mentioned recording head may be an exchangeable chip type head which is mounted on an apparatus main body to realize electrical connections (for electro-thermal converters) and supply of an ink, but may be a cartridge type head, as shown in FIG. 2.

FIG. 2 is a perspective view showing components of a recording head which is to be mounted on a base member of an ink cartridge for an ink-jet recording apparatus.

A recording head 1101 has, as its components, a heater board 1002 having a silicon substrate on which electro-thermal converters 1132 and, e.g., an Al wiring layer for supplying electrical power to the electro-thermal converters 1132 are formed by a film formation technique, a top plate 1010 in which nozzles 1133 and a liquid chamber 1130 are formed by a molding technique, and an ink tank 1004 for supplying an ink to the liquid chamber 1130 formed when the heater board 1002 is joined to the top plate 1010.

As shown in FIG. 3, the top plate 1010 is constituted by a top member 1011 formed with a plurality of nozzles $1133_1$ to $1133_4$ and a liquid chamber 1130, a planar member 1012 integrally formed on the front surface of the top member 1011 on the side of the nozzles $1133_1$ to $1133_4$, a projection member 1015 integrally formed on the top member 1011 on the side opposite to the planar member 1012, and formed with an ink supply hole 1014 for causing the liquid chamber 1130 to communicate with the ink tank 1004, and a plurality of slots $1013_1$ to $1013_4$ (only four slots are illustrated) formed in the planar member 1012 by a laser process machine, and serving as the discharge ports 1131 shown in FIG. 1. Note that the top plate 1010 to be actually used has a width of 7 to 8 mm, and is formed with 60 to 80 slots having an outer diameter of 20 to 40 $\mu$m at intervals of 60 to 80 $\mu$m.

In order to form the plurality of slots $1013_1$ to $1013_4$ in the top plate 1010, a work convey apparatus is used for conveying the top plate 1010 to the laser process machine from a tray storing a large number of non-processed top plates 1010. As the work convey apparatus, a conventional work convey apparatus which conveys a work by holding it by an auto hand may be used without any modifications.

However, when the conventional work convey apparatus is used without modifications, the following problems caused by the structure unique to the top plate 1010 shown in FIG. 2 are posed.

(i) When many top plates 1010 are stored in a tray as much as possible to improve a throughput, and the slots $1013_1$ to $1013_4$ are formed in a plurality of top plates 1010 at a time by the laser process machine, since the interval between adjacent top plates 1010 stored in the tray is different from that between adjacent top plates 1010 attached to the laser process machine, the auto hand must comprise a plural work holding mechanism, and a pitch conversion mechanism for converting the interval (pitch) between adjacent held top plates during conveyance.

(ii) In the process of the laser process machine, as described above, 60 to 80 slots having an outer diameter of 20 to 40 $\mu$m must be formed at intervals of 60 to 80 $\mu$m, thus requiring fine process precision. Therefore, when foreign matter becomes attached to a surface to be processed (a surface of the top member 1011 opposite to the projection member 1015) of the top plate 1010 or when the surface to be processed is damaged, the number of defective top plates 1010 is increased, resulting in a poor yield. Therefore, the top plates 1010 are preferably stored in the tray with the surfaces to be processed facing down. On the other hand, when the top plates 1010 are attached to the laser process machine, they are attached with the surfaces to be processed facing down, for the reason to be described later. Therefore, the auto hand must comprise a reverse mechanism for reversing the top plates 1010 during conveyance so that their surfaces to be processed face down.

(iii) When the slots $1013_1$ to $1013_4$ are formed in the top plate 1010 by the laser process machine, the slots $1013_1$ to $1013_4$ are formed to be located at the centers of openings of the nozzles $1133_1$ to $1133_4$. For this reason, as shown in FIG. 4(A), when the top plate 1010 is attached to a work station 1200 of the laser process machine, the surface to be processed of the top plate 1010 must face up. In addition, when the surface to be processed of the top plate 1010 is arranged to be parallel to the optical axis of the laser beam, holes are undesirably formed in a surface of the top member 1011 opposite to the planar member 1012. Thus, as shown in FIG. 4(B), the surface to be processed of the top plate 1010 must be inclined at a predetermined angle with respect to the optical axis of the laser beam. Therefore, the auto hand must comprise an inclination conversion mechanism for inclining the surface to be processed of the top plate 1010 at the predetermined angle during conveyance.

(iv) When non-processed and processed top plates are to be conveyed parallel to each other in order to improve a throughput, the pitch between adjacent processed top plates 1010, and the facing direction and inclination of the processed surfaces must be restored to a state suitable for storage in the tray. Therefore, another auto hand having a plural work holding mechanism, a pitch conversion mechanism, a reverse mechanism, and an inclination conversion mechanism similar to those described above must be arranged.

SUMMARY OF THE INVENTION

The present invention has been made in consideration of the above-mentioned problems (i) and (ii), and has as its first object to provide a work convey method and apparatus, which can efficiently convey works, or num workpieces, from a tray in which a large number of non-processed works are stored at a first pitch with surfaces to be processed facing down to a process machine for processing works in a state wherein the works are aligned at a second pitch with the surfaces to be processed facing up.

The present invention has been made in consideration of the above-mentioned problems (i), (ii), and (iii), and has as its second object to provide a work convey method and apparatus, which can efficiently convey works from a tray in which a large number of non-processed works are stored at a first pitch with surfaces to be processed facing down to be parallel to each other to a process machine for processing works in a state wherein the works are aligned at a second pitch with the surfaces to be processed facing up, and are inclined.

The present invention has been made in consideration of the above-mentioned problems (i), (ii), and (iv), and has as its third object to provide a work convey method and apparatus, which can efficiently convey works between a tray in which a large number of non-processed works are stored at a first pitch with surfaces to be processed facing down, and a process machine for processing works in a state wherein the works are aligned at a second pitch with the surfaces to be processed facing up.

The present invention has been made in consideration of the above-mentioned problems (i), (ii), (iii), and (iv), and has as its fourth object to provide a work convey method and apparatus, which can efficiently convey works between a tray in which a large number of non-processed works are stored at a first pitch with surfaces to be processed facing down to be parallel to each other, and a process machine for processing works in a state wherein the works are aligned at a second pitch with the surfaces to be processed facing up, and are inclined.

The present invention has been made in consideration of the above-mentioned problems (i) and (iv), and has as its fifth object to provide a work convey apparatus comprising a pitch conversion means which can efficiently convert a pitch of a plurality of works when the plurality of works are simultaneously conveyed between a tray in which a large number of non-processed works are stored at a first pitch with surfaces to be processed facing down, and a process machine for simultaneously processing the plurality of works at a second pitch.

The present invention has been made in consideration of the above-mentioned problems (i), (iii), and (iv), and has as its sixth object to provide a work convey apparatus comprising a pitch-inclination conversion means which can efficiently convert a pitch and an inclination of a plurality of works when the plurality of works are simultaneously conveyed between a tray in which a large number of non-processed works are stored at a first pitch while their surfaces to be processed are parallel to the horizontal direction, and a process machine for simultaneously processing the plurality of works at a second pitch while their surfaces to be processed are inclined.

The present invention has been made in consideration of the above-mentioned problems (ii) and (iv), and has as its seventh object to provide a work convey apparatus comprising a work reverse means which can efficiently reverse (surfaces to be processed of) a plurality of works when the plurality of works are simultaneously conveyed between a tray in which a large number of non-processed works are stored with surfaces to be processed facing down, and a process machine for simultaneously processing the plurality of works in a state wherein their surfaces to be processed face up.

In order to achieve the above objects, according to the first aspect of the present invention, there is provided a work convey method which comprises a first convey step of picking up a plurality of works from a tray for storing, at a first pitch, a large number of non-processed works with surfaces to be processed facing down while the storage positions of the works are left unchanged, and conveying the picked-up works, a first reverse step of receiving the plurality of non-processed works picked up and conveyed in the first convey step, and then reversing the positions of the works, so that the surfaces to be processed of the works face up, a first pitch conversion step of receiving the plurality of non-processed works, which are reversed so that the surfaces to be processed thereof face up in the first reverse step, and then converting a pitch between the works into a second pitch, and a second convey step of receiving the plurality of non-processed works, the pitch of which is converted to the second pitch in the first pitch conversion step, and then conveying the works to a process machine.

In order to achieve the above objects, according to the second aspect of the present invention, there is provided a work convey method which comprises a first convey step of picking up a plurality of works from a tray for storing, at a first pitch, a large number of non-processed works with surfaces to be processed facing down while the storage positions of the works are left unchanged, and conveying the picked-up works, a first pitch conversion step of receiving the plurality of non-processed works picked up and conveyed in the first convey step, and then converting a pitch between the works into a second pitch, a first reverse step of receiving the plurality of non-processed works, the pitch of which is converted to the second pitch in the first pitch conversion step, and then reversing the positions of the works, so that the surfaces to be processed of the works face up, and a second convey step of receiving the plurality of non-processed works, which are reversed so that the surface to be processed of thereof face up in the first reverse step, and then conveying the works to a process machine.

In order to achieve the above objects, according to the third aspect of the present invention, there is provided a work convey method which comprises a first convey step of picking up a plurality of works from a tray for storing, at a first pitch, a large number of non-processed works with surfaces to be processed facing down while the storage positions of the works are left unchanged, and conveying the picked-up works, a first reverse step of receiving the plurality of non-processed works picked up and conveyed in the first convey step, and then reversing the positions of the works, so that the surfaces to be processed of the works face up, a first pitch-inclination conversion step of receiving the plurality of non-processed works, which are reversed so that the surfaces to be processed thereof face up in the first reverse step, converting a pitch between the works into a second pitch, and inclining the works so that the surfaces to be processed thereof are inclined at a predetermined angle, and a second convey step of receiving the plurality of non-processed works, the surfaces to be processed of which are inclined, and the pitch of which is converted to the second pitch in the first pitch-inclination conversion step, and then conveying the works to a process machine.

In order to achieve the above objects, according to the fourth aspect of the present invention, there is provided a work convey method which comprises a first convey step of picking up a plurality of works from a tray for storing, at a first pitch, a large number of non-processed works with surfaces to be processed facing down while the storage positions of the works are left unchanged, and conveying the picked-up works, a first pitch conversion step of receiving the plurality of non-processed works picked up and conveyed in the first convey step, and then converting a pitch between the works into a second pitch, a first reverse step of receiving the plurality of non-processed works, the pitch of which is converted to the second pitch in the first pitch conversion step, and then reversing the positions of the works, so that the surfaces to be processed of the works face up to be inclined at a predetermined angle, and a second convey step of receiving the plurality of non-processed works, which are reversed so that the surfaces to be processed thereof face up to be inclined at the predetermined angle in the first reverse step, and then conveying the works to a process machine.

In order to achieve the above objects, according to the fifth aspect of the present invention, there is provided a work convey apparatus in which a plurality of works are conveyed from a tray for storing a large number of non-processed works, which are aligned at a first pitch with surfaces to be processed facing down, to a process machine, and which comprises a first convey robot for picking up the plurality of works from said tray while the positions of the works are left unchanged, and conveying the picked-up works, work reverse means comprising a reverse arm, arranged in a convey range of said first convey robot, for reversing the positions of the works so that the surfaces to be processed of the works face up to be inclined at a predetermined angle, pitch conversion means, arranged within an access range of said reverse arm, for converting a pitch between the received works into a second pitch, and a second convey robot, arranged between said pitch conversion means and said process machine, for conveying the works between said pitch conversion means and said process machine.

In order to achieve the above objects, according to the sixth aspect of the present invention, there is provided a work convey apparatus in which said pitch conversion means includes a plurality of first work receiving members, a plurality of second work receiving members, a stationary portion having one of said first work receiving members, and one of said second work receiving members, first slide members each having one of said first work receiving members, second slide members each having one of said second work receiving members, a plurality of slide means for sliding said first and second slide members in opposite directions, and a plurality of slide amount regulating means for regulating slide amounts of said first and second slide members by said slide means to an amount corresponding to a difference between a second pitch and the first pitch.

In order to achieve the above objects, according to the seventh aspect of the present invention, there is provided a work convey apparatus in which a plurality of works are conveyed from a tray for storing a large number of non-processed works, which are aligned at a first pitch with surfaces to be processed facing down, to a process machine, and which comprises a first convey robot for picking up the plurality of works from said tray while the positions of the works are left unchanged, and conveying the picked-up works, work reverse means comprising a reverse arm, arranged in a convey range of said first convey robot, for reversing the positions of the works so that the surfaces to be processed of the works face up to be inclined at a predetermined angle, pitch-inclination conversion means, arranged within an access range of said reverse arm, for converting a pitch between the received works into a second pitch, and inclining the surfaces to be processed of the works at the predetermined angle, and a second convey robot, arranged between said pitch-inclination conversion means and said process machine, for conveying the works between said pitch-inclination conversion means and said process machine.

In order to achieve the above objects, according to the eighth aspect of the present invention, there is provided a work convey apparatus in which said pitch-inclination conversion means includes a plurality of first work receiving members, a plurality of second work receiving members, a stationary portion having one of said first work receiving members, and one of said second work receiving members, first slide members each having one of said first work receiving members, second slide members each having one of said second work receiving members, a plurality of slide means for sliding said first and second slide members in opposite directions, a plurality of slide amount regulating means for regulating slide amounts of said first and second slide members by said slide means to an amount corresponding to a difference between a second pitch and the first pitch;

an inclination arm on which said stationary portion and said first and second slide members are held, and one end of which is rotatably supported, rotation means for rotating said inclination arm, and rotational angle regulating means for regulating a rotational angle of said inclination arm.

In order to achieve the above objects, according to the ninth aspect of the present invention, there is provided a work convey apparatus in which said reverse means includes first work receiving jigs for simultaneously receiving a plurality of non-processed works, and chucking and holding the works, second work receiving jigs for simultaneously receiving a plurality of processed works, and chucking and holding the works, a reverse arm to which said first and second work receiving jigs are fixed to be separated from each other at the first pitch, and drive means for driving said reverse arm in a forward or reverse rotation state.

In the work convey method according to the present invention, a plurality of non-processed works simultaneously picked up from a tray are supplied to a process machine after being reversed so that their surfaces to be processed face up in the first reverse step. Therefore, since works can be stored in the tray with surfaces to be processed facing down, attachment of foreign matter to the surfaces to be processed and damage to the surfaces can be prevented.

A plurality of non-processed works which are reversed so that their surfaces to be processed face up are supplied to the process machine after their pitch is converted to a second pitch (a pitch required when the works are attached to a work station of the process machine) in the first pitch conversion step. Therefore, non processed works can be stored in the tray at a first pitch smaller than the second pitch.

When the work convey method comprises the first pitch-inclination conversion step in place of the first pitch conversion step, a plurality of non-processed works which are reversed so that their surfaces to be processed face up in the first reverse step can be supplied to the process machine after their pitch is converted to the second pitch, and their surfaces to be processed are inclined in the first pitch inclination conversion step. Therefore, the works can be attached to the work station of the process machine while their surfaces to be processed are inclined.

When the method comprises the second reverse step and the second pitch conversion step or the second pitch-inclination conversion step in addition to the above-mentioned steps, the works processed by the process machine can be conveyed to and stored in the tray.

An operation for receiving a plurality of non-processed works in the second convey step and an operation for receiving a plurality of processed works in the second pitch conversion step (or the second pitch-inclination conversion step) are performed parallel to each other, and an operation for receiving a plurality of non-processed works in the first pitch conversion step (or the first pitch-inclination conversion step) and an operation for receiving a plurality of processed works in the second reverse step are performed parallel to each other. In this manner, a plurality of processed works can be conveyed to and stored in the tray while a plurality of non-processed works are conveyed and supplied to the process machine.

Furthermore, the order of the second pitch conversion step (or the second pitch-inclination conversion step) and the reverse step may be reversed to obtain the same effect.

The work convey apparatus according to the present invention can cause the first convey robot to execute the first convey step, can cause the work reverse means to execute the first reverse step, can cause the pitch-inclination conversion means to execute the first pitch-inclination conversion step (the first pitch conversion step if the inclination cylinder is not operated), and can cause the second convey robot to execute the second convey step. Therefore, a plurality of non-processed works can be simultaneously conveyed from the tray to the process machine.

In the work convey apparatus according to the present invention, the second convey robot comprises a plurality of second fingers each having work chucking-/holding means, and arranged at the second pitch, and can execute the third convey step. The stationary section of the pitch-inclination conversion means, and the second slide members each of which is inclined at a predetermined angle by the inclination conversion cylinder, and whose pitch is converted from the first pitch to the second pitch by the pitch conversion cylinders, each have one of the plurality of second work receiving members, thereby executing the second pitch-inclination conversion step (or the second pitch conversion step).

When the plurality of second work receiving members are fixed to the reverse arm of the work reverse means at the first pitch, the second reverse step can be executed. Therefore, when the fourth convey step is executed by the first convey robot, a plurality of processed works can be simultaneously conveyed from the process machine to the tray, and can be stored in the tray.

Furthermore, in the work convey apparatus according to the present invention, an operation for receiving a plurality of non-processed works in the second convey system and an operation for receiving a plurality of processed works in the pitch inclination conversion means are performed parallel to each other, and an operation for receiving a plurality of non-processed works in the pitch-inclination conversion means and an operation for receiving a plurality of processed works in the reverse means are performed parallel to each other. In this manner, a plurality of processed works can be conveyed to and stored in the tray while a plurality of non processed works are conveyed and supplied to the process machine.

In the pitch conversion means in the work convey apparatus according to the present invention, a plurality of non-processed works are transferred to the plurality of first work receiving members while the first pitch as a pitch suitable for storage in the tray is left unchanged. Thereafter, the first slide members each having one of the plurality of the first work receiving members are slid by the corresponding slide means by an amount corresponding to the difference between the first and second pitches, thereby converting the pitch of the plurality of non-processed works into the second pitch.

At this time, the second slide members are slid by the corresponding slide members in the opposite direction but by the same slide amount as the first slide members. For this reason, the plurality of processed works are transferred to the plurality of second work receiving members each of which is provided to each of the second slide members while the second pitch as a pitch suitable for a process in the process machine is left unchanged. Thereafter, the second slide members are returned to their home positions by the corresponding slide means, thereby converting the pitch of the plurality of processed works into the first pitch.

In the pitch-inclination conversion means in the work convey apparatus according to the present invention, since the stationary section of the pitch conversion means and the first and second slide members are held by the inclination arm whose one end is rotatably supported, when the inclination arm is rotated by the rotation means through a predetermined rotational angle, the first work receiving members which received the plurality of non-processed works can be inclined, thereby converting the inclination of the surface to be processed of each non-processed work into that suitable for the process.

After a plurality of processed works are transferred to the second work receiving members inclined together with the first work receiving members, the inclination arm is returned to its original position by the rotation means, thus converting the inclination of the processed surface of each processed work into that suitable for storage in the tray.

Furthermore, in the reverse means in the work convey apparatus according to the present invention, a plurality of non-processed works which are conveyed at the first pitch with their surfaces to be processed facing down are simultaneously received, and chucked and held by the first work receiving jigs in a forward rotation state of the reverse arm. Thereafter, the reverse arm is rotated through 180 degrees by the drive means to a reverse rotation state, so that the surfaces to be processed of the works face up. Thereafter, the works are conveyed to the process machine via the next step.

A plurality of processed works which are conveyed with their surfaces to be processed facing up are simultaneously received, and chucked and held by the second work receiving jigs in the reverse rotation state of the reverse arm. Thereafter, the reverse arm is rotated through 180 degrees by the drive means to the forward rotation state, so that the surfaces to be processed of the works face down. Thereafter, the works are conveyed to the tray via the next step.

Therefore, when the reverse arm is set in the reverse rotation state, an operation for transferring a plurality of non-processed works to the device in the next step and an operation for receiving a plurality of processed work from the device in the next step can be simultaneously executed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4(A) and 4(B) show the conventional positional relationships between a surface to be processed of a top plate and the optical axis of a laser beam when the top plate is attached to a work station of a laser process machine, in which FIG. 4(A) shows the positional relationship when the surface to be processed of the top plate is parallel to the optical axis of the laser beam, and FIG. 4(B) shows the positional relationship when the surface to be processed of the top plate is inclined at a predetermined angle with respect to the optical axis of the laser beam;

FIG. 6 is a schematic plan view of the work convey apparatus shown in FIG. 5;

FIGS. 8(A) to 8(D) show a schematic arrangement of a first auto hand shown in FIG. 5, in which FIG. 8(A) is a partially cutaway side view, FIG. 8(B) is a front view of a chucking/holding section of the robot hand, FIG. 8(C) is a sectional view taken along a line 2—2 in FIG. 8(B), and FIG. 8(D) is a partially enlarged sectional view of a finger showing a chucked state of a top plate;

FIGS. 9(A) to 9(D) show a schematic arrangement of a reverse unit shown in FIG. 5, in which FIG. 9(A) is a sectional view taken along a line 4—4 in FIG. 9(B), FIG. 9(B) is a sectional view taken along a line 3—3 in FIG. 9(A), FIG. 9(C) is a side view showing an arrangement of four top plate receiving jigs of the reverse unit, and FIG. 9(D) is a partially enlarged sectional view of the top plate receiving jig showing a chucked/held state of a top plate;

FIGS. 10(A) to 10(E) show a schematic arrangement of a pitch-inclination conversion unit, in which FIGS. 10(A) to 10(C) are side views showing an arrangement and operation of a pitch conversion function section, FIG. 10(D) is a side view showing an arrangement and operation of an inclination conversion function section, and FIG. 10(E) is a partially enlarged sectional view of a receiving member showing a chucked/held state of a top plate;

FIGS. 11(A) to 11(C) show a schematic arrangement of a second auto hand shown in FIG. 5, in which FIG. 11(A) is a partially cutaway side view of the second auto hand, FIG. 11(B) is a front view of a chucking/holding section of the second auto hand, and FIG. 11(C) is a partially enlarged sectional view of a finger showing a chucked state of a top plate;

FIGS. 13(A) (*a,b*) and 13(B) (*a,b*) are block diagrams showing connections between a controller shown in FIG. 5 and sensors, in which FIG. 13(A) shows connections used when top plates are conveyed from the tray to the laser process machine.

FIGS. 14(A) to 14(E) are flow charts showing operations of the controller during an operation of the work convey apparatus shown in FIG. 5; and FIGS. 15(A) to 15(D) show an arrangement of a pitch conversion function section of a pitch-inclination conversion unit according to another embodiment of the present invention, in which FIGS. 15(A) and 15(B) are front views of the unit, FIG. 15(C) is a left side view of the unit, and FIG. 15(D) is a partial top view of the unit.

DETAILED DESCRIPTION OF THE PREFERRED EMBODIMENTS

Various embodiments of a pitch-inclination conversion unit according to the present invention will be described in detail below with reference to the accompanying drawings.

Figure 1:
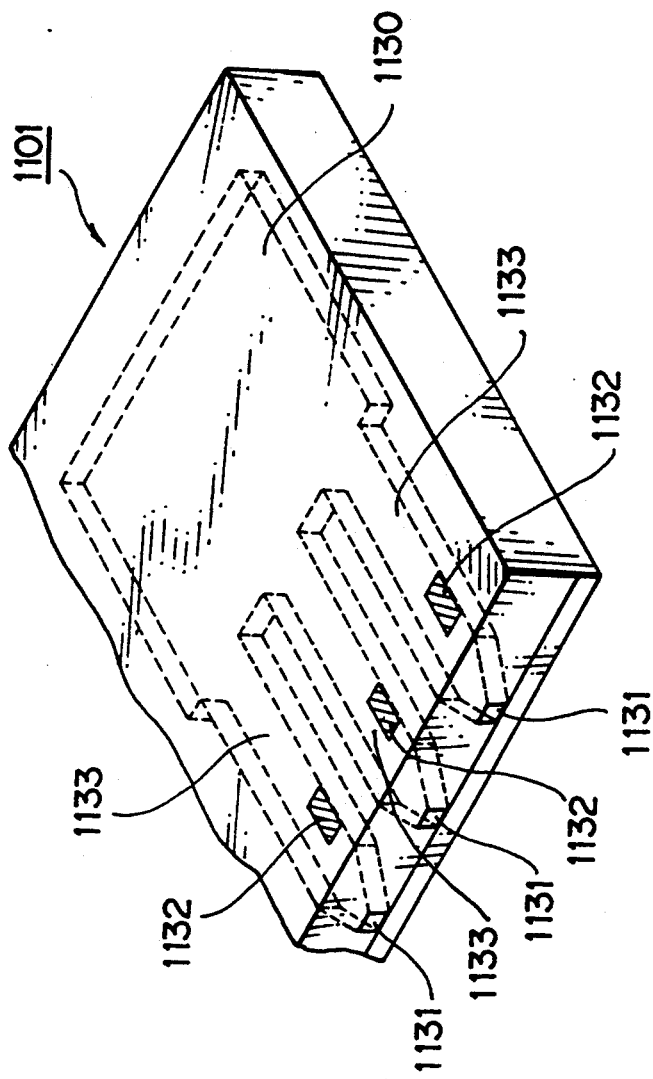
FIG. 1 is a schematic perspective view showing an arrangement of a recording head for a conventional ink-jet recording apparatus (bubble-jet recording apparatus)
Figure 2:
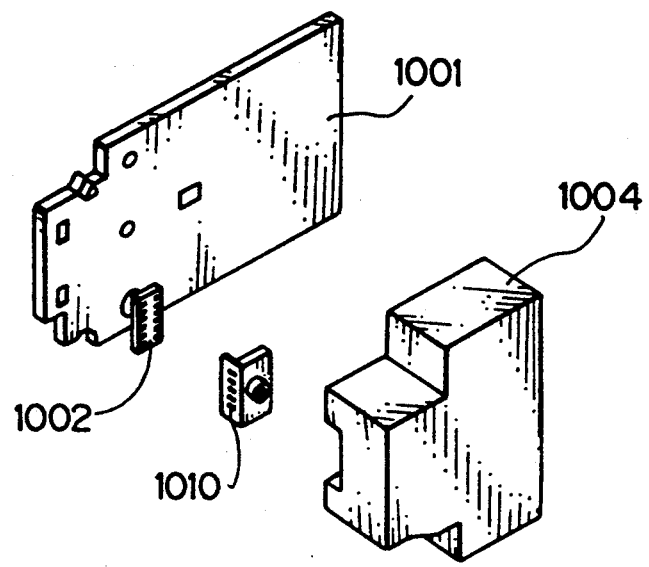
FIG. 2 is a schematic perspective view showing components of a recording head to be mounted on a base member of an ink cartridge for a conventional ink-jet recording apparatus.
Figure 3:
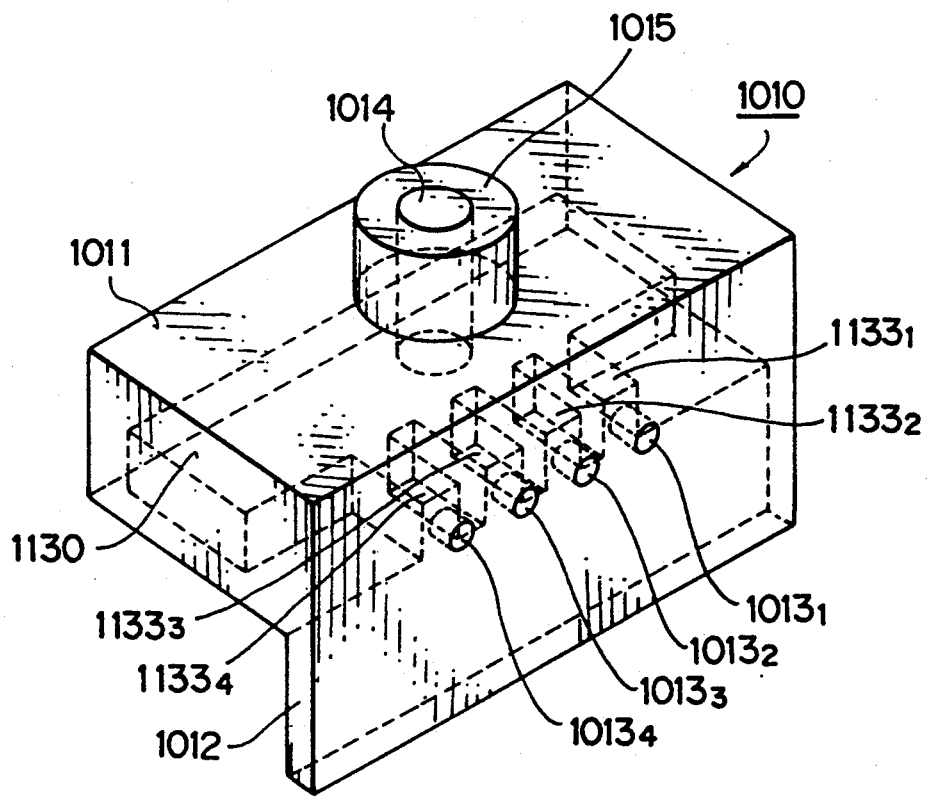
FIG. 3 is a schematic perspective view showing an arrangement of a top plate shown in FIG. 2.
Figure 4A:
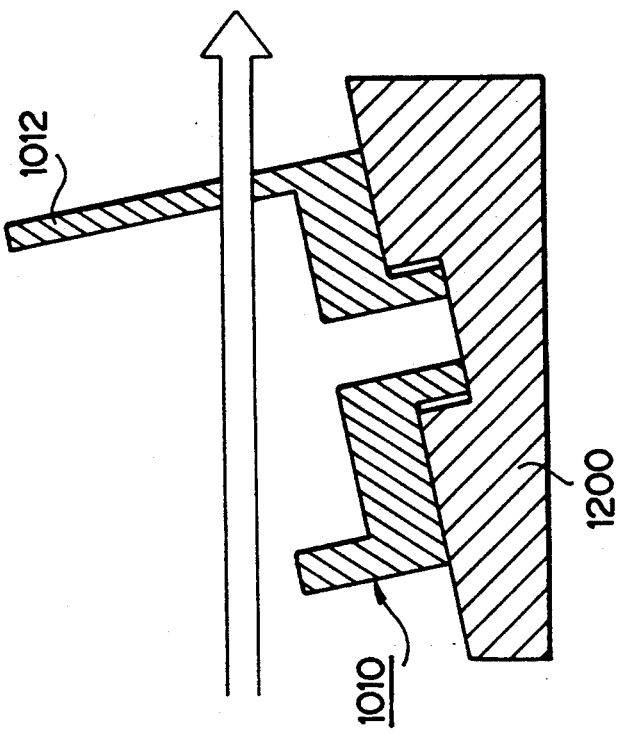
Figure 4B:
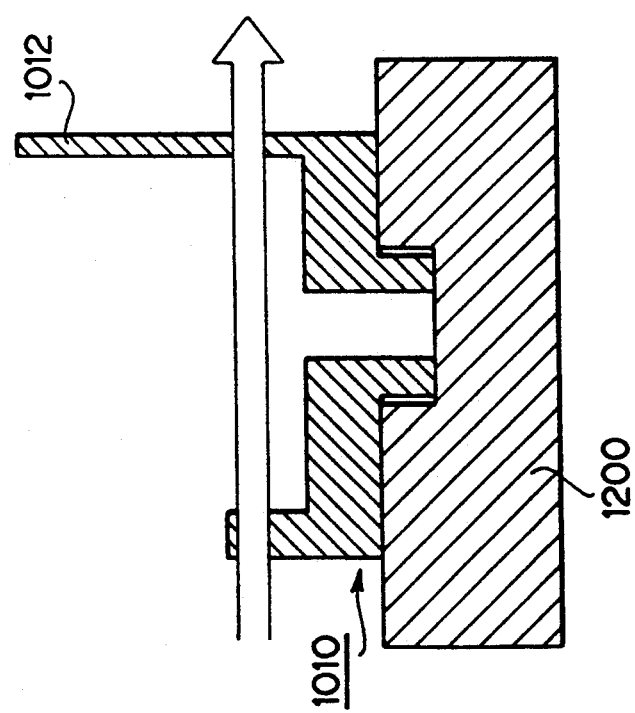
Figure 5:
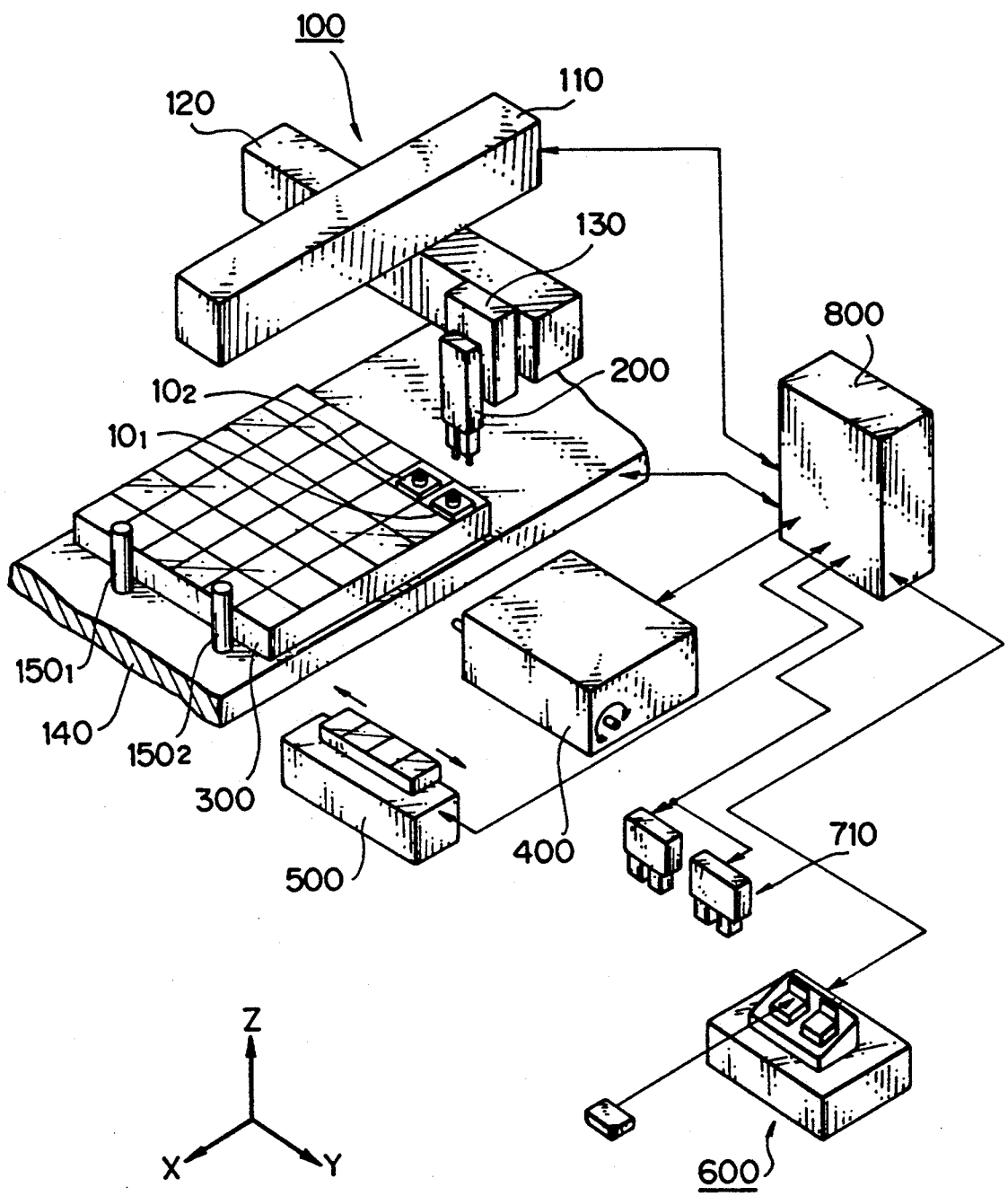
FIG. 5 is a perspective view showing a work convey apparatus, which comprises a pitch-inclination conversion unit according to an embodiment of the present invention, and conveys a top plate of a recording head for an ink-jet recording apparatus between a tray and a laser process machine.

FIG. 5 is a schematic perspective view of a work convey apparatus, which comprises a pitch-inclination conversion unit according to an embodiment of the present invention, and conveys a top plate of a recording head for an ink-jet recording apparatus between a tray and a laser process machine, and FIG. 6 is a schematic plan view of the work convey apparatus shown in FIG. 5.

The work convey apparatus comprises a tray 300 for storing a large number of top plates (FIG. 5 illustrates a state wherein only two top plates $10_1$ and $10_2$ are stored), a belt conveyor 140 which carries and conveys the tray 300 from the upper right side in FIG. 5, two stopper pins $150_1$ and $150_2$ which stop the tray 300 at a pickup position, and are projected/retracted by a drive unit (not shown), a tray rack 190 (FIG. 6) for recovering the tray 300 which stores processed top plates $10_1$ and $10_2$, a first convey robot 100, a reverse unit 400, a pitch-inclination conversion unit 500 as an embodiment of a pitch-inclination conversion unit according to the present invention, a second convey robot 700 (FIG. 6), a laser process machine 600, and a controller 800.

The respective components of the work convey apparatus will be explained in detail below.

(A) Top Plates $10_1$ and $10_2$

The top plate 101 as a work, i.e., a workpiece, is formed of a light-transmission resin having a high ink resistance, such as polysulfone, polyether sulfone, polyphenylene oxide, polypropylene, or the like. When a top member $12_1$ and a planar member $14_1$ shown in FIG. 7 (B) are formed in advance by molding, a projection member $15_1$, an ink supply hole $13_1$, and nozzles (not shown) are simultaneously formed in the top plate $10_1$. The same applies to the top plate $10_2$.

(B) Tray 300

Figure 7A:
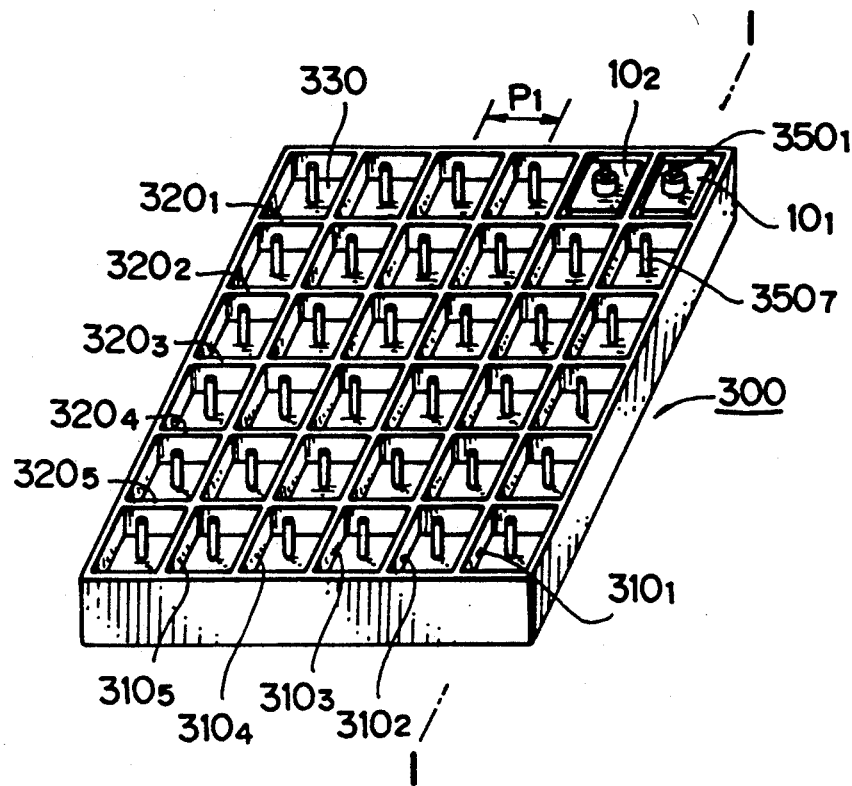
FIGS. 7(A) and 7(B) are respectively a schematic perspective view showing an arrangement of the tray shown in FIG. 5, and a partial sectional view taken along a line 1—1 in FIG. 7(A)
Figure 7B:
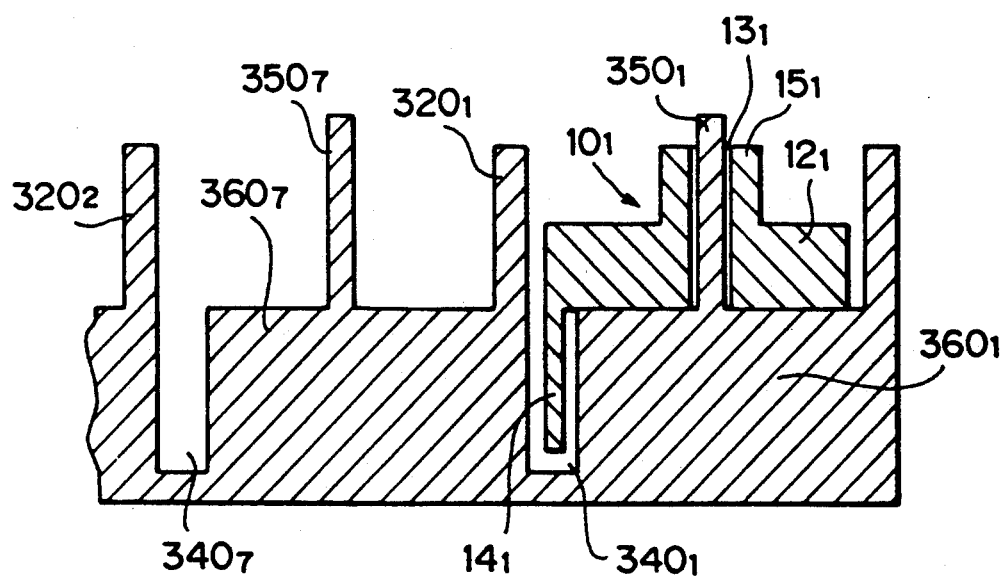

As shown in FIG. 7(A), the tray 300 is partitioned into 36 storage blocks 330 by five longitudinal frames $310_1$ to $310_5$ and five widthwise frames $320_1$ to $320_5$. As shown in FIG. 7(B), in each storage block 330, a top plate support member $360_1$ is formed integrally with the main body of the tray 300. The top plate support member $360_1$ has a groove $340_1$ for receiving the planar member $14_1$ of the top plate $10_1$ upon storage, and a holding shaft $350_1$ fitted in the ink supply hole $13_1$ of the top plate $10_1$ upon storage so as to store the top plate $10_1$ with its surface to be processed (a surface of the top member $12_1$ on the side opposite to the projection member $15_1$) facing down in a horizontal state. Therefore, in a pre-process, after the top plates $10_1$ and $10_2$ are stored in the tray 300, the surfaces to be processed of the top plates $10_1$ and $10_2$ face down in a horizontal state, and their directions are aligned.

Note that the widthwise pitch between adjacent storage blocks 330 of the tray 300 is set to have a first pitch $P_1$ smaller than a second pitch $P_2$ (FIG. 10) as a pitch at which the top plates $10_1$ and $10_2$ are attached to a work station 606 of the laser process machine 600 (to be described later), so that many top plates can be stored as much as possible.

(C) First Convey Robot 100

The first convey robot 100 simultaneously picks up, and conveys the two non-processed top plates $10_1$ and $10_2$ which are separated at the first pitch $P_1$ with their surfaces to be processed facing down in a horizontal state. Also, the robot 100 receives the two processed top plates $10_1$ and $10_2$ which are separated at the first pitch $P_1$ with their surfaces to be processed facing down in a horizontal state. Thereafter, the robot 100 conveys these plates to the tray 300, and stores them in the tray.

As shown in FIG. 5, the first convey robot 100 comprises a first X-axis arm 110 fixed to a base (not shown), a first Y-axis arm 120 movably supported on the first X-axis arm 110, and reciprocally moved in the X-direction in FIG. 5 by a first X-axis drive means (not shown), a first Z-axis arm 130 movably supported on the first Y-axis arm 120, and reciprocally moved in the Y-direction in FIG. 5 by a first Y-axis drive means (not shown), and a first auto hand 200 attached to the first Z-axis arm 130.

The first auto hand 200 can simultaneously chuck and hold the two top plates $10_1$ and $10_2$. More specifically, as shown in FIG. 8(B), a chucking/holding section of the first auto hand 200 comprises a main body block 210, two fingers $213_1$ and $213_2$, movable blocks $212_1$ and $212_2$ to which the fingers $213_1$ and $213_2$ are attached, and slide shafts $211_2$ to $211_4$, the lower ends of two each of which are fixed to a corresponding one of slide shafts $211_2$ and $211_4$ are arranged on the rear surface sides of FIG. 8(B) of the slide shafts $211_1$ and $211_3$). Note that finger insertion portions $214_1$ and $214_2$ inserted in the ink supply holes $13_1$ and $13_2$ of the top plates $10_1$ and $10_2$ when the two top plates are simultaneously chucked and held are formed at the distal ends of the two fingers $213_1$ and $213_2$, respectively.

Note that the fingers $213_1$ and $213_2$ are separated at the first pitch $P_1$ equal to the widthwise pitch between the adjacent storage blocks 330 of the tray 300.

As shown in FIG. 8(C), a hollow space is formed in the main body block 210, and springs $215_1$ to $215_4$ for normally biasing the slide shafts $211_1$ to $211_4$ downward are arranged in the space (the two unillustrated springs $215_3$ and $215_4$ are arranged on the side of the finger $213_2$). These springs are clamped between the upper and lower surfaces (FIG. 8(C)) of the space, and the slide shafts $211_1$ to $211_4$ are inserted therethrough. Four through holes for receiving the slide shafts $211_1$ to $211_4$ are formed in each of the upper and lower surfaces (FIG. 8(C)) of the main body block 210, and the slide shafts $211_1$ to $211_4$ are slidably and axially supported by second bearings $216_1$ to $216_8$ (the four unillustrated bearings $216_5$ to $216_8$ are arranged on the side of the finger $213_2$) provided to the respective through holes. Stoppers $217_1$ to $217_4$ are respectively arranged on the upper ends of the slide shafts $211_1$ to $211_4$ (the two unillustrated stoppers $217_3$ and $217_4$ are respectively arranged on the slide shafts $211_3$ and $211_4$), thereby regulating the downward moving amount of the slide shafts $211_3$ and $211_4$ in FIG. 8(C) by the springs $215_1$ to $215_4$. Suction tubes $219_1$ and $219_2$ (the suction tube $219_2$ on the side of the finger $213_2$ is not shown) for communicating the distal ends of the fingers $213_1$ and $213_2$ with a vacuum source (not shown) are arranged to extend through the interiors of the main body block 210, the movable blocks $212_1$ and $212_2$, and the fingers $213_1$ and $213_2$.

As shown in FIG. 8(D), a hole for receiving the projection member $15_1$ of the top plate $10_1$ when the top plate $10_1$ is chucked and held is formed in the distal end face of the finger $213_1$. In order to chuck a chucking surface (the surface of the top member $12_1$ on the side of the projection member $15_1$) by vacuum suction, the suction tube $219_1$ is branched into two portions inside the finger $213_1$, and the branched portions are open to the distal end face of the finger $213_1$, which contacts the chucking surface of the top plate $10_1$. The same applies to the finger $213_2$ and the suction tube $219_2$.

Figure 8A:
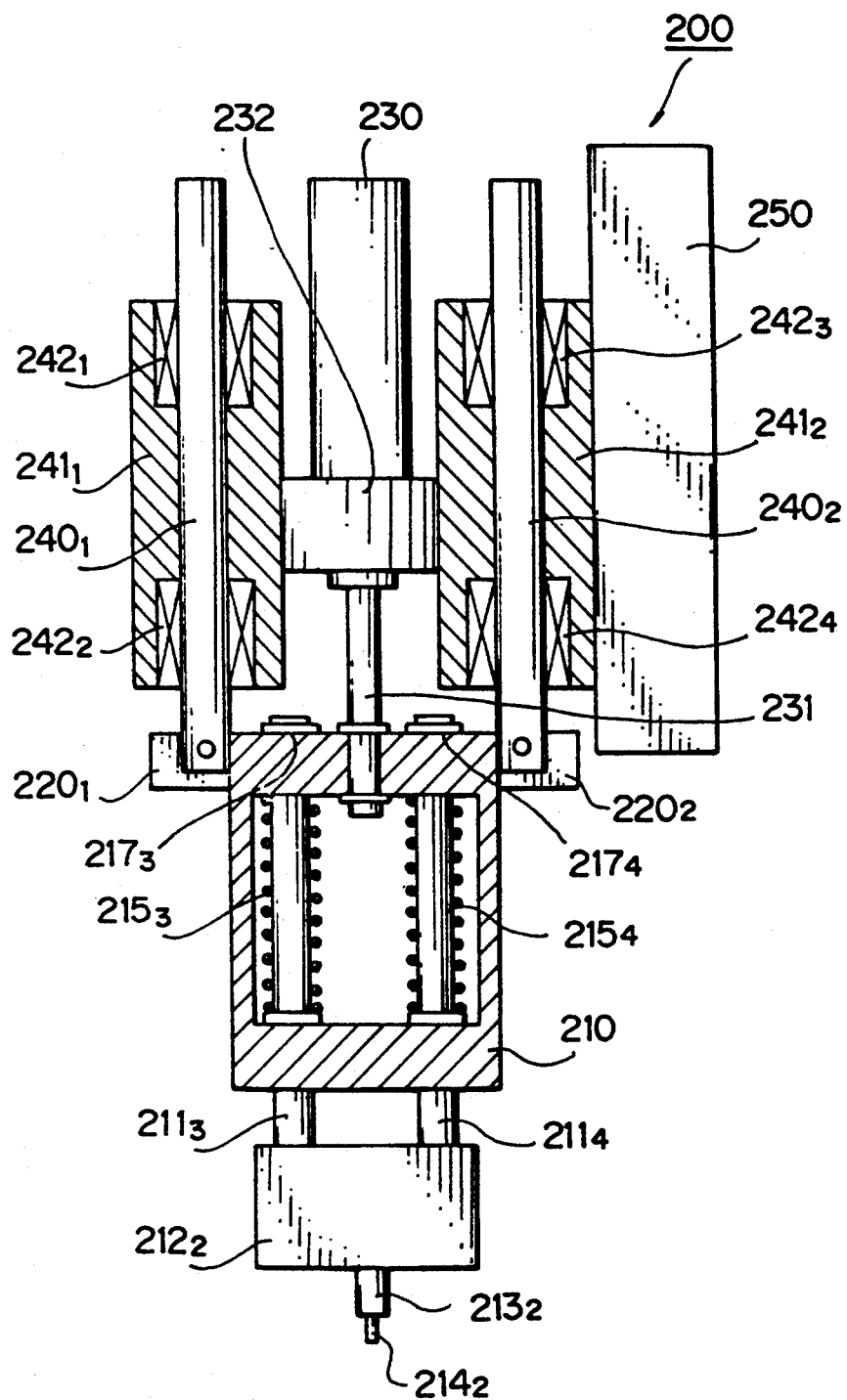

As shown in FIG. 8(A), the first auto hand 200 is mounted on the first Z-axis arm 130 (FIG. 5) via a mounting member 250 so as to be movable in the X- and Y-directions in FIG. 5. In addition, the chucking/holding section of the first auto hand 200 is movable in the Z-direction in FIG. 5 by a cylinder 230. More specifically, the central portion of the upper surface of the main body block 210 is held by a rod 231 of the cylinder 230 held by a cylinder holding member 232, and vertically movable members $220_1$ and $220_2$ attached to the two upper side surfaces of the main body block 210 are respectively supported by two slide guide shafts $240_1$ and $240_2$ which are axially supported by first bearings $242_1$ to $242_4$, two each of which are provided to the interior of a corresponding one of holding members $241_1$ and $241_2$. Thus, the chucking/holding section of the first auto hand 200 is movable in the Z-direction in FIG. 5 in accordance with a drive operation of the cylinder 230. Note that the two side surfaces of the cylinder holding member 232 are fixed to the two holding members $241_1$ and $241_2$, and the side surface of the holding member $241_2$ on the side opposite to the cylinder holding member 232 is fixed to the mounting member 250.

(D) Reverse Unit 400

The reverse unit 400 simultaneously receives, from the first convey robot 100, the non-processed top plates $10_1$ and $10_2$ which are separated at the first pitch $P_1$ with their surfaces to be processed facing down in a horizontal state. Thereafter, the unit 400 reverses the top plates $10_1$ and $10_2$, so that their surfaces to be processed face up. When the pitch-inclination conversion unit 500 (to be described later) simultaneously receives the non-processed top plates $10_1$ and $10_2$, the unit 400 simultaneously receives the processed top plates $10_1$ and $10_2$ which are separated at the first pitch $P_1$ with their processed surfaces facing up in a horizontal state, and thereafter, reverses the top plates $10_1$ and $10_2$, so that their processed surfaces face down.

Figure 9A:
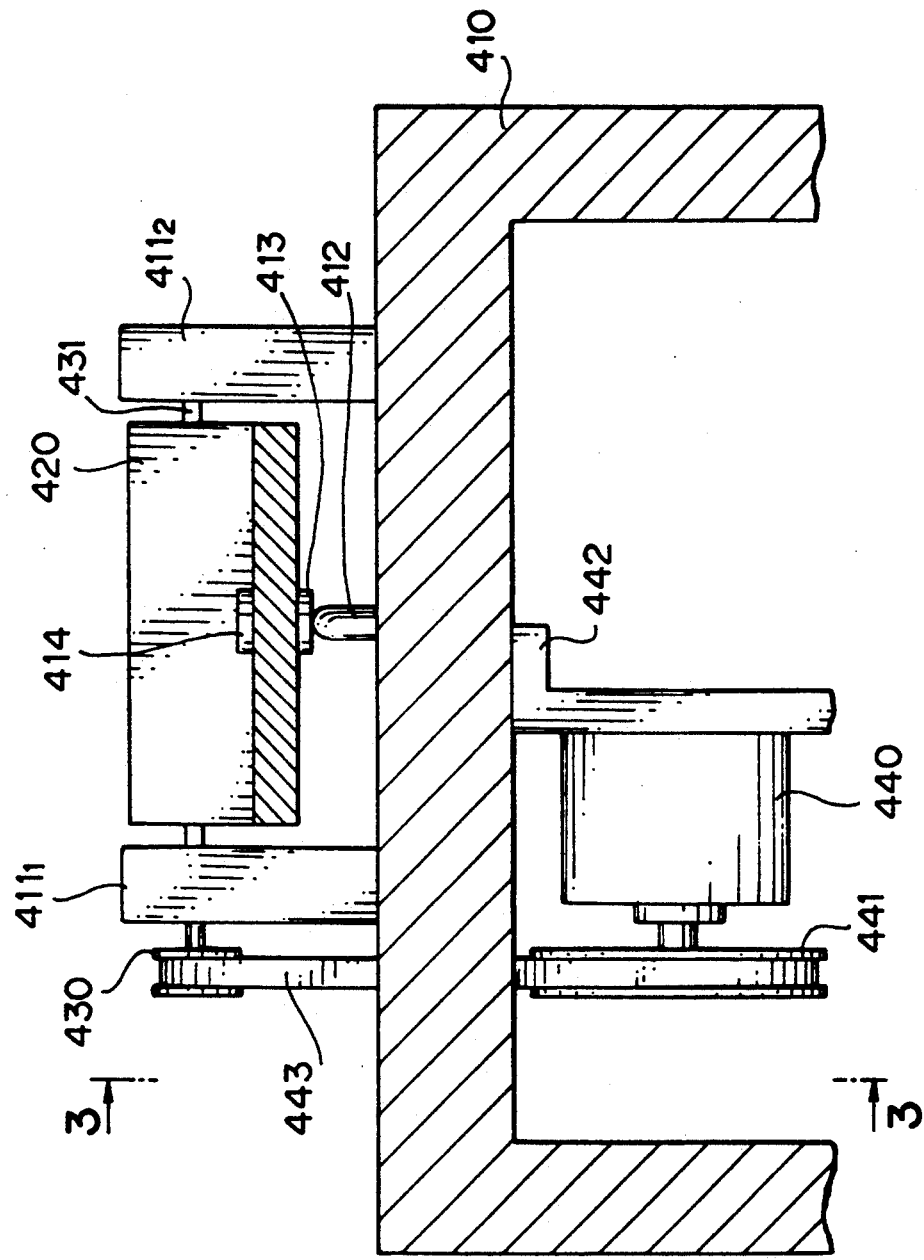

As shown in FIGS. 9(A) and 9(B), in the reverse unit 400, two opposing vertical support members $411_1$ and $411_2$ are arranged on the upper surface of a base 410. A first abutting pin 412 is formed on the upper surface of the base 410 between the vertical support members $411_1$ and $411_2$, and a second abutting pin 415 (FIG. 9(B)) is arranged on the upper surface of the base 410 behind the first abutting pin 412 in FIG. 9(A). A rotating shaft 431 is rotatably and axially supported by internal bearings (not shown) of the vertical support members $411_1$ and $411_2$, and a pulley 430 is fixed to the distal end of the rotating shaft 431 on the side of the vertical support member $411_1$. The rotating shaft 431 between the vertical support members $411_1$ and $411_2$ is fixed to a stationary portion $420_1$ of an L-shaped reverse arm 420.

A lower receiving portion 413 and an upper receiving portion 414 are formed on the two surfaces of an arm portion $420_2$ of the reverse arm 420. The lower receiving portion 413 abuts against the first abutting pin 412 in a forward rotation state of the reverse arm 420 indicated by a solid line in FIG. 9(B) so as to maintain the arm portion $420_2$ of the reverse arm 420 to be parallel to the base 410, thus maintaining top plate receiving jigs $450_1$ to $450_4$ (to be described later) in a transfer state of the top plates $10_1$ and $10_2$ with the first auto hand 200. The upper receiving portion 414 abuts against the second abutting pin 415 in a reverse rotation state of the reverse arm 420 indicated by an alternate long and short dashed line in FIG. 9(B) so as to maintain the arm portion $420_2$ of the reverse arm 420 to be parallel to the base 410, thus maintaining the top plate receiving jigs $450_1$ to $450_4$ in a transfer state of the top plates $10_1$ and $10_2$ with the pitch-inclination conversion unit 500 (to be described later).

Figure 9C:
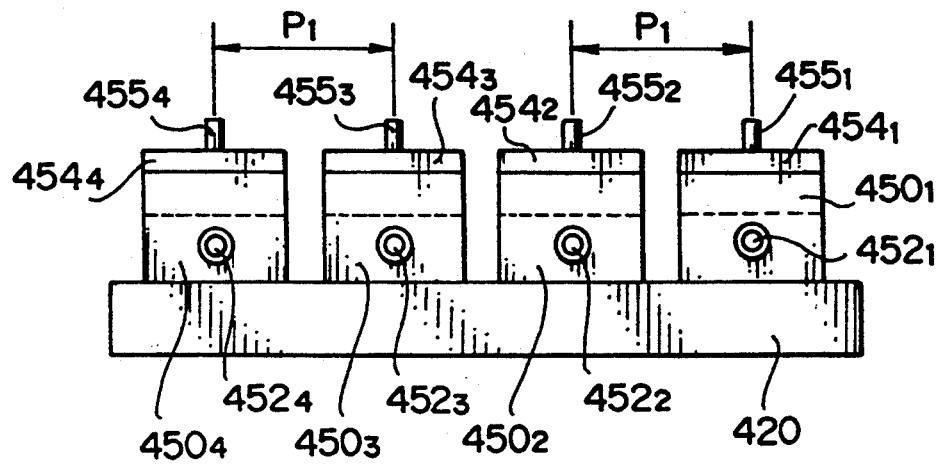

As shown in FIG. 9(C), the four top plate receiving jigs $450_1$ to $450_4$ are fixed to the distal end portion, on the side opposite to the stationary portion $420_1$, of the arm portion $420_2$ of the reverse arm 420. The two top plate receiving jigs $450_1$ and $450_2$ as a pair of first work receiving jigs are used for receiving the non-processed top plates $10_1$ and $10_2$ from the first auto hand 200, and the two remaining top plate receiving jigs $450_3$ and $450_4$ as a pair of second work receiving jigs are used for transferring the processed top plates $10_1$ and $10_2$ to the first auto hand 200. Note that the pitch between the top plate receiving jigs $450_1$ and $450_2$, and the pitch between the top plate receiving jigs $450_3$ and $450_4$ are set to be the first pitch $P_1$.

Figure 9D:
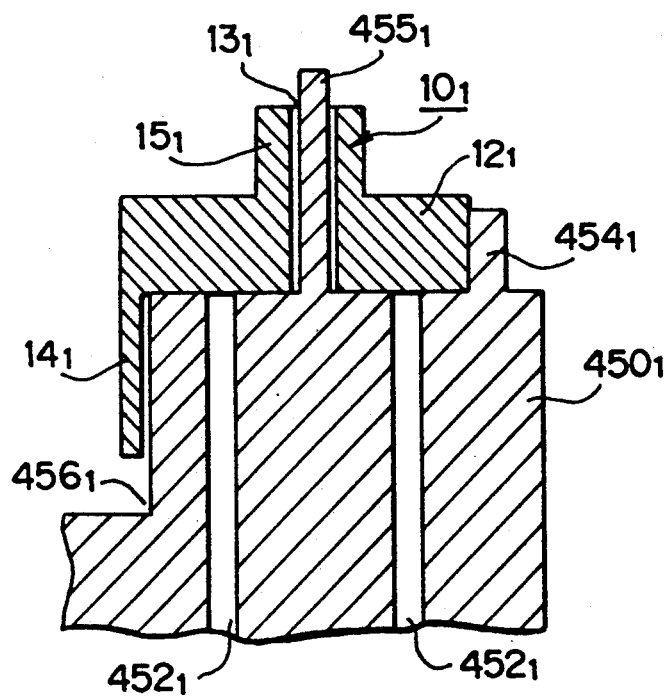

As shown in FIG. 9(D), the top plate receiving jig $450_1$ has a stepped portion $456_1$, a holding shaft $455_1$, and a projection $454_1$, and the top plate $10_1$ is held by the jig $450_1$ with the surface to be processed facing down, in such a manner that the planar member $14_1$ extends along the stepped portion $456_1$, the ink supply hole $13_1$ is fitted on the holding shaft $455_1$, and the surface, opposite to the planar member $14_1$, of the top member $12_1$ abuts against the projection $454_1$. A suction tube $452_1$ for communicating a chucking surface (a surface contacting the surface to be processed of the top plate $10_1$) of the top plate receiving jig $450_1$ with a vacuum source (not shown) is arranged in the top plate receiving jig $450_1$. The top plate $10_1$ is held by chucking its surface to be processed by vacuum suction. The same applies to the three remaining top plate receiving jigs $450_2$ ti $450_4$.

As shown in FIG. 9(A), a motor mounting member 442 is fixed to the lower surface of the base 410, and a motor 440 is mounted on the motor mounting member 442. In order to convert rotation of the motor 440 into a reverse motion of the reverse arm 420, a driving pulley 441 is coupled to the rotating shaft of the motor 440, and a belt 443 is looped between the driving pulley 441 and the pulley 430. Although not shown, a through hole for allowing the belt 443 to extend therethrough is formed in the base 410.

(E) Pitch-inclination Conversion Unit 500

The pitch-inclination conversion unit 500 simultaneously receives, from the reverse unit 400, the non-processed top plates $10_1$ and $10_2$ which are separated at the first pitch $P_1$ with their surfaces to be processed facing up in a horizontal state. Thereafter, the unit 500 converts the pitch between the top plates $10_1$ and $10_2$ into the second pitch $P_2$, and inclines the surfaces to be processed of the top plates $10_1$ and $10_2$ at a predetermined angle. When the second convey robot 200 (to be described later) simultaneously receives the non-processed top plates $10_1$ and $10_2$, the unit 500 simultaneously receives, from the second convey robot 200, the processed top plates $10_1$ and $10_2$ which are separated at the second pitch $P_2$ with their processed surfaces facing up in an inclined state. Thereafter, the unit 500 sets the processed surfaces of the top plates in a horizontal state, and then converts the pitch between the top plates $10_1$ and $10_2$ into the first pitch $P_1$. Therefore, the pitch-inclination conversion unit 500 has a pitch conversion function and an inclination conversion function.

(a) Pitch Conversion Function

The pitch conversion function includes a function of converting the pitch between the two non-processed top plates $10_1$ and $10_2$ received from the reverse unit 400 from the first pitch $P_1$ into the second pitch $P_2$, and a function of converting the pitch between the two processed top plates $10_1$ and $10_2$ received from a second auto hand 710 (to be described later) from the second pitch $P_2$ into the first pitch $P_1$.

Figure 10A:
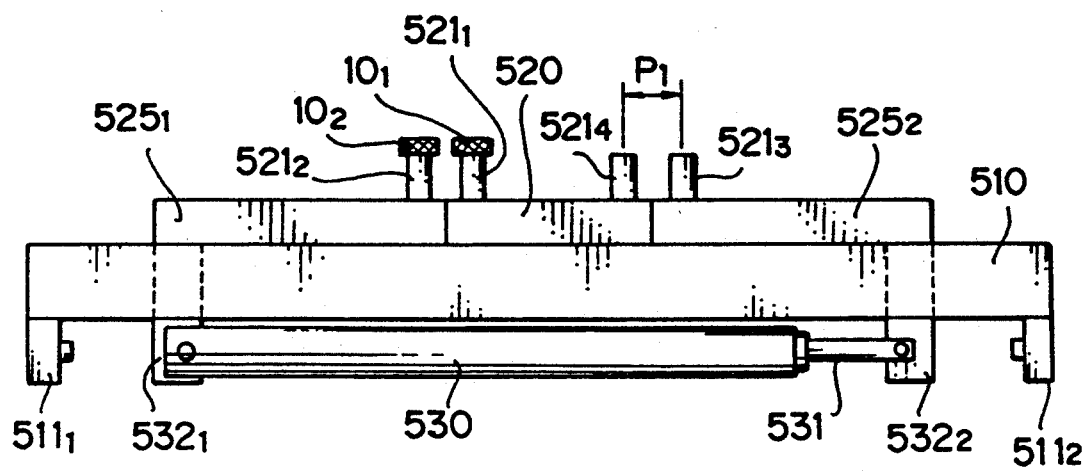

As shown in FIG. 10(A), a pitch conversion function section of the pitch-inclination conversion unit 500 comprises a base 510, first and second stopper members $511_1$ and $511_2$ fixed to the two ends of the base 510 in its longitudinal direction (lateral direction in FIG. 10(A)), and extending downward in FIG. 10(A), a stationary portion 520 fixed to the central portion of the base 510 in its longitudinal direction, first and second slide members $525_1$ and $525_2$ arranged on the base 510 to be respectively slidable in the left and right directions in FIG. 10(A) along the upper surface of the base 510, first and second leg portions $532_1$ and $532_2$ integrally formed on the ends, opposite to the stationary portion 520, of the slide members $525_1$ and $525_2$, and opposing the stopper members $511_1$ and $511_2$ to extend via through holes (not shown) of the base 510, and a pitch conversion cylinder 530 in which one end of its main body is fixed to the first leg portion $532_1$, and the distal end of a piston 531 is fixed to the second leg portion $10_2$.

The stationary portion 520 has a receiving member $521_1$ for receiving the non-processed top plate $10_1$ from the reverse unit 400, and a receiving member $521_4$ for receiving the processed top plate $10_2$ from the second auto hand 710. The first slide member $525_1$ has a receiving member $521_2$ for receiving the non-processed top plate $10_2$ from the reverse unit 400, and the second slide member $525_2$ has a receiving member $521_3$ for receiving the processed top plate $10_1$ from the second auto hand 710. More specifically, the two receiving members $521_1$ and $521_2$ constitute a pair of receiving members (a pair of first work receiving members), and the two remaining receiving members $521_3$ and $521_4$ constitute another pair of receiving members (a pair of second work receiving members).

The arranging pitches of the four receiving members $521_1$ to $521_4$ are set, so that the pitch between the receiving members $521_1$ and $521_2$, and the pitch between the receiving members $521_3$ and $521_4$ are equal to the first pitch $P_1$ when the slide members $525_1$ and $525_2$ abut against the stationary portion 520, as shown in FIG. 10(A). The lengths of the slide members $525_1$ and $525_2$ are set, so that the pitch between the receiving members $521_1$ and $521_2$, and the pitch between the receiving members $521_3$ and $521_4$ are equal to the second pitch $P_2$ when the leg portions $532_1$ and $532_2$ of the slide members $525_1$ and $525_2$ respectively abut against the first and second stopper members $511_1$ and $511_2$. More specifically, the first and second stopper members $511_1$ and $511_2$ serve as slide amount regulating means for regulating the slide amounts of the slide members $525_1$ and $525_2$ to an amount corresponding to the difference between the second and first pitches $P_2$ and $P_1$.

Figure 10B:
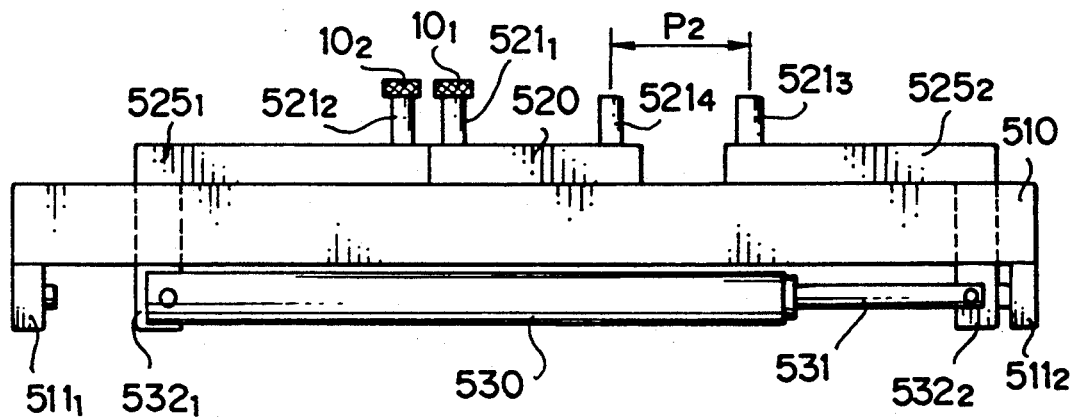
Figure 10C:
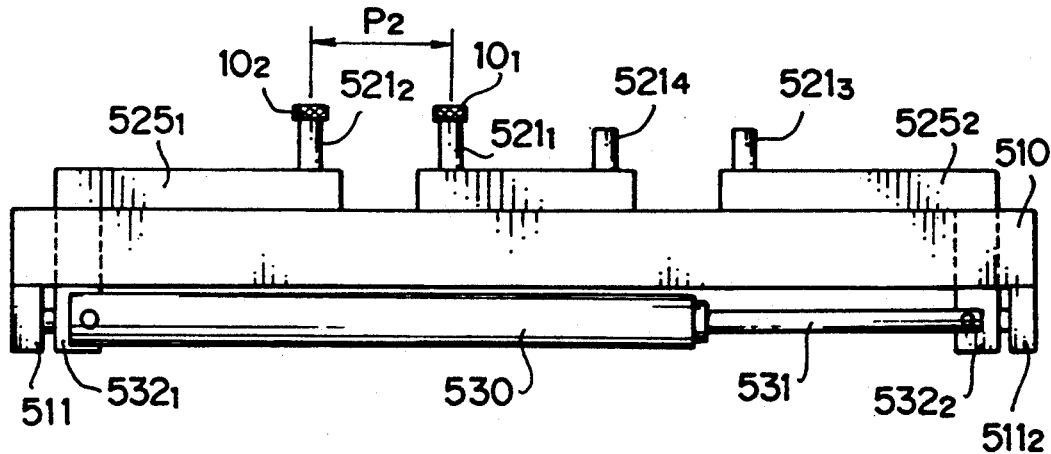
Figure 10E:
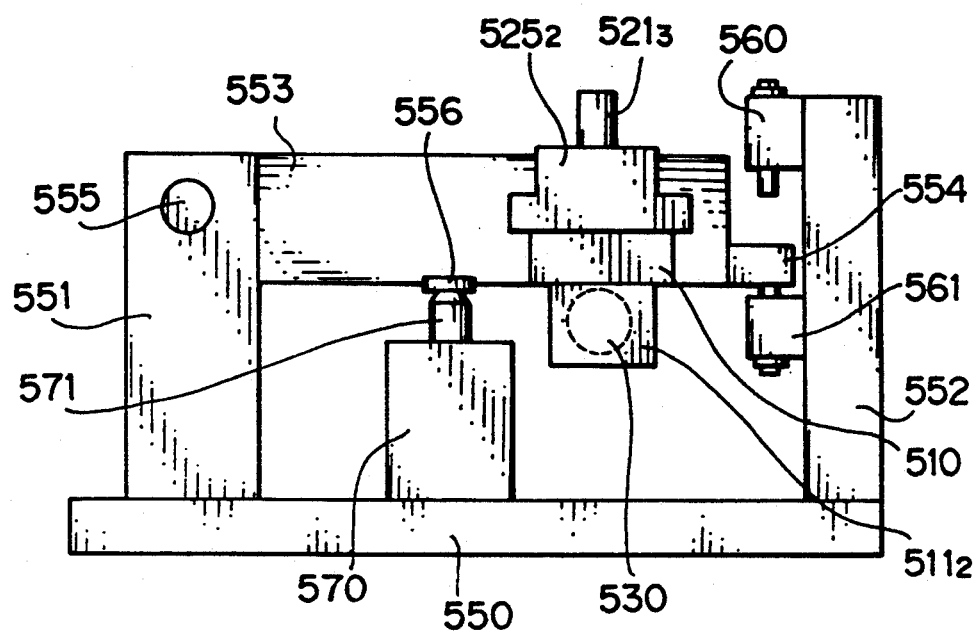

As shown in FIG. 10(E), a hole for receiving the projection member $15_1$ of the top plate $10_1$ and a holding shaft $581_1$ inserted in the ink supply hole $13_1$ of the top plate $10_1$ when the top plate $10_1$ is chucked and held are formed on the upper surface (a surface on which the non-processed top plate $10_1$ is chucked) of the receiving member $521_1$. In order to chuck the chucking surface of the top plate $10_1$ by vacuum suction, a suction tube $580_1$ open to the upper surface of the receiving member $521_1$ is arranged in the receiving member $521_1$. The same applies to the three remaining receiving members $521_2$ to $521_4$.

The pitch conversion operation of the pitch conversion function section is performed as follows.

When the two non-processed top plates $10_1$ and $10_2$ are received from the reverse unit 400, the pitch between the receiving members $521_1$ and $521_2$, and the pitch between the receiving members $521_3$ and $521_4$ are set to be equal to the first pitch $P_1$, as shown in FIG. 10(A). Upon completion of reception of the top plates $10_1$ and $10_2$, the controller 800 (to be described later) outputs a drive signal to the pitch conversion cylinder 530, and the piston 531 is extended toward the second stopper member $511_2$. At this time, the second slide member $525_2$ integrally having the second leg portion $532_2$ is slid toward the second stopper member $511_2$. As shown in FIG. 10(B), when the second leg portion $532_2$ abuts against the second stopper member $511_2$, the main body of the pitch conversion cylinder 530 is moved toward the first stopper member $511_1$ upon reception of counterforces from the piston 531 and the second stopper member $511_2$. At this time, the first slide member $525_1$ integrally having the first leg portion $532_1$ is slid toward the first stopper member $511_1$ until the first leg portion $532_1$ abuts against the first stopper member $511_1$ (FIG. 10(C)). As a result, the two pitches are converted into the second pitch $P_2$.

On the other hand, when the two processed top plates $10_1$ and $10_2$ are received from the second auto hand 710, the two pitches are equal to the second pitch $P_2$, as shown in FIG. 10(C). Upon completion of reception of the top plates $10_1$ and $10_2$, the controller 800 (to be described later) outputs a drive signal to the pitch conversion cylinder 530, and the piston 531 is retracted. In addition, the second slide member $525_2$ is slid toward the stationary portion 520. When the second slide member $525_2$ abuts against the stationary portion 520, the main body of the pitch conversion cylinder 530 is moved toward the second stopper member $511_2$ upon reception of counterforces from the second slide member $525_2$ and the stationary portion 520, and the first slide member $525_1$ is slid toward the stationary portion 520 until it abuts against the stationary portion 520. As a result, the above-mentioned two pitches are converted into the first pitch $P_1$.

(b) Inclination Conversion Function

The inclination conversion function includes a function of converting the inclination angle of the two non-processed top plates $10_1$ and $10_2$ received from the reverse unit 400 from a horizontal state to a predetermined angle (an inclination angle of the work station 606 of the laser process machine 600 (to be described later)), and a function of converting the inclination angle of the two processed top plates $10_1$ and $10_2$ from the predetermined angle to the horizontal state.

Figure 10D:
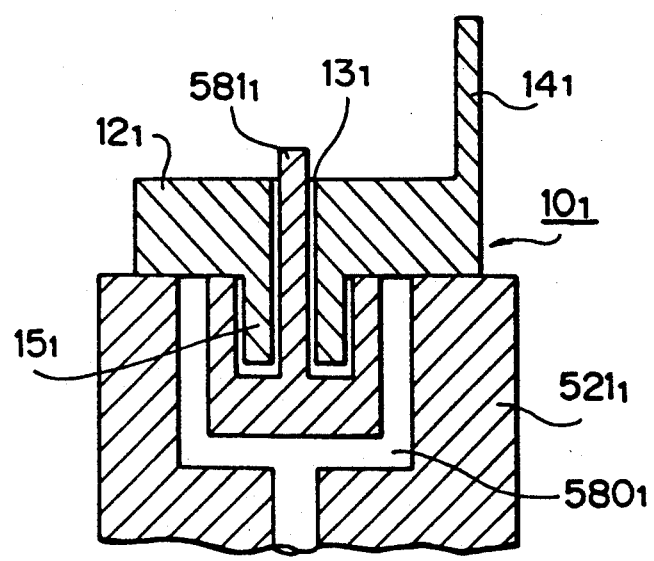

As shown in FIG. 10(D), an inclination conversion function section comprises a horizontal substrate 550, a support member 551 arranged on the left side (FIG. 10(D)) of the horizontal substrate 550, a vertical substrate 552 arranged on the right side (FIG. 10(D)) of the horizontal substrate 550, a shaft 555 which is rotatably and axially supported on the upper portion of the support member 551 via a bearing (not shown), an inclination arm 553 which is fixed to the shaft 555 to be perpendicular to the support member 551, and has a free end on the side of the vertical substrate 552, a pawl 554 fixed to the free end of the inclination arm 553, a lower stopper 561, attached to the vertical substrate 552, for maintaining the inclination arm 553 in the horizontal state, an upper stopper 560, attached to the vertical substrate 552, for regulating the inclination angle of the inclination arm 553, and an inclination conversion cylinder 570 which is arranged on the horizontal substrate 550, so that a piston 571 thereof abuts against a receiving portion 556 mounted on the inclination arm 553.

The upper and lower stoppers 560 and 561 serve as rotational angle regulating means for regulating the rotational angle of the inclination arm 553.

The base 510 of the pitch conversion function section is held at a position between the receiving portion 556 and the free end of the inclination arm 553.

The inclination conversion operation of the inclination conversion function section is performed as follows.

When the above-mentioned pitch conversion operation is performed after the two non-processed top plates $10_1$ and $10_2$ are received from the reverse unit 400, the inclination arm 553 is maintained in the horizontal state, as shown in FIG. 10(D). Upon completion of the pitch conversion operation, the controller 800 outputs a drive signal to the inclination conversion cylinder 570, and the piston 571 is extended. Thus, the inclination arm 553 is pivoted until the pawl 554 abuts against the upper stopper 560. As a result, the receiving members $521_1$ to $521_4$ of the pitch conversion function section are inclined at the predetermined angle with respect to the horizontal substrate 550, and in this state, the top plates $10_1$ and $10_2$ are transferred to the second auto hand 710.

On the other hand, when the processed top plates $10_1$ and $10_2$ are received from the second auto hand 710, the inclination arm 553 is set in a pushed-up state (more specifically, the receiving members $521_1$ and $521_2$ are inclined at the predetermined angle with respect to the horizontal substrate 550). Upon completion of reception of the processed top plates $10_1$ and $10_2$, the controller 800 outputs a drive signal to the inclination conversion cylinder 570, and the piston 571 is retracted. Thus, the inclination arm 553 is pivoted until the pawl 554 abuts against the lower stopper 561. As a result, the receiving members $521_1$ to $521_4$ are set in the horizontal state, and in this state, the processed top plates $10_1$ and $10_2$ are transferred to the reverse unit 400.

(F) Second Convey Robot 700

The second convey robot 700 receives, from the pitch-inclination conversion unit 500, the non-processed top plates $10_1$ and $10_2$ which are separated at the second pitch $P_2$ with their surfaces to be processed facing up in an inclined state, and thereafter, conveys them to the laser process machine 600. The robot 700 also receives, from the work station 606 of the laser process machine 600, the processed top plates $10_1$ and $10_2$ which are separated at the second pitch $P_2$ with their surfaces to be processed facing up in an inclined state, and conveys them to the next unit.

As shown in FIG. 6, the second convey robot 700 comprises a second X-axis arm 701 fixed to a base (not shown), a second Y-axis arm 702 which is movably supported by the second X-axis arm 701, and is reciprocally moved in the X-direction in FIG. 6 by a second X-axis drive means (not shown), a second Z-axis arm 703 which is movably supported by the second Y-axis arm 702, and is reciprocally moved in the Y-direction in FIG. 6 by a second Y-axis drive means (not shown), and the second auto hand 710 attached to the second Z-axis arm 703.

Figure 11A:
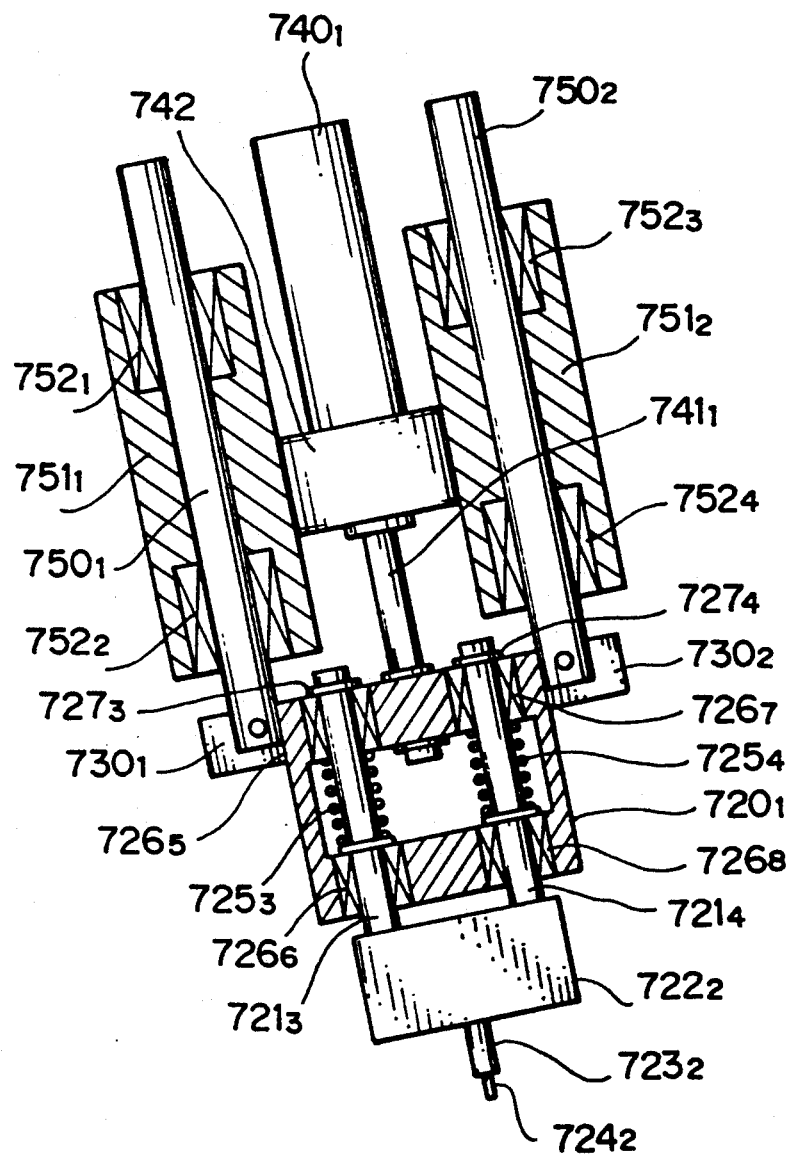
Figure 11C:
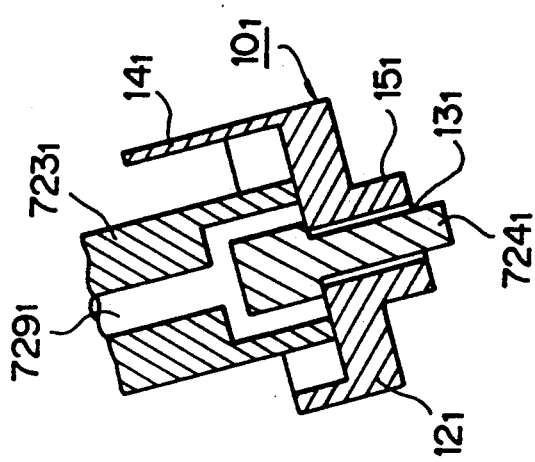
Figure 11B:
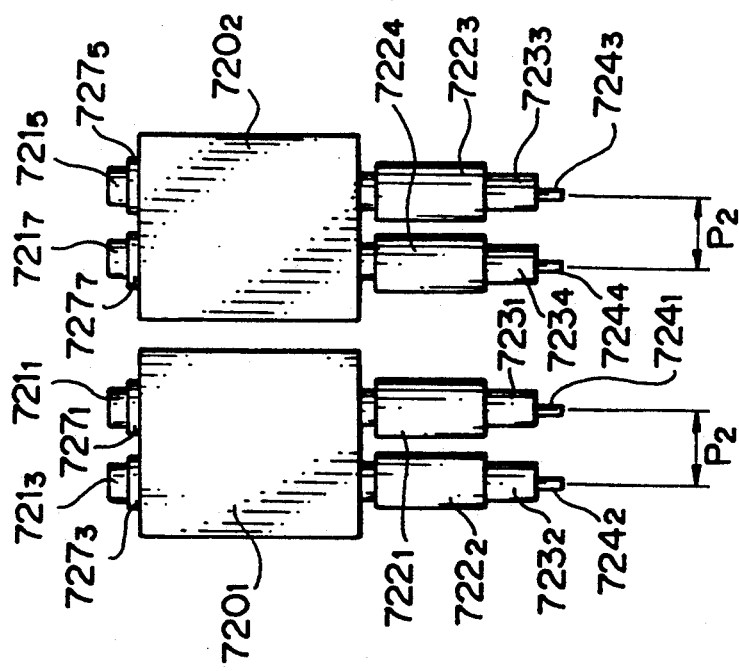

As shown in FIG. 11(B), a chucking/holding section of the second auto hand 710 is divided into a first chucking/holding section for receiving the two non-processed top plates $10_1$ and $10_2$ from the pitch-inclination conversion unit 500, and conveying them to the laser process machine 600, and a second chucking/holding section for receiving the two processed top plates $10_1$ and $10_2$ from the laser process machine 600, and conveying them to the pitch-inclination conversion unit 500.

The first chucking/holding section comprises a main body block $720_1$, two fingers $723_1$ and $723_2$, movable blocks $722_1$ and $722_2$ to which the fingers $723_1$ and $723_2$ are respectively attached, slide shafts $721_1$ to $721_4$, lower ends of two each of which are fixed to the corresponding movable blocks $722_1$ and $722_2$ (the slide shaft $721_2$ is arranged on the rear surface side of FIG. 11(B) of the slide shaft $721_1$). Note that two finger insertion portions $724_1$ and $724_2$, which are respectively inserted in the ink supply holes $13_1$ and $13_2$ of the non-processed top plates $10_1$ and $10_2$ when these plates are chucked and held, are respectively arranged on the distal ends of the two fingers $723_1$ and $723_2$. The second chucking/holding section has the same arrangement as described above.

The pitch between the fingers $723_1$ and $723_2$ and the pitch between the fingers $723_3$ and $723_4$ are set to have the second pitch $P_2$.

As shown in FIG. 11(A), a space is formed in the main body block $720_1$, and springs $725_3$ and $725_4$, in which the slide shafts $721_3$ and $721_4$ are inserted, for normally biasing the two slide shafts $721_3$ and $721_4$, whose lower ends are fixed to the movable block $722_2$, toward the finger $723_2$ are clamped between the upper and lower surfaces (FIG. 11(A)) of the space. Through holes for allowing the slide shafts $721_3$ and $721_4$ to extend therethrough are formed in the upper and lower surfaces of the main body block $720_1$, and second bearings $726_5$ to $726_8$ for axially supporting the slide shafts $721_3$ and $721_4$ are provided to the through holes. Stoppers $727_3$ and $727_4$ are respectively provided to the upper ends of the slide shafts $721_3$ and $721_4$, thereby regulating moving amounts of the slide shafts $721_3$ and $721_4$ toward the finger $723_2$ by the biasing forces of the springs $725_3$ and $725_4$. Although not shown, springs $725_1$ and $725_2$, in which the slide shafts $721_1$ and $721_2$ are inserted, for normally biasing the two slide shafts $721_1$ and $721_2$, whose lower ends are fixed to the movable block $722_1$, toward the finger $723_1$ are clamped between the upper and lower surfaces (FIG. 11(A)) of the space.

Through holes for allowing the slide shafts $721_1$ and $721_2$ to extend therethrough are formed in the upper and lower surfaces of the main body block $720_1$, and second bearings $726_1$ to $726_4$ for axially supporting the slide shafts $721_1$ and $721_2$ are provided to the through holes. Stoppers $727_1$ and $727_2$ are respectively provided to the upper ends of the slide shafts $721_1$ and $721_2$, thereby regulating moving amounts of the slide shafts $721_1$ and $721_2$ toward the finger $723_1$ by the biasing forces of the springs $725_1$ and $725_2$. The same applies to the main body block $720_2$ (FIG. 11(B)).

As shown in FIG. 11(C), a suction tube $729_1$ for chucking and holding the top plate $10_1$ is arranged in the finger $723_1$. In order to chuck the surface to be processed of the top plate $10_1$, the suction tube $729_1$ is branched into two portions inside the finger $723_1$, and the branched portions are open to the distal end face of the finger $723_1$, which contacts the surface to be processed of the top plate $10_1$. The same applies to the remaining fingers $723_2$ to $723_4$.

As shown in FIG. 11(A), the second auto hand 710 is attached to the second Z-axis arm 703 (FIG. 6) to have the predetermined angle via a mounting member (not shown). The central portion of the upper surface of the main body block $720_1$ is supported by a rod $741_1$ of a first cylinder $740_1$ held by a cylinder holding member 742, and vertical movable members $730_1$ and $730_2$ attached to the two upper side surfaces of the main body block $720_1$ are supported by two slide guide shafts $750_1$ and $750_2$ which are respectively axially supported by first bearings $752_1$ to $752_4$ two each of which are respectively arranged in holding members $751_1$ and $751_2$. Thus, the first chucking/holding section is movable in the direction of the rod $741_1$ in accordance with a drive operation of the first cylinder $740_1$. The two ends of the cylinder holding member 742 are fixed to the two holding members $751_1$ and $751_2$. The second chucking/holding section is similarly movable in the same direction as the first chucking/holding section in accordance with a drive operation of a second cylinder $740_2$ (not shown) attached to the main body block $720_2$.

(G) Laser Process Machine 600

Figure 12:
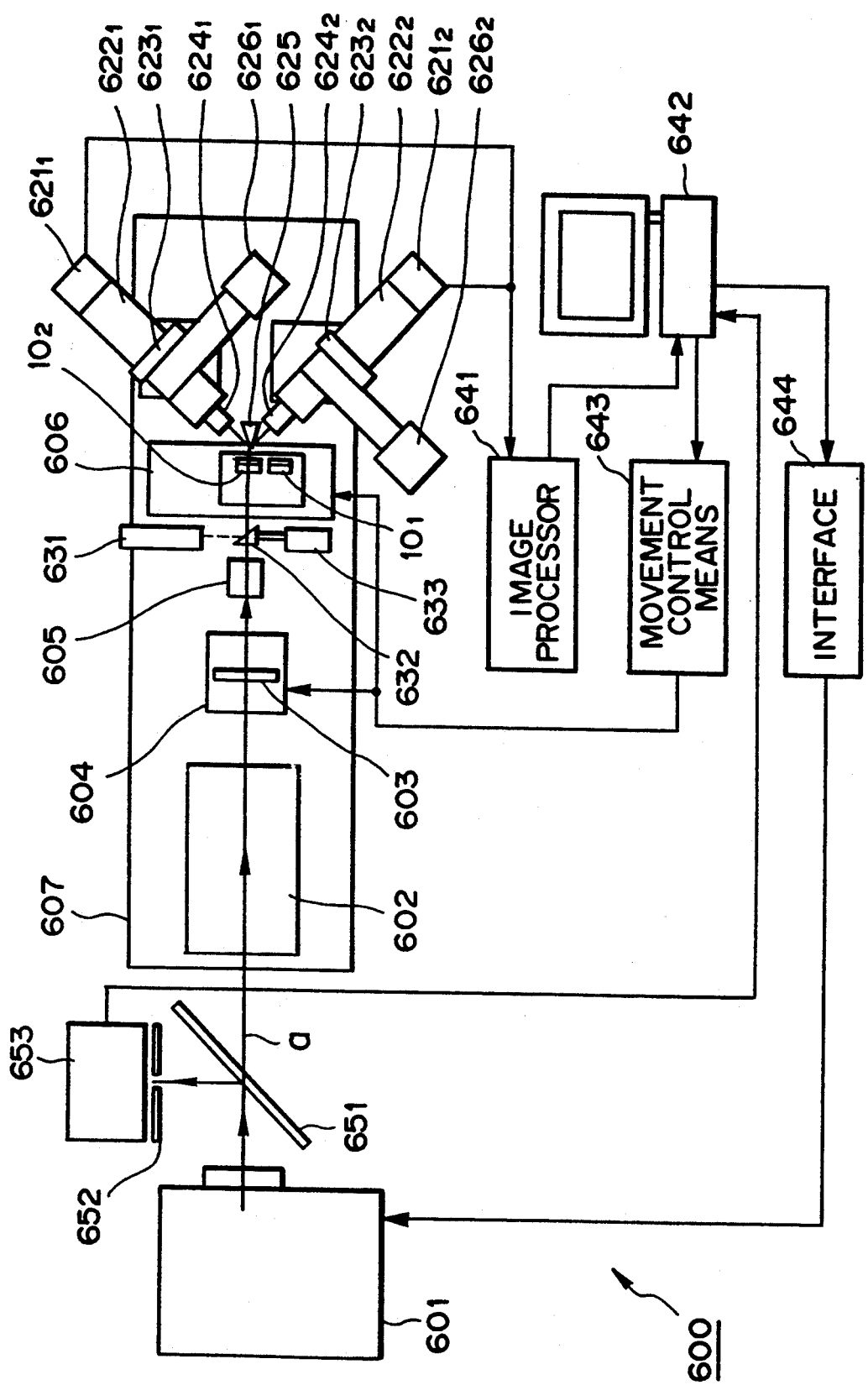
FIG. 12 is a schematic diagram showing an arrangement of a laser process machine shown in FIG. 5.

As shown in FIG. 12, the laser process machine 600 comprises an illumination optical system, a process system, a measurement system, and a control system.

The illumination optical system comprises an excimer laser 601 for emitting ultraviolet rays, and a beam shaping optical unit 602 and a projection lens 605, which are placed on a unit frame 607 arranged along an optical axis a of the ultraviolet rays emitted from the excimer laser 601.

The excimer laser 601 is a laser which can oscillate ultraviolet rays, and has the following merits.
(I) High-intensity energy output
(II) Good monochromatic characteristics
(III) Good directivity
(IV) Short-pulse oscillation
(V) High energy density upon focusing by lens More specifically, the excimer laser 601 comprises a Kr-F laser, an Xe-Cl laser, an Ar-F laser, or the like, which can oscillate ultraviolet short pulses (15 to 35 ns) upon excitation of a gas mixture of a rare gas and a halogen by discharging, and has an oscillation energy of several hundreds of mJ/pulse, and a pulse repetition frequency of 30 to 1,000 Hz.

The beam shaping optical unit 602 comprises a beam shaping optical system, a fly eye lens for Kölher illumination, and a field lens. The unit 602 uniformly radiates ultraviolet rays emitted from the excimer laser 601 onto a plurality of microholes formed in a mask 603 (to be described later; arranged between the beam shaping optical unit 602 and the projection lens 605 along the optical axis a), and focuses the rays on a lens entrance pupil of the projection lens 605.

The lens entrance pupil of the projection lens 605 is set at a position conjugate with an image of a secondary light source focused by the fly eye lens of the beam shaping optical unit 602, and serving as a process-side focal point. The projection lens 605 telecentrically focuses ultraviolet rays emerging from the beam shaping optical unit 602 onto the surfaces to be processed of the top plates $10_1$ and $10_2$, thereby forming a plurality of slots parallel to the optical axis a in the surfaces to be processed. Note that the projection lens 605 preferably comprises a reduction lens in consideration of the durability of the mask 603.

The process system comprises a mask holding table 604 and the work station 606, which are placed on the unit frame 607.

The mask holding table 604 is arranged between the beam shaping optical unit 602, and the projection lens 605, and holds the mask 603 to form a right angle with the optical axis a.

The work station 606 is arranged on the side, opposite to the mask holding table 604, of the projection lens 605 so as to be horizontally movable in a direction perpendicular to the optical axis a. The two top plates $10_1$ and $10_2$ are aligned at the second pitch $P_2$ in a direction perpendicular to the optical axis a, so that their surfaces to be processed form a right angle with the optical axis a. Note that a plurality of slots are formed in the surfaces to be processed of the top plates $10_1$ and $10_2$ by the ultraviolet rays emitted from the excimer laser 601.

The measurement system comprises three measurement systems, i.e., an output measurement system for measuring an output from the excimer laser 601, an optical axis measurement system for measuring an offset of the optical axis a of the ultraviolet rays emitted from the excimer laser 601, and a position measurement system for measuring offsets of positions of the slots formed in the top plates $10_1$ and $10_2$.

The output measurement system comprises a beam splitter 651, inserted between the excimer laser 601 and the beam shaping optical unit 602 upon measurement, for reflecting ultraviolet rays emitted from the excimer laser 601 upward (FIG. 12) at a right angle, and a sensor 653, having a mask 652, for receiving the reflected ultraviolet rays.

The optical axis measurement system comprises a light source 631 for emitting measurement light in a direction perpendicular to the optical axis a upon measurement, and a mirror 632, inserted between the projection lens 605 and the work station 606 by an air cylinder 633 upon measurement, for reflecting the measurement light toward the work station 606 at a right angle to cause the light to propagate along the optical axis a. Upon measurement of the offset of the optical axis a, dummy works formed of a light-transmission resin like the top plates $10_1$ and $10_2$ are mounted on the work station 606, the ultraviolet rays are emitted from the excimer laser 601 to form slots in the dummy works, and thereafter, the measurement light is then radiated on the dummy works, thus measuring the positions of the slots by the position measurement system (to be described later).

The position measurement system comprises a first position measurement device arranged in an upper 45° direction (FIG. 12) with respect to the optical axis a, a second position measurement device arranged in a lower 45° direction (FIG. 12), and a two-surface mirror 625 arranged between the two position measurement devices along the optical axis a. The first position measurement device comprises a television camera $621_1$ used as a sensor, a lens barrel $622_1$, an auto-focusing means $623_1$, an objective lens $624_1$, and an illumination optical device $626_1$. The second position measurement device has the same arrangement as described above. The two-surface mirror 625 reflects light (the measurement light emitted from the light source 631) incident from the direction of the optical axis a in the directions of the two position measurement devices, and reflects illumination light components emitted from the illumination optical devices $626_1$ and $626_2$ in a direction parallel to the optical axis a, thus causing these light components to illuminate a range up to the upper end (FIG. 12) of the top plate $10_2$ half and half.

In this position measurement system, when light emitted from the light source 631 and transmitted cameras $621_1$ and $621_2$, the positions of nozzles of the top plate $10_2$ can be measured. When illumination light components emitted from the illumination optical devices $626_1$ and $626_2$ and reflected by the top plate $10_2$ are received by the television cameras $621_1$ and $621_2$, the dimensions, positions, and the like of the slots formed in the top plate $10_2$ can be measured.

The control system comprises a controller 642, an image processor 641, a movement control means 643, and an interface 644.

The controller 642 executes the following control operations on the basis of the measurement results from the output measurement system, the optical axis measurement system, and the position measurement system.

(a) The controller monitors the output from the excimer laser 601 on the basis of the output signal from the sensor 653, and performs output control of the excimer laser 601 via the interface 644, so as to obtain a uniform output.

(b) When the image processor 641 detects an offset amount of a nozzle position of the top plate $10_2$ from a process position on the basis of the output signals from the television cameras $621_1$ and $621_2$ which received the measurement light emitted from the light source 631, the controller performs the position control of the work station 606 via the movement control means 643 so that the offset amount becomes zero.

(c) The controller causes the image processor 641 to measure slot positions on the basis of the output signals from the television cameras $621_1$ and $621_2$ which received the illumination light components emitted from the illumination optical devices $626_1$ and $626_2$ and reflected by the top plate $10_2$ formed with the slots, thereby obtaining the processed positions of the slots.

The features of the laser process machine 600 will be described below.

(a) The laser process machine 600 utilizes a so-called APD (Ablative Photo-decomposition) process wherein when high-luminance ultraviolet short pulses emitted from the excimer laser 601 are radiated on the surface of a polymer resin, the irradiated portion of the polymer resin is instantaneously decomposed and scattered with plasma light emission and shock noise, thereby forming slots in the polymer resin. For this reason, hole formation precision can be improved as compared to a case wherein a $CO_2$ laser as infrared rays is used. More specifically, when ultraviolet rays are radiated on a PI (polyimide) film using an excimer laser (Kr-F laser), since the light absorption wavelength of the PI film is present in an ultraviolet region, slots can be formed with high precision. However, when a YAG laser whose light absorption wavelength is not present in the ultraviolet region is used, the edge of a slot is roughened. When a $CO_2$ laser is used, craters are formed around the slots. Thus, slots cannot be formed with high precision.

(b) Upon combination of the fly eye lens and the mask 603 used in the beam shaping optical unit 602, a plurality of slots can be formed in the plurality of top plates $10_1$ and $10_2$ using ultraviolet rays split into a plurality of components having a uniform light amount. Thus, operation efficiency of hole formation can be greatly improved.

(c) When ultraviolet rays emitted from the excimer laser 601 are shaped by the beam shaping optical unit 602, the ultraviolet rays can be converged in a direction perpendicular to both the aligning direction of the slots in the top plates $10_1$ and $10_2$, and the direction of the optical axis a of the ultraviolet rays. For this reason, the energy density of ultraviolet rays passing through the microholes formed in the mask 603 can be increased.

Results of an experiment wherein slots were formed in a top plate used in a recording head of an ink-jet recording apparatus using the laser process machine 600 will be explained below.

In this experiment, a top plate consisting of a top member with nozzles formed at a pitch of 70.5 pm and each having a width of 45 $\mu$m and a height of 45 $\mu$m, and a polysulfone planar member having a thickness of 40 to 45 $\mu$m was used, and 64 slots each having a discharge port size of 31 $\mu$m were formed in the planar member of the top plate. Note that the excimer laser used in this experiment was INDEX 200K available from Lumonix Corp., and slots were formed at a laser output of 250 mJ/pulse, a repetition frequency of 200 Hz, and an oscillation time of 2 sec.

Table 1 below summarizes experimental results which compare a difference in process precision between the laser process machine 600 using the excimer laser, and a conventional laser process machine using a $CO_2$ laser by evaluating the average area of slots and the patterns of the slots when the slots were formed in 10 top plates.

TABLE 1

Experimental Results

| Laser | Slot Area | Pattern Evaluation |
|---|---|---|
| Excimer | 750 ±50 $\mu m^2$ | Good |
| $Co_2$ | 750 ±150 $\mu m^2$ | Fair |

As can be seen from the experimental results shown in Table 1, with the laser process machine 600 using the excimer laser, both the variation in slot area, and pattern evaluation can be improved as compared to those of the laser process machine using the $CO_2$ laser. Therefore, in an ink-jet recording apparatus using a recording head including the top plate processed by the laser process machine 600, the discharge amount and the discharge direction of ink droplets can be uniformed, and clear characters and figures free from blurring can be printed, thus improving printing precision.

In order to faithfully reproduce microhole patterns formed in the mask 603 on the top plates $10_1$ and $10_2$, the mask 603 is preferably formed of a thin metal plate (e.g., an SUS material). The mask 603 may be formed of a transparent ceramic or silicon, which is not influenced by the excimer laser 601.

The work station 606 preferably comprises a proper adjusting means for adjusting the directions of the top plates $10_1$ and $10_2$ with respect to the optical axis a of ultraviolet rays emitted from the excimer laser 601. For example, when slots are to be formed in the top plates $10_1$ and $10_2$ used in a recording head of an ink-jet recording apparatus, the work station preferably comprises a stage having a degree of freedom in directions of five axes except for a rotational direction having the aligning direction of slots formed in the top members $12_1$ and $12_2$ of the top plates $10_1$ and $10_2$ as an axis. In this case, adjustments in rotational directions having, as axes, the direction of the optical axis a, and a direction perpendicular to the aligning direction of the slots need not be performed if the top plates $10_1$ and $10_2$ can be precisely aligned on the work station 606. When the center for adjustment of rotation is aligned with the process center of the top plates $10_1$ and $10_2$, control can be simplified.

(H) Controller 800

Figure 13A:
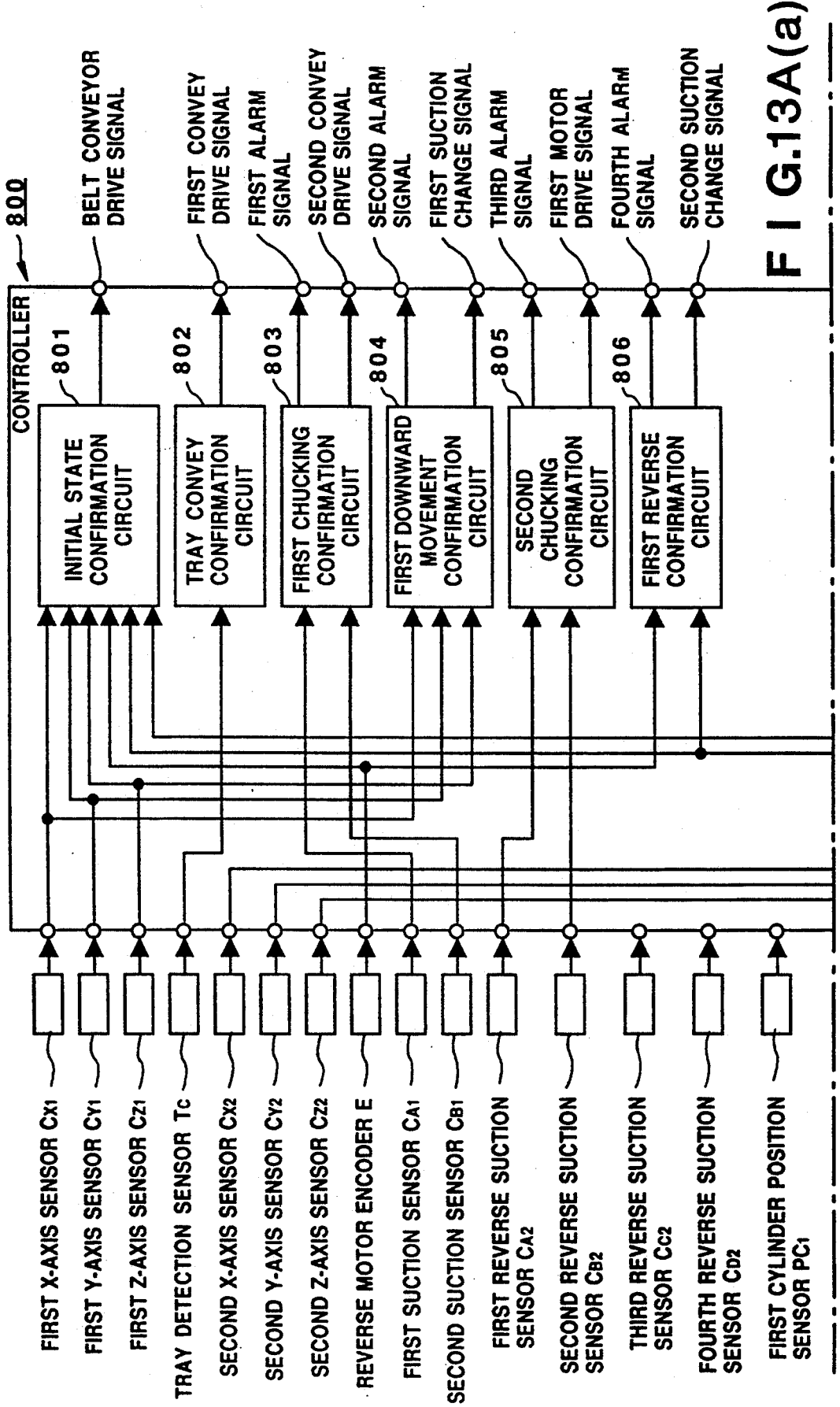
Figure 13A:
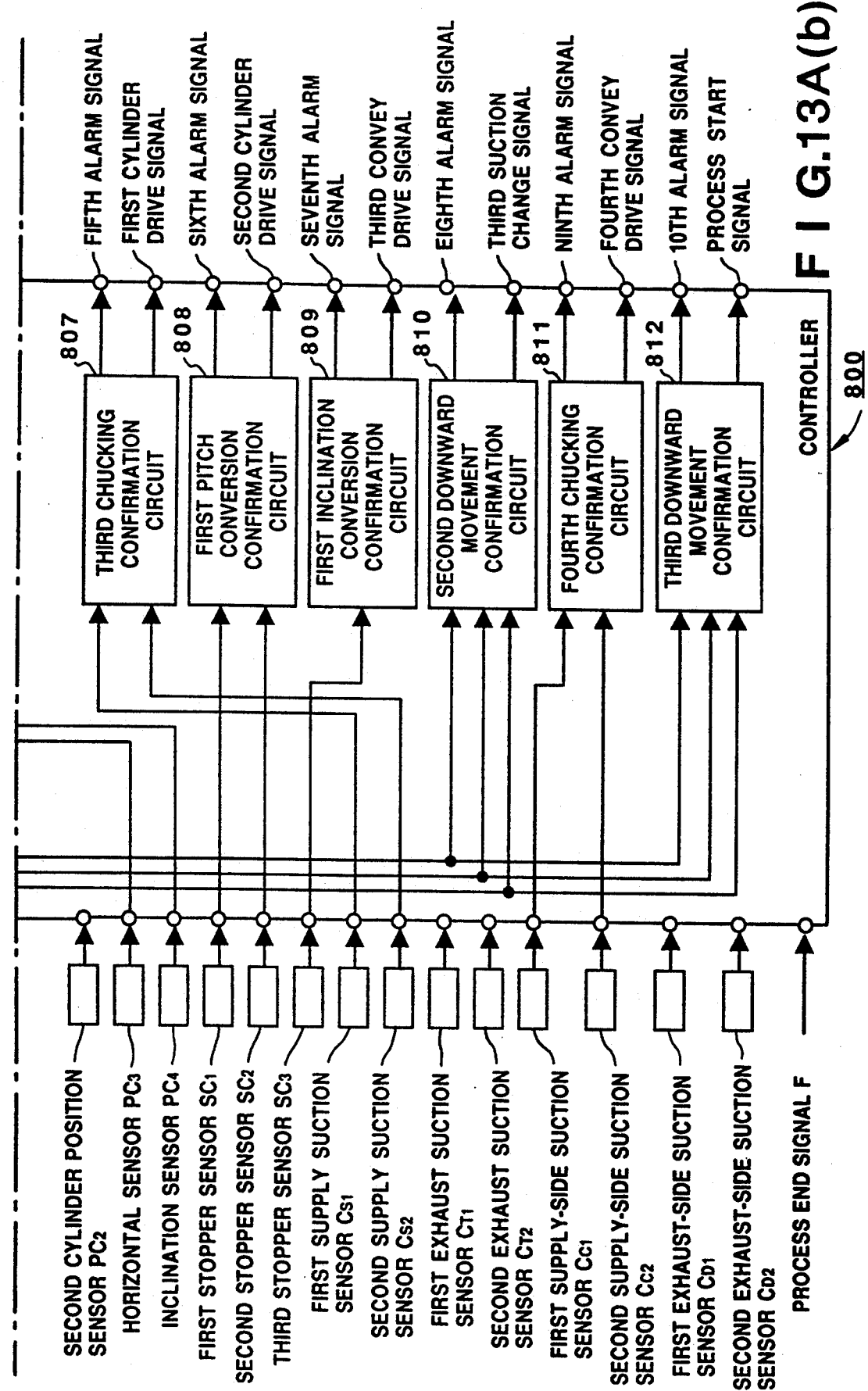
Figure 13B:
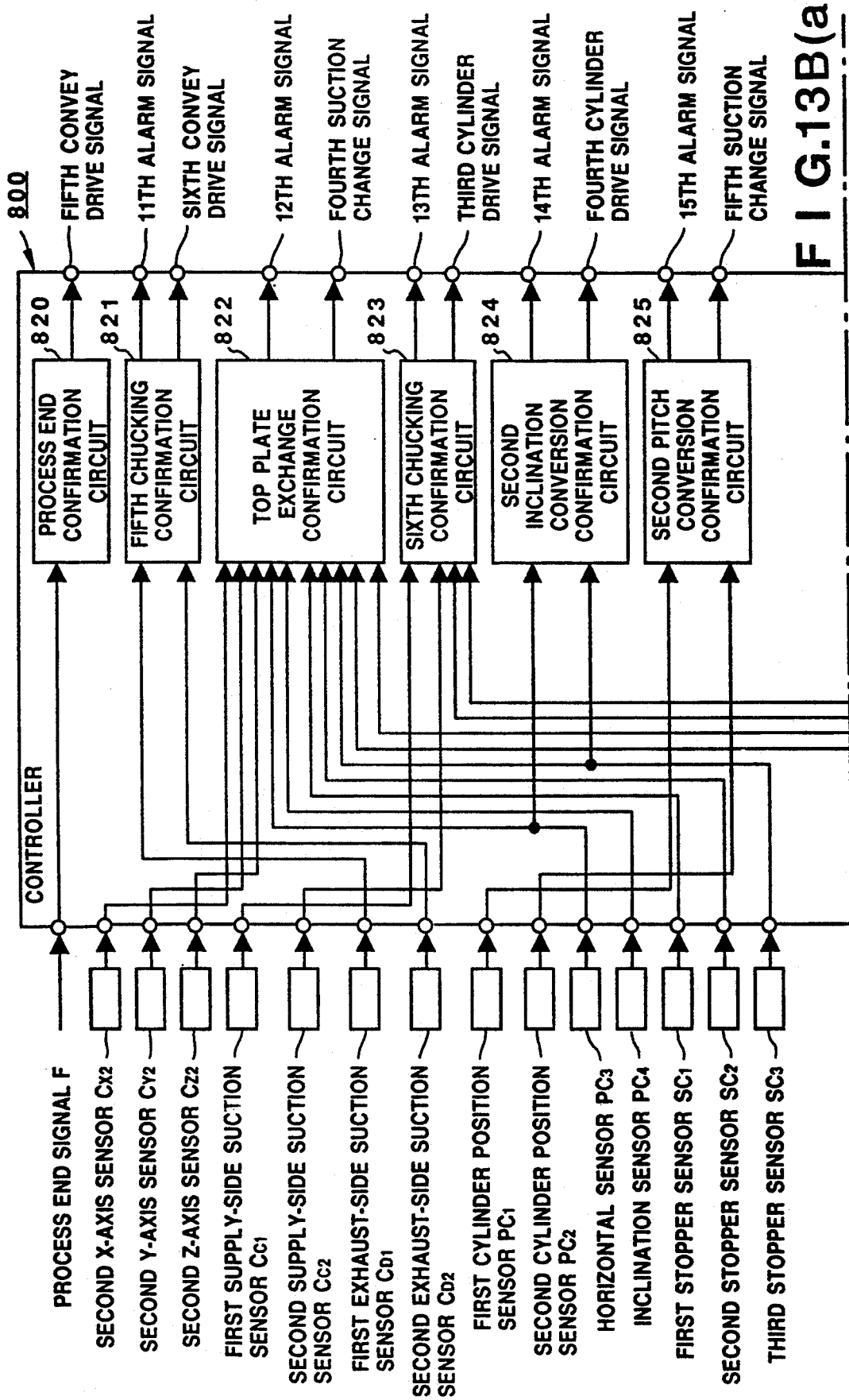
FIG. 13(B) shows connections used when top plates are conveyed from the laser process machine to the tray.

As shown in FIGS. 13(A) and 13(B), the controller 800 comprises an initial state confirmation circuit 801, a tray convey confirmation circuit 802, a first chucking confirmation circuit 803, a first downward movement confirmation circuit 804, a second chucking confirmation circuit 805, a first reverse confirmation circuit 806, a third chucking confirmation circuit 807, a first pitch conversion confirmation circuit 808, a first inclination conversion confirmation circuit 809, a second downward movement confirmation circuit 810, a fourth chucking confirmation circuit 811, a third downward movement confirmation circuit 812, a process end confirmation circuit 820, a fifth chucking confirmation circuit 821, a top plate exchange confirmation circuit 822, a sixth chucking confirmation circuit 823, a second inclination conversion confirmation circuit 824, a second pitch conversion confirmation circuit 825, a seventh chucking confirmation circuit 826, a second reverse confirmation circuit 807, an eighth chucking confirmation circuit 828, and a fourth downward movement confirmation circuit 829, and performs various control operations of the work convey apparatus according to output signals from sensors (to be described later).

(I) Sensors

The work convey apparatus comprises sensors shown in FIGS. 13(A) so as to detect abnormalities occurring during conveyance of non-processed and processed top plates $10_1$ and $10_2$. The sensors will be described below.

(a) First X-, Y-, and Z-axis Sensors $C_{X1}$, $C_{Y1}$, and $C_{Z1}$

These sensors detect the positions of the first auto hand 200 in the X-, Y-, and Z-directions in FIG. 5.

(b) Tray Detection Sensor $T_C$

This sensor detects whether the tray 300 which is conveyed along the belt conveyor 10 abuts against the two stopper pins $150_1$ and $150_2$, and is stopped.

(c) Second X-, Y-, and Z-axis Sensors $C_{X2}$, $C_{Y2}$, and $C_{Z2}$

These sensors detect the positions of the second auto hand 710 in the X-, Y-, and Z-directions in FIG. 5.

(d) Reverse Motor Encoder E

This encoder detects whether the motor 440 (FIG. 9(A)) of the reverse unit 400 is connected, and the reverse arm 420 is set in the forward or reverse rotation state.

(e) First and Second Suction Sensors $C_{A1}$ and $C_{B1}$

These sensors are respectively provided to the two suction tubes $219_1$ and $219_2$ (FIG. 8(C)) of the first auto hand 200, and detect the degrees of vacuum when the second auto hand 200 chucks and holds the top plates $10_1$ and $10_2$.

(f) First, Second, Third, and Fourth Reverse Suction Sensors $C_{A2}$, $C_{B2}$, $C_{C2}$, and $C_{D2}$ These sensors are respectively provided to the four suction tubes $452_1$ to $452_4$ (FIG. 9(C)) of the reverse unit 400, and detect the degrees of vacuum when the non-processed top plates $10_1$ and $10_2$ received from the first auto hand 200 are chucked and held, and the degrees of vacuum when the processed top plates $10_1$ and $10_2$ received from the pitch-inclination conversion unit 500 are chucked and held.

(g) First and Second Cylinder Position Sensors $PC_1$ and $PC_2$

These sensors detect the position of the piston 531 (FIG. 10(A)) of the pitch conversion cylinder 530 of the pitch-inclination conversion unit 500.

(h) Horizontal Sensor $PC_3$, Inclination Sensor $PC_4$

These sensors detect the position of the piston 571 (FIG. 10(D)) of the inclination conversion cylinder 570 of the pitch-inclination conversion unit 500.

(i) First, Second, and Third Stopper Sensors $SC_1$, $SC_2$, and $SC_3$

The first and second stopper sensors $SC_1$ and $SC_2$ are respectively attached to the first and second stopper members $511_1$ and $511_2$ (FIG. 10(A)) of the pitch-inclination conversion unit 500, and detect whether or not the first and second leg portions $532_1$ and $532_2$ abut against the first and second stopper members $511_1$ and $511_2$. The third stopper sensor $SC_3$ is attached to the upper stopper 560 (FIG. 10(D)) of the pitch-inclination conversion unit 500, and detects whether or not the pawl 554 of the inclination arm 553 abuts against the upper stopper 560.

(j) First and Second Supply Suction Sensors $C_{S1}$ and $C_{S2}$

These sensors are respectively attached to the suction tubes $580_1$ and $580_2$ (FIG. 10(E)) provided to the receiving members $521_1$ and $521_2$, on which the non-processed top plates $10_1$ and $10_2$ are chucked and held, of the pitch-inclination conversion unit 500, and detect the degrees of vacuum when the non-processed top plates $10_1$ and $10_2$ received from the reverse unit 400 are chucked and held.

(k) First and Second Supply-side Suction Sensors $C_{T1}$ and $C_{T2}$

These sensors are respectively attached to the receiving members $521_3$ and $521_4$, on which the processed top plates $10_1$ and $10_2$ are chucked and held, of the pitch-inclination conversion unit 500, and detect the degrees of vacuum when the processed top plates $10_1$ and $10_2$ received from the second auto hand 710 are chucked and held.

(m) First and Second Supply-side Suction Sensors $C_{C1}$ and $C_{C2}$

These sensors are respectively attached to the two suction tubes $729_1$ and $729_2$ (FIG. 11(C)) provided to the fingers $723_1$ and $723_2$, on which the non-processed top plates $10_1$ and $10_2$ are chucked and held, of the second auto hand 710, and detect the degrees of vacuum when the non-processed top plates $10_1$ and $10_2$ received from the pitch-inclination conversion unit 500 are chucked and held.

(m) First and Second Exhaust-side Sensors $C_{D1}$ and $C_{D2}$

These sensors are respectively attached to the two suction tubes $729_3$ and $729_4$ provided to the fingers $723_3$ and $723_4$, on which the processed top plates $10_1$ and $10_2$ are chucked and held, of the second auto hand 710, and detect the degrees of vacuum when the non-processed top plates $10_1$ and $10_2$ received from the laser process machine 600 are chucked and held.

(n) Process End Signal F

This signal is output from the controller 642 (FIG. 12) of the laser process machine 600 when processes of the top plates $10_1$ and $10_2$ are ended.

The operations of the work convey apparatus will be described below with reference to the block diagrams shown in FIGS. 13(A) and 13(B), and the flow charts shown in FIGS. 14(A) to 14(E).

(1) Confirmation of Initial States of Respective Units

Before the beginning of a laser process, the initial states of the respective units are confirmed. More specifically, the controller 800 causes the initial state confirmation circuit 801 to confirm the initial states of the respective units on the basis of initial position data of the first X-axis arm 110, the first Y. axis arm 120, and the first Z-axis arm 130 indicated by the first X-, Y-, and Z-axis sensors $C_{X1}$, $C_{Y1}$, and $C_{Z1}$, initial position data of the reverse arm 420 indicated by the reverse motor encoder E, and initial position data of the piston 571 of the inclination conversion cylinder 570 indicated by the horizontal sensor $PC_3$ and the inclination sensor $PC_4$ (step S1). Thereafter, the controller outputs a first belt conveyor drive signal for starting the belt conveyor 140 (step S2).

(2) First Convey Step

When the belt conveyor 140 is started, the tray 300 which stores the non-processed top plates $10_1$ and $10_2$ is placed on the belt conveyor 140 by a supply means (not shown), and is conveyed. When the tray convey confirmation circuit 802 confirms on the basis of an output signal from the tray detection sensor $T_C$ that the tray 300 abuts against the two stopper pins $150_1$ and $150_2$ (step S3), the controller 800 stops the belt conveyor 140, and outputs a first convey drive signal for operating the first convey system 100 (step S4).

When the first convey system 100 is operated, the first Y-axis arm 120 and the first Z-axis arm 130 are moved by predetermined moving amounts, so that the first auto hand 200 is located above the top plates $10_1$ and $10_2$ stored in the first and second storage blocks 330 in the tray 300. Thereafter, the suction operation of the first auto hand 200 is started, and the finger insertion portions $214_1$ and $214_2$ are moved downward by the cylinder 230 of the first auto hand 200 to be inserted in the ink supply holes $13_1$ and $13_2$ of the top plates $10_1$ and $10_2$, thus chucking and holding the top plates $10_1$ and $10_2$ by the first auto hand 200.

The controller 800 causes the first chucking confirmation circuit 803 to monitor the chucking states of the top plates $10_1$ and $10_2$ on the basis of the output signals from the first and second suction sensors $C_{A1}$ and $C_{B1}$ (step S5). When the controller 800 confirms a chucking error caused by position errors of the top plates $10_1$ and $10_2$ in the tray 300, position error of the first auto hand 200, a suction error of the vacuum source, or the like, it outputs a first alarm signal for stopping the operation of the work convey apparatus (step S50). On the other hand, when the controller 800 confirms the normal chucking states of the top plates $10_1$ and $10_2$, it outputs a second convey drive signal for driving the first convey system 100 to move the first auto hand 200 to the reverse unit 400 (step S6).

When the first auto hand 200 is moved to the reverse unit 400, the finger insertion portions $214_1$ and $214_2$ of the first auto hand 200 are moved downward by the cylinder 230 until their distal ends abut against the distal ends of the holding shafts $455_1$ and $455_2$ provided to the two top plate receiving jigs $450_1$ and $450_2$ of the reverse unit 400.

(3) First Reverse Step

The controller 800 causes the first downward movement confirmation circuit 804 to monitor the downwardly shifted positions of the finger insertion portions $214_1$ and $214_2$ on the basis of the output signals from the first X-, Y-, and Z-axis sensors $C_{X1}$, $C_{Y1}$, and $C_{Z1}$ (step S7). When the controller 800 confirms that the downwardly shifted positions are abnormal, it outputs a second alarm signal for stopping the operation of the work convey apparatus (step S51). On the other hand, when the controller 800 confirms that the downwardly shifted positions are normal, it outputs a first suction change signal for stopping the suction operation of the first auto hand 200, and starting the suction operation of the top plate receiving jigs $450_1$ and $450_2$ (step S8).

When the suction operation of the first auto hand 200 is stopped, the top plates $10_1$ and $10_2$ are guided by the finger insertion portions $214_1$ and $214_2$, and the holding shafts $455_1$ and $455_2$, and are moved to the top plate receiving jigs $450_1$ and $450_2$ due to their weights. Thereafter, the top plates are chucked and held by the jigs.

The controller 800 causes the second chucking confirmation circuit 805 to monitor the chucking states of the top plates $10_1$ and $10_2$ on the basis of the output signals from the first and second reverse suction sensors $C_{A2}$ and $C_{B2}$ (step S9). When the controller 800 detects a chucking error due to, e.g., a suction error of the vacuum source, it outputs a third alarm signal for stopping the operation of the work convey apparatus (step S52). On the other hand, when the controller confirms that the chucking states of the top plates $10_1$ and $10_2$ are normal, it outputs a first motor drive signal for operating the motor 440 of the reverse unit 400 to reverse the reverse arm from the forward rotation state to the reverse rotation state (step S10).

When the reverse arm 420 is set in the reverse rotation state, the distal ends of the holding shafts $455_1$ and $455_2$ of the top plate receiving jigs $450_1$ and $450_2$ are in contact with the distal ends of the holding shafts $581_1$ and $581_2$ of the receiving members $521_1$ and $521_2$ of the pitch-inclination conversion unit 500.

(4) First Pitch-inclination Conversion Step

The controller 800 causes the first reverse confirmation circuit 806 to monitor the state of the reverse arm 420, and the state of the base 510 of the pitch-inclination conversion unit 500 on the basis of the output signals from the reverse motor encoder E and the horizontal sensor $PC_3$ (step S11). When the controller 800 confirms that the state of the reverse arm 420 or the state of the base 510 is abnormal, it outputs a fourth alarm signal for stopping the operation of the work convey apparatus (step S53). On the other hand, when the controller confirms that the two states are normal, it outputs a second suction change signal for stopping the suction operation of the top plate receiving jigs $450_1$ and $450_2$, and starting the suction operation of the receiving members $521_1$ and $521_2$ (step S12).

When the suction operation of the top plate receiving jigs $450_1$ and $450_2$ is stopped, the top plates $10_1$ and $10_2$ are guided along the holding shafts $455_1$ and $455_2$, and the holding shafts $581_1$ and $581_2$, and are moved to the receiving members $521_1$ and $521_2$ due to their weights. Thereafter, the top plates are chucked and held by the receiving members.

The controller 800 causes the third chucking confirmation circuit 807 to monitor the chucking states of the top plates $10_1$ and $10_2$ on the basis of the output signals from the first and second supply suction sensors $C_{S1}$ and $C_{S2}$ (step S13). When the controller 800 detects a chucking error due to, e.g., a suction error of the vacuum source, it outputs a fifth alarm signal for stopping the operation of the work convey apparatus (step S54). On the other hand, when the controller confirms that the chucking states of the top plates $10_1$ and $10_2$ are normal, it outputs a first cylinder drive signal for operating the pitch conversion cylinder 530 to start an operation (pitch conversion operation) for converting the pitch between the top plates $10_1$ and $10_2$ from the first pitch $P_1$ to the second pitch $P_2$ (step S14).

Since the pitch conversion operation of the top plates $10_1$ and $10_2$ has already been described in the description of the arrangement of the pitch-inclination conversion unit 500, a description thereof will be omitted here.

Upon completion of the pitch conversion operation, the controller 800 causes the first pitch conversion confirmation circuit 808 to check on the basis of the output signals from the first and second stopper sensors $SC_1$ and $SC_2$ if the first and second leg portions $532_1$ and $532_2$ abut against the first and second stopper members $511_1$ and $511_2$ (step S15). When the controller 800 determines that the leg portions cannot normally abut against the stopper members, it outputs a sixth alarm signal for stopping the operation of the work convey apparatus (step S55). On the other hand, when the controller 800 determines that the leg portions normally abut against the stopper members, it outputs a second cylinder drive signal for operating the inclination conversion cylinder 570 to convert the inclination arm 553 from the horizontal state to the inclined state (step S16).

(5) Second Convey Step

When the inclination arm 553 is set in the inclined state, the controller 800 causes the first inclination conversion confirmation circuit 809 to check on the basis of output signal from the third stopper sensor $SC_3$ if the pawl 554 abuts against the upper stopper 560 (step S17). When the controller 800 determines that the pawl cannot normally abut against the upper stopper, it outputs a seventh alarm signal for stopping the operation of the work convey apparatus (step S56). On the other hand, when the controller 800 determines that the pawl normally abuts against the upper stopper, it outputs a third convey drive signal for stopping the drive operation of the inclination conversion cylinder 570, and operating the second convey system 700 (step S18).

When the second convey system 700 is operated, the second Y-axis arm 702 and the second Z-axis arm 703 are moved by predetermined moving amounts, and the first chucking/holding section of the second auto hand 710 is located above the two receiving members $521_1$ and $521_2$ of the pitch-inclination conversion unit 500. Thereafter, the finger insertion portions $724_1$ and $724_2$ of the second auto hand 710 are moved downward by the first cylinder $740_1$ until their distal ends abut against the distal ends of the holding shafts $581_1$ and $581_2$ provided to the receiving members $521_1$ and $521_2$ of the pitch-inclination conversion unit 500.

The controller 800 causes the second downward movement confirmation circuit 810 to monitor the downwardly shifted positions of the finger insertion portions $724_1$ and $724_2$ in accordance with the output signals from the second X-, Y-, and Z-axis sensors $C_{X2}$, $C_{Y2}$, and $C_{Z2}$ (step S19). When the controller 800 confirms that the downwardly shifted positions are abnormal, it outputs an eighth alarm signal for stopping the operation of the work convey apparatus (step S57). On the other hand, when the controller 800 confirms that the downwardly shifted positions are normal, it outputs a third suction change signal for stopping the suction operation of the pitch-inclination conversion unit 500, and starting the suction operation of the second auto hand 710 (step S20).

When the suction operation of the pitch-inclination conversion unit 500 is stopped, the top plates $10_1$ and $10_2$ are guided by the holding shafts $581_1$ and $581_2$, and the finger insertion portions $724_1$ and $724_2$, and are moved to the second auto hand 710 by the suction force of the second auto hand 710. Thereafter, the top plates are chucked and held by the second auto hand.

The controller 800 causes the fourth chucking confirmation circuit 811 to monitor the chucking states of the top plates $10_1$ and $10_2$ on the basis of the output signals from the first and second supply-side suction sensors $C_{C1}$ and $C_{C2}$ (step S21). When the controller 800 detects a chucking error due to, e.g., a suction error of the vacuum source, it outputs a ninth alarm signal for stopping the operation of the work convey apparatus (step S58). On the other hand, when the controller 800 confirms that the chucking states of the top plates $10_1$ and $10_2$ are normal, it outputs a fourth convey drive signal for operating the second convey system 700 to move the second auto hand 710 to the work station 606 of the laser process machine 600 (step S22).

When the second convey system 700 is operated, the second Y-axis arm 702 and the second Z-axis arm 703 are moved by predetermined moving amounts, and the first chucking/holding section of the second auto hand 710 is located above the work station 606. Thereafter, the finger insertion portions $724_1$ and $724_2$ of the second auto hand 710 are moved downward by the first cylinder $740_1$.

The controller 800 causes the third downward movement confirmation circuit 812 to monitor the downwardly shifted positions of the finger insertion portions $724_1$ and $724_2$ in accordance with the output signals from the second X-, Y-, and Z-axis sensors $C_{X2}$, $C_{Y2}$, and $C_{Z2}$ (step S23). When the controller 800 confirms that the downwardly shifted positions are abnormal, it outputs a tenth alarm signal for stopping the operation of the work convey apparatus (step S59). On the other hand, when the controller 800 confirms that the downwardly shifted positions are normal, it outputs a process start signal for stopping the suction operation of the second auto hand 710, and causing the laser process machine 600 to start a process (step S24).

(6) Third Convey Step

When the slots are formed in the top plates $10_1$ and $10_2$ by the laser process machine 600, the laser process machine 600 outputs the process end signal F.

The controller 800 causes the process end confirmation circuit 820 to monitor the end of process on the basis of the process end signal F (step S25). When the controller 800 confirms the end of process, it outputs a fifth convey drive signal for starting the suction operation of the second auto hand 710, and operating the second convey system 700 to move the second auto hand 710 to the work station 606 of the laser process machine 600 (step S26).

When the second convey system 700 is operated, the second Y-axis arm 702 and the second Z-axis arm 703 are moved by predetermined moving amounts, and the second chucking/holding section of the second auto hand 710 is located above the work station 606. Thereafter, the finger insertion portions $724_3$ and $724_4$ of the second auto hand 710 are moved downward by the second cylinders $740_1$ and $740_2$, and are inserted in the ink supply holes $13_1$ and $13_2$ of the top plates $10_1$ and $10_2$. In this manner, the top plates $10_1$ and $10_2$ are chucked and held by the fingers $723_3$ and $723_4$.

The controller 800 causes the fifth chucking confirmation circuit 821 to monitor the chucking states of the top plates $10_1$ and $10_2$ on the basis of the output signals from the first and second exhaust-side suction sensors $C_{D1}$ and $C_{D2}$ (step S27). When the controller 800 detects a chucking error due to, e.g., a suction error of the vacuum source, it outputs an eleventh alarm signal for stopping the operation of the work convey apparatus (step S60). On the other hand, when the controller 800 confirms that the chucking states of the top plates $10_1$ and $10_2$ are normal, it outputs a sixth convey drive signal for operating the second convey system 700 to move the second auto hand 710 to the pitch-inclination conversion unit 500 (step S28).

When the second convey system 700 is operated, the second Y-axis arm 702 and the second Z-axis arm 703 are moved by predetermined moving amounts, and the first and second chucking holding/sections of the second auto hand 710 are located above the receiving members $521_1$ to $521_4$ of the pitch inclination conversion unit 500. In this case, the two receiving members $521_1$ and $521_2$ chuck and hold two top plates $10_3$ and $10_4$ to be processed by the laser process machine 600 next, which plates were conveyed from the tray 300 in the same manner as the above-mentioned top plates $10_1$ and $10_2$.

(7) Second Pitch-inclination Conversion Step

The controller 800 causes the top plate exchange confirmation circuit 822 to monitor the position of the second auto hand 710, the state of the inclination arm 553 of the pitch-inclination conversion unit 500, and the presence of the top plates $10_3$ and $10_4$ on the basis of the output signals from the second X-, Y-, and Z-axis sensors $C_{X2}$, $C_{Y2}$, and $C_{Z2}$, the first, second, and third stopper sensors $SC_1$, $SC_2$, and $SC_3$, the horizontal sensor $PC_3$, the inclination sensor $PC_4$, and the first and second supply suction sensors $C_{S1}$ and $C_{S2}$ (step S29). When the controller 800 confirms that the top plates $10_1$ and $10_2$ cannot be exchanged with the top plates $10_3$ and $10_4$, it outputs a twelfth alarm signal for stopping the operation of the work convey apparatus (step S61). On the other hand, when the controller 800 confirms that these top plates can be exchanged with each other, it operates the second convey system 700 to move the second auto hand 710 downward. Thereafter, the controller 800 outputs a fourth suction change signal for stopping the suction operation, and starting the suction operation of the pitch-inclination conversion unit 500 (step S30).

The controller 800 causes the sixth chucking confirmation circuit 823 to monitor chucking states of the top plates $10_3$ and $10_4$ in the second auto hand 710, and the chucking states of the top plates $10_1$ and $10_2$ in the pitch inclination conversion unit 500 on the basis of the output signals from the first and second supply-side suction sensors $C_{C1}$ and $C_{C2}$, and the first and second exhaust suction sensors $C_{T1}$ and $C_{T2}$ (step S31). When the controller 800 detects a chucking error due to, e.g., a suction error of the vacuum source, it outputs a thirteenth alarm signal for stopping the operation of the work convey apparatus (step S62). On the other hand, when the controller 800 confirms that the chucking states of the top plates $10_1$ to $10_4$ are normal, it outputs a third cylinder drive signal for operating the inclination conversion cylinder 570 to convert the inclination arm 553 from the inclined state to the horizontal state (step S32).

The non-processed top plates 103 and 104 chucked and held by the second auto hand 710 are processed by the laser process machine 600 in the same manner as described above.

When the inclination arm 553 is set in the horizontal state, the controller 800 causes the second inclination conversion confirmation circuit 824 to monitor the state of the inclination arm 553 on the basis of the output signals from the horizontal sensor $PC_3$ and the inclination sensor $PC_4$ (step S33). When the controller 800 determines that the inclination arm 553 is not set in the horizontal state, it outputs a fourteenth alarm signal for stopping the operation of the work convey apparatus (step S63). On the other hand, when the controller 800 confirms that the inclination arm 553 is set in the horizontal state, it outputs a fourth cylinder drive signal for operating the pitch conversion cylinder 530 to start an operation (pitch conversion operation) for converting the pitch between the top plates $10_1$ and $10_2$ from the second pitch $P_2$ to the first pitch $P_1$ (step S34).

At this time, the top plate receiving jigs $454_1$ and $454_2$ of the reverse unit 400 chuck and hold two top plates $10_5$ and $10_6$ to be processed by the laser process machine 600 in the third sequence, which plates were conveyed from the tray 300 in the same manner as the above-mentioned top plates $10_1$ and $10_2$.

(8) Second Reverse Step

Upon completion of the pitch conversion operation, the controller 800 causes the second pitch conversion confirmation circuit 825 to monitor the position of the piston 531 of the pitch conversion cylinder 530 on the basis of the output signals from the first and second cylinder position sensors $PC_1$ and $PC_2$ (step S35). When the controller 800 determines that the position of the piston 531 is not a predetermined position, it outputs a fifteenth alarm signal for stopping the operation of the work convey apparatus (step S64). On the other hand, when the controller 800 determines that the piston 531 is located at the predetermined position, it outputs a fifth suction change signal for stopping the suction operations of the receiving members $521_3$ and $521_4$ of the pitch-inclination conversion unit 500, and the top plate receiving jigs $454_1$ and $454_2$ of the reverse unit 400, and starting the suction operations of the receiving members $521_1$ and $521_2$ of the pitch-inclination conversion unit 500, and the top plate receiving jigs $454_3$ and $454_4$ unit 400 (step S36).

The non-processed top plates $10_5$ and $10_6$ chucked and held by the receiving members $521_1$ and $521_2$ of the pitch-inclination conversion unit 500 are processed by the laser process machine 600 in the same manner as described above.

The controller 800 causes the seventh chucking confirmation circuit 826 to monitor the chucking states of the top plates $10_5$ and $10_6$ in the pitch inclination conversion unit 500, and the chucking states of the top plates $10_1$ and $10_2$ in the reverse unit 400 on the basis of the output signals from the first and second supply suction sensors $C_{S1}$ and $C_{S2}$, and the third and fourth reverse suction sensors $C_{C2}$ and $C_{D2}$ (step S37). When the controller 800 detects a chucking error due to, e.g., a suction error of the vacuum source, it outputs a sixteenth alarm signal for stopping the operation of the work convey apparatus (step S65). On the other hand, when the controller 800 confirms that the chucking states of the top plates $10_1$, $10_2$, $10_5$, and $10_6$ are normal, it outputs a second motor drive signal for operating the motor 440 of the reverse unit 400 to reverse the reverse arm 420 from the reverse rotation

(9) Fourth Convey Step

When the reverse arm 420 is set in the forward rotation state, the controller 800 monitors the state of the reverse arm 420 on the basis of the output signal from the reverse motor encoder E (step S39). When the controller 800 confirms that the state of the reverse arm 420 is abnormal, it outputs a seventeenth alarm signal for stopping the operation of the work convey apparatus (step S66). On the other hand, when the controller 800 confirms that the state of the reverse arm 420 is normal, it outputs a sixth suction change signal for starting an operation for transferring the top plates $10_1$ and $10_2$ from the reverse unit 400 to the first auto hand 200 (step S40).

When the sixth suction change signal is output, the finger insertion portions $214_1$ and $214_2$ of the first auto hand 200 are moved to a position where they are brought into contact with the holding shafts $455_3$ and $455_4$ of the top plate receiving jigs $454_3$ and $454_4$ of the reverse unit 400. Thereafter, the suction operation by the reverse unit 400 is started, and the suction operation by the first auto hand 200 is started.

The controller 800 causes the eighth chucking confirmation circuit 828 to monitor the chucking states of the top plates $10_1$ and $10_2$ on the basis of the output signals from the first and second suction sensors $C_{A1}$ and $C_{B1}$ (step S41). When the controller 800 detects a chucking error due to, e.g., a suction error of the vacuum source, it outputs an eighteenth alarm signal for stopping the operation of the work convey apparatus (step S67). On the other hand, when the controller 800 confirms that the chucking states of the top plates $10_1$ and $10_2$ are normal, it outputs a seventh convey drive signal for operating the first convey system (step S42).

When the first convey system is operated, the first auto hand 200 is moved by a predetermined amount, so that the top plates $10_1$ and $10_2$ chucked and held by the fingers $213_1$ and $213_2$ are stored in the tray 300.

In this case, the controller 800 causes the fourth downward movement confirmation circuit 829 to monitor the downwardly shifted positions of the finger insertion portions $214_1$ and $214_2$ on the basis of the output signals from the first X-, Y-, and Z-axis sensors $C_{X1}$, $C_{Y1}$, and $C_{Z1}$ (step S43). When the controller determines that the downwardly shifted positions are abnormal, it outputs a nineteenth alarm signal for stopping the operation of the work convey apparatus (step S68). On the other hand, when the controller 800 confirms that the downwardly shifted positions are normal, it outputs an operation end signal for stopping the suction operation of the first auto hand 200, and indicating that the first process operation is ended (step S44).

Thereafter, the same operations are repeated until all the top plates stored in the tray 300 are processed.

An arrangement of a pitch conversion unit according to an embodiment of the present invention will be described below.

In the work convey apparatus shown in FIG. 5, the top plates $10_1$ and $10_2$ are processed by the laser process machine 600 while their surfaces to be processed are inclined. The top plates $10_1$ and $10_2$ are inclined by the pitch-inclination conversion unit shown in FIG. 10. However, the laser process machine 600 may process the surfaces to be processed of the top plates $10_1$ and $10_2$ in the horizontal state. In this case, a pitch conversion unit which has no inclination conversion function in the pitch inclination conversion unit may be used in place of the pitch-inclination conversion unit 500.

More specifically, the pitch conversion unit which comprises components constituting the pitch conversion function section of the pitch-inclination conversion unit 500 shown in FIG. 10(A) may be used. That is, the pitch conversion unit comprises a base 510, first and second stopper members $511_1$ and $511_2$ fixed to the two ends of the base 510 in its longitudinal direction, and extending downward in FIG. 10(A), a stationary portion 520 fixed to the central portion of the base 510 in its longitudinal direction, first and second slide members $525_1$ and $525_2$ arranged on the base 510 to be respectively slidable in the left and right directions in FIG.

10(A) along the upper surface of the base 510, first and second leg portions $532_1$ and $532_2$ integrally formed on the ends, opposite to the stationary portion 520, of the slide members $525_1$ and $525_2$, and opposing the stopper members $511_1$ and $511_2$ to extend via through holes (not shown) of the base 510, and a pitch conversion cylinder 530 in which one end of its main body is fixed to the first leg portion $532_1$, and the distal end of a piston 531 is fixed to the second leg portion $532_2$.

In this case, since the pitch conversion unit has no inclination conversion function, a controller 800 from which the first inclination conversion confirmation circuit 809 shown in FIG. 13(A) and the second inclination conversion confirmation circuit 824 shown in FIG. 13(B) are omitted may be used.

Figure 14B:
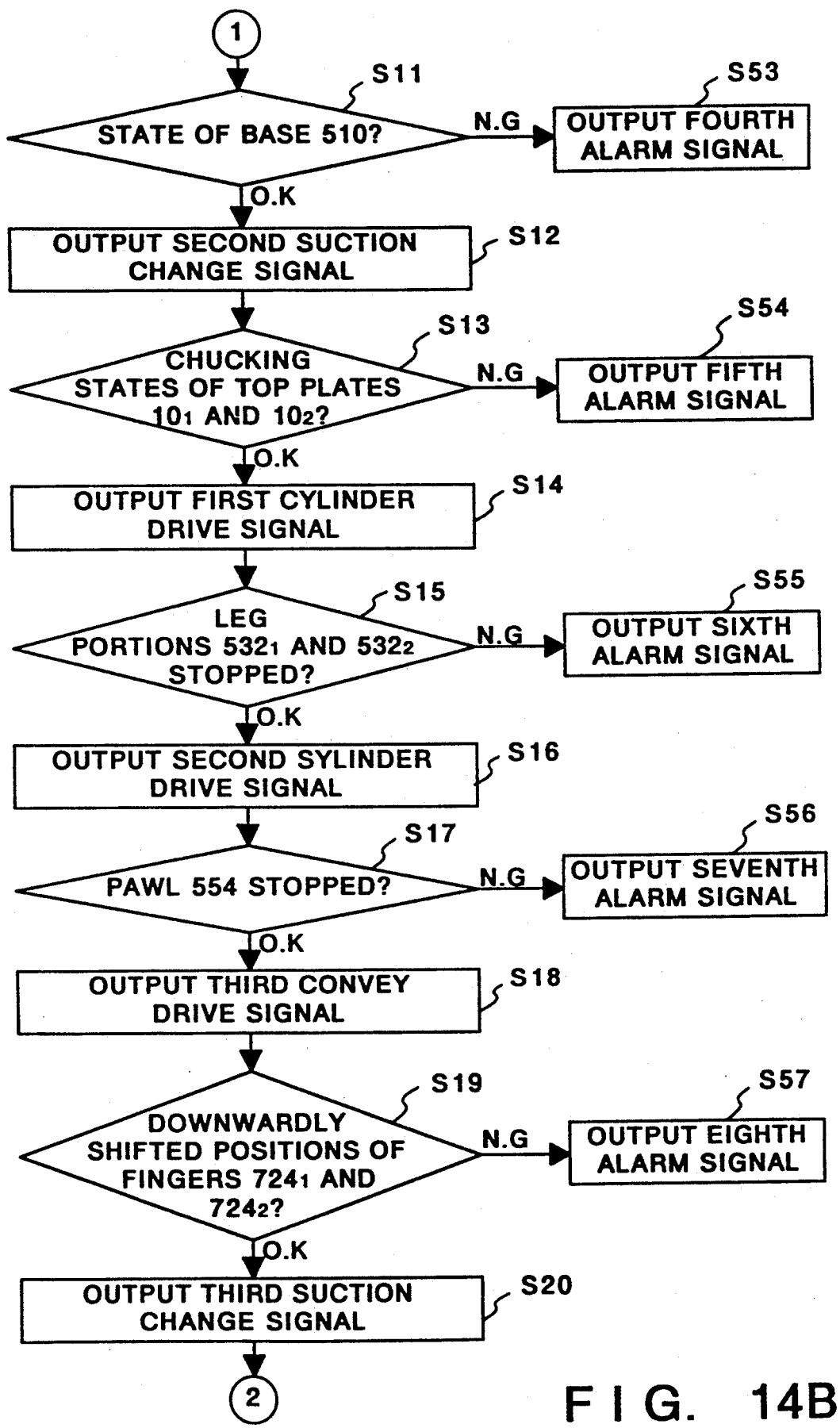
Figure 14C:
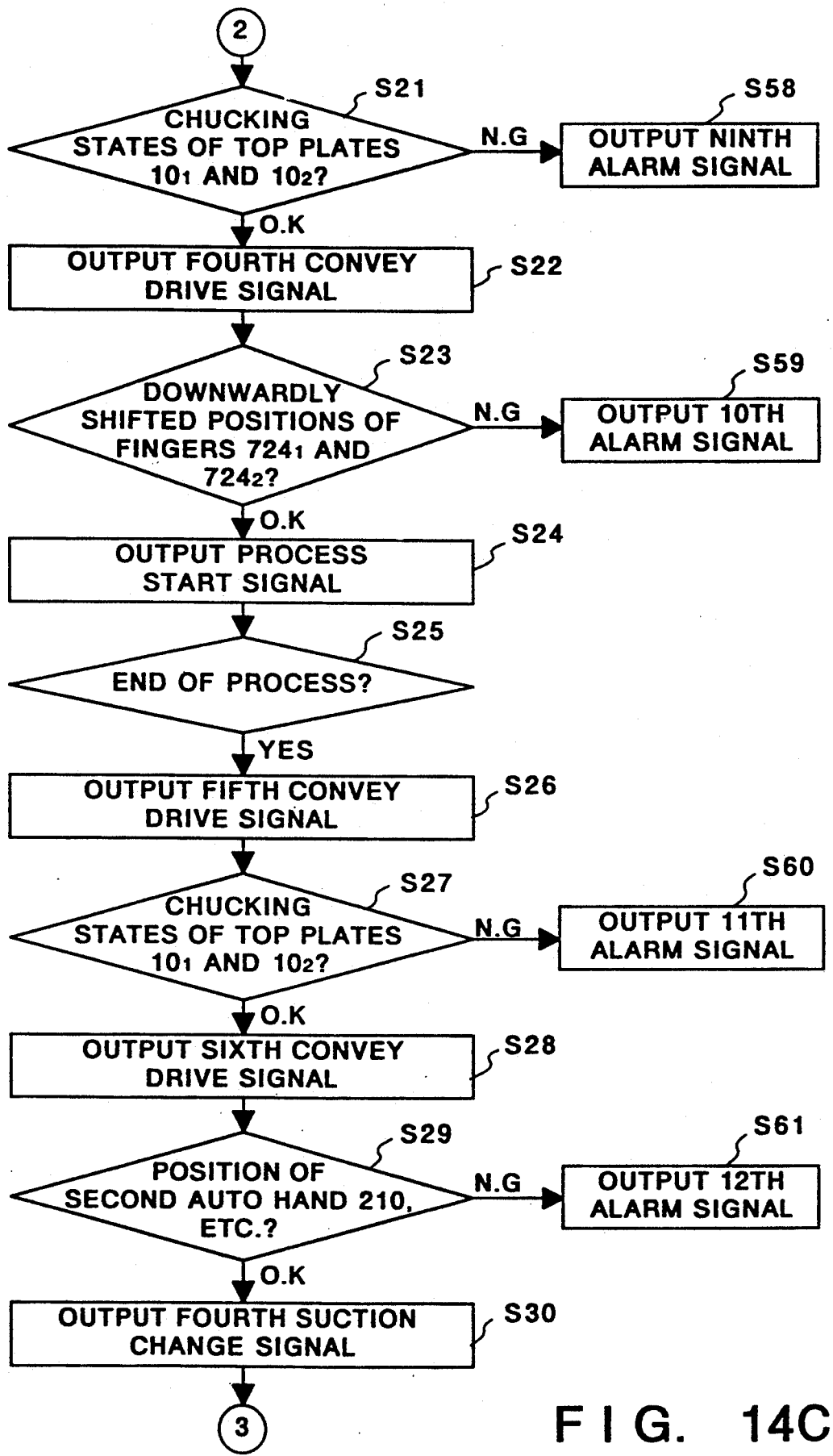
Figure 14D:
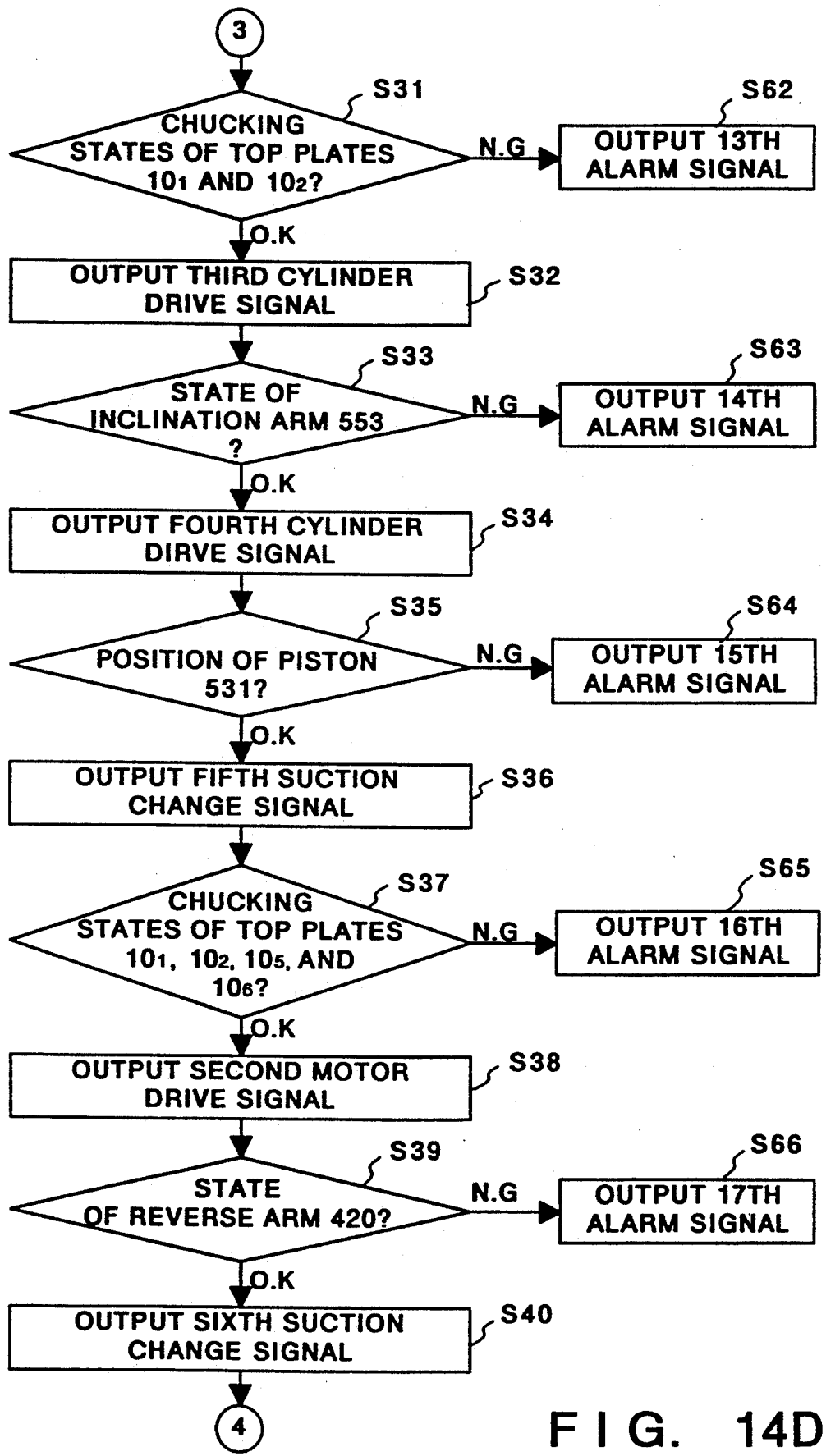
Figure 14E:
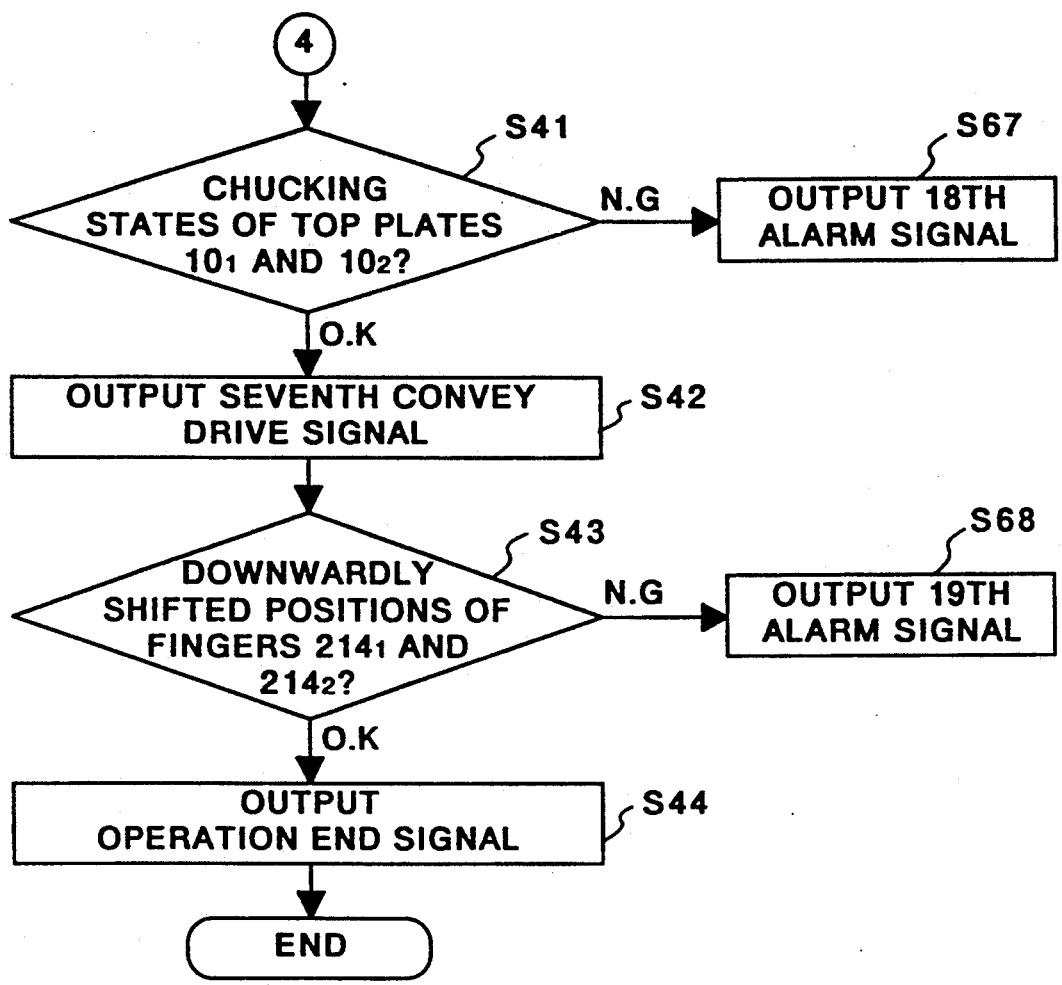

In the operations of the work convey apparatus comprising the pitch conversion unit of this embodiment, first and second pitch conversion steps are executed in place of the first and second pitch-inclination conversion steps of the operations of the work convey apparatus shown in FIG. 5. More specifically, in the first pitch conversion step, operations from which steps S16 and S17 in the flow chart shown in FIG. 14(B) are omitted are executed, and in the second pitch conversion step, operations from which steps S32 and S33 in the flow chart shown in FIG. 14(D) are omitted are executed.

An arrangement of a pitch-inclination conversion unit according to another embodiment of the present invention will be described below.

The pitch-inclination conversion unit is used in a work convey apparatus for simultaneously conveying four top plates $910_1$ to $910_4$ between a tray and a laser process machine.

The overall arrangement of the work convey apparatus is substantially the same as that of the embodiment shown in FIGS. 5 and 6, except for the following points.

(1) A first convey robot has four fingers (FIGS. 8(A) to 8(D)) each having a work chucking/holding means, and aligned at a first pitch $P_1$. Each finger chucks and holds a corresponding one of the top plates $910_1$ to $910_4$ to convey it.

(2) An array of four first top plate receiving jigs (having the same arrangement as that shown in FIGS. 9(A) to 9(D)) for respectively chucking and holding non-processed top plates $910_1$ to $910_4$ are fixed to a reverse arm of a reverse unit to be separated at the first pitch $P_1$, and an array of four second top plate receiving jigs (having the same arrangement as that shown in FIGS. 9(A) to 9(D)) for respectively chucking and holding processed top plates $910_1$ to $910_4$ are also fixed thereto to be separated at the first pitch $P_1$.

(3) In a pitch-inclination conversion unit, four first top plate receiving members are respectively provided to a stationary portion inclined at a predetermined angle by an inclination conversion cylinder, and first slide members which are inclined at the predetermined angle by the inclination conversion cylinder, and are subjected to pitch conversion from the first pitch $P_1$ to a second pitch $P_2$ by four pitch conversion cylinders. Furthermore, four second top plate receiving members are respectively provided to the stationary portion, and second slide members which are inclined at the predetermined angle by the inclination conversion cylinder, and are subjected to pitch conversion from the first pitch $P_1$ to the second pitch $P_2$ by the four pitch conversion cylinders.

(4) A second convey robot has four fingers (FIGS. 11(A) to 11(C)) each having a work chucking/holding means, and aligned at the second pitch $P_2$. Each finger chucks and holds a corresponding one of non-processed top plates $910_1$ to $910_4$ to convey it. The second convey robot also has another four fingers each having a work chucking/holding means, and aligned at the second pitch $P_2$. Each finger chucks and holds a corresponding one of processed top plates $910_1$ to $910_4$ to convey it.

The pitch conversion function section of the pitch-inclination conversion unit described in the item (3) will be described in detail below with reference to FIGS. 15(A) to 15(D).

Figure 15A:
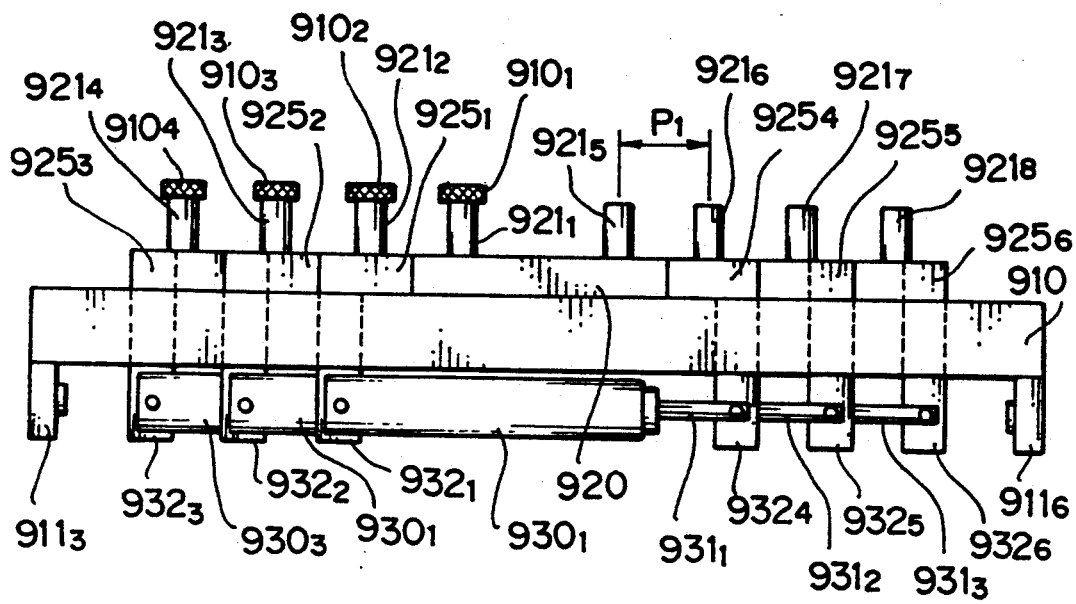
Figure 15B:
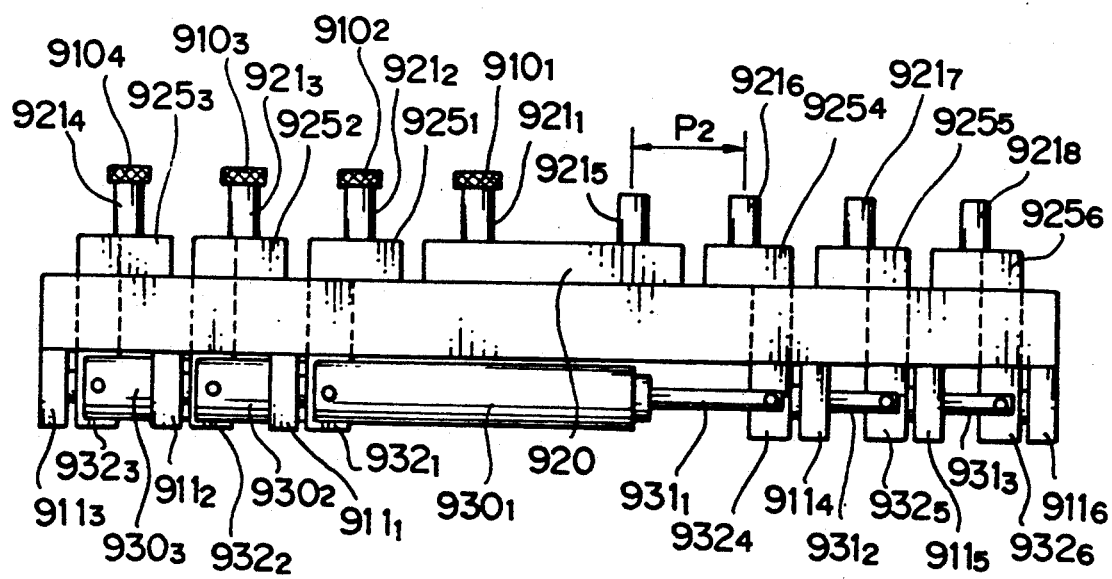
Figure 15C:
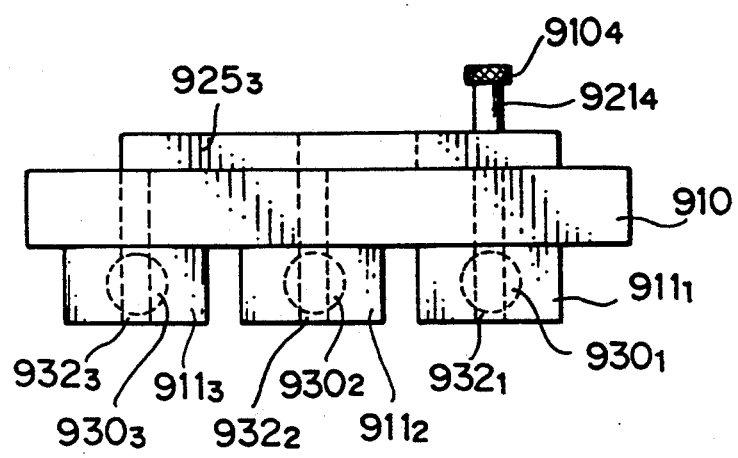
Figure 15D:
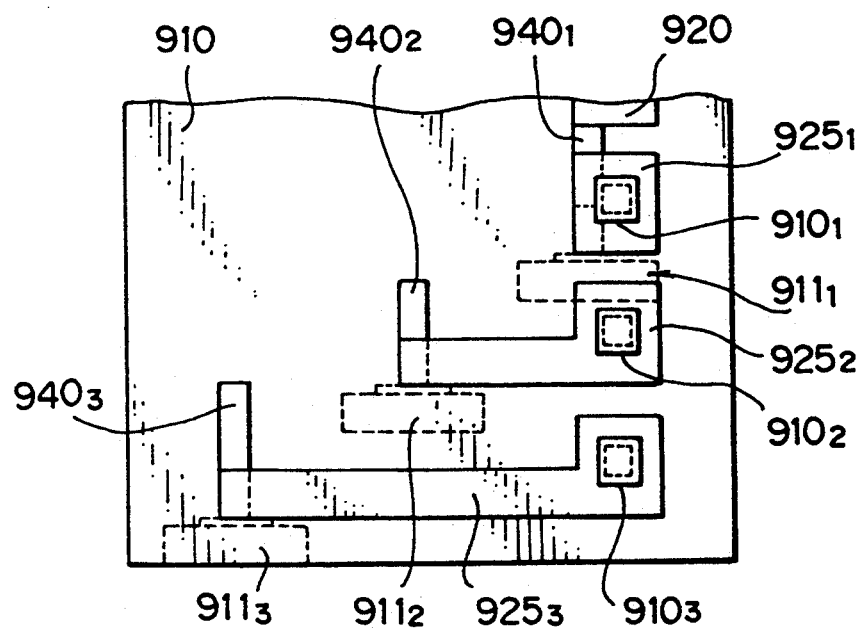

As shown in FIG. 15(A), the pitch conversion function section comprises a base 910, a stationary Q portion 920 fixed to the two ends of the base 910 in its longitudinal direction (lateral direction in FIG. 15(A)), and extending downward in FIG. 15(A), three first slide members $925_1$ to $925_3$ provided to the base 910 to be slidable in the left direction in FIG. 15(A) along the upper surface of the base 910, three second slide members $925_4$ to $925_6$ provided to the base 910 to be slidable in the right direction in FIG. 15(A) along the upper surface of the base 910, first leg portions $932_1$ to $932_3$ integrally provided to the ends, opposite to the stationary portion 920, of the first slide members $925_1$ to $925_3$ to extend via three through holes $940_1$ to $940_3$ (FIG. 15(D)) of the base 910, second leg portions $932_4$ to $932_6$ integrally provided to the ends, opposite to the stationary portion 920, of the second slide members $925_4$ to $925_6$ to extend via three through holes (not shown) of the base 910, and three pitch conversion cylinders $930_1$ to $930_3$ in which one-end portions of their main bodies are fixed to the corresponding first leg portions $932_1$ to $932_3$, and the distal ends of their pistons $931_1$ to $931_3$ are fixed to the corresponding second leg portions $932_4$ to $932_6$.

As shown in FIG. 15(C), the pitch conversion cylinders $930_1$ to $930_3$ are aligned in a direction perpendicular to the drawing sheet surface of FIG. 15(A). Although not shown in FIG. 15(A), three first stopper members $911_1$ to $911_3$, and three second stopper members $911_4$ to $911_6$ are arranged on the lower surface of the base 910 to oppose the pitch conversion cylinders $930_1$ to $930_3$, as shown in FIGS. 15(B) to 15(D).

The stationary portion 920 is provided with a receiving member $921_1$ for receiving the non-processed top plate $910_1$ from the reverse unit, and a receiving member $921_5$ for receiving the processed top plate $910_4$ from the second convey robot. The first slide members $925_1$ to $925_3$ are respectively provided with receiving members $921_2$ to $921_4$ for respectively receiving the three non-processed top plates $910_2$ to $910_4$ from the reverse unit, and the second slide members $925_4$ to $925_6$ are respectively provided with receiving members $921_6$ to $921_8$ for respectively receiving the three processed top plates $910_1$ to $910_3$ from the second convey robot. More specifically, the four receiving members $921_1$ to $921_4$ constitute a set of receiving members (first work receiving members), and the remaining four receiving members $921_5$ to $921_8$ constitute another set of receiving members (second work receiving members).

The pitch of the receiving members $921_1$ to $921_8$ is set so that the pitch of the four receiving members $921_1$ to $921_4$, and the pitch of the four receiving members $921_5$ to $921_8$ are equal to the first pitch $P_1$ when the first slide members $925_1$ to $925_3$ and the second slide members $925_4$ to $925_6$ abut against each other, as shown in FIG. 15(A). The lengths of the slide members $925_1$ to $925_6$, and the positions of the stopper members $911_1$ to $911_6$ are set so that the pitch of the four receiving members $921_1$ to $921_4$, and the pitch of the four receiving members $921_5$ to $921_8$ are equal to the second pitch $P_2$ when the leg portions $932_1$ to $932_6$ of the slide members $925_1$ to $925_6$ abut against the stopper members $911_1$ to $911_6$, as shown in FIG. 15(B).

The operations of this pitch conversion function section are the same as those of the pitch conversion function unit shown in FIGS. 10(A) to 10(E), and a description thereof will be omitted here.

In this embodiment, the four top plates $910_1$ to $910_4$ are simultaneously conveyed. However, when the respective units of the work convey apparatus including the pitch-inclination conversion unit of the present invention are similarly constituted, the number of top plates (works) to be simultaneously conveyed is not limited to this.

In the above description, in order to reliably transfer the top plates $10_1$ and $10_2$, the holding shafts $581_1$ to $581_4$ are respectively provided to the receiving members $521_1$ to $521_4$ of the pitch-inclination conversion unit 500. However, since the receiving members $521_1$ to $521_4$ have holes for receiving the projection members $15_1$ to $15_2$ of the top plates $10_1$ and $10_2$, the holding shafts $581_1$ to $581_4$ may be omitted.

As shown in FIG. 8(D), when the top plate $10_1$ is chucked and held by the first auto hand 200, the chucking surface of the top plate $10_1$ is chucked by vacuum suction. However, the top plate $10_1$ may be chucked and held by a suction force by drawing air present in a hole, formed in the finger $213_1$, for receiving the projection member $15_1$ of the top plate $10_1$ by vacuum suction. The same applies to the receiving member $521_1$ of the pitch-inclination conversion unit 500 shown in FIG. 10(E).

As a work, a top plate of a recording head used in a bubble-jet recording apparatus is used. However, various other works may be used.

In the above embodiment, while the first and second top plates $10_1$ and $10_2$ on the tray 300 are conveyed to the laser process machine 600, the vertical positions of the first and second top plates $10_1$ and $10_2$ are reversed by the reverse unit 400, and thereafter, the pitch between the first and second top plates $10_1$ and $10_2$, and the inclination angle of the two top plates are converted by the pitch-inclination conversion unit 500. However, the present invention is not limited to this. For example, the pitch between the first and second top plates $10_1$ and $10_2$, and the inclination angle of the two top plates may be converted by the pitch-inclination conversion unit 500, and thereafter, the vertical positions of the first and second top plates $10_1$ and $10_2$ may be reversed by the reverse unit 400.

In this case, the pitch-inclination conversion unit 500 is replaced with one having no inclination conversion function, as a matter of course. When the pitch-inclination conversion unit 500 has no inclination conversion function, the reverse unit 400 includes not only a case wherein the received first and second top plates $10_1$ and $10_2$ are supported in a horizontal state, but also a case wherein the top plates are supported to be inclined at a predetermined angle. More specifically, the pitch between the first and second top plates $10_1$ and $10_2$ conveyed from the tray 300 to the pitch-conversion unit by the first convey robot 100 is converted to the second pitch by the pitch conversion unit, and thereafter, the vertical positions of the first and second stop plates $10_1$ and $10_2$ are reversed by the reverse unit 400. When the top plates are reversed, the reversed positions of the top plates can be set so that the top plates are held to be inclined at the predetermined angle with respect to the horizontal plane. Thus, as described above, the first and second top plates $10_1$ and $10_2$ in the inclined state can be supplied to the laser process machine 600 via the second auto hand 710 without using the pitch-inclination conversion unit 500. Contrary to this, after the processed first and second top plates $10_1$ and $10_2$ in the inclined state are picked up from the laser process machine 600, these plates can be reversed by the reverse unit 400 so that their surfaces to be processed face down, and they are set in the horizontal state. Thereafter, the pitch between the first and second top plates $10_1$ and $10_2$ can be converted to the first pitch by the pitch conversion unit, and the plates can be stored in the tray 300.

Since the present invention has the above-mentioned arrangement, the following effects can be provided.

In the pitch conversion unit of the present invention, a plurality of non-processed works aligned at a first pitch are respectively transferred to a plurality of first work receiving members, and thereafter, first slide members respectively having the plurality of first work receiving members are slid by slide means by an amount corresponding to the difference between a second pitch and the first pitch, thereby converting the pitch of the plurality of non-processed works to the second pitch. A plurality of processed works aligned at the second pitch are transferred to a plurality of second work receiving members respectively provided to second slide members which are slid by the same slide amount in a direction opposite to that of the first slide members together with the first slide members, and thereafter, the second slide members are returned to their original positions by the slide means, thus converting the pitch of the plurality of processed works to the first pitch. Therefore, when a plurality of works are simultaneously conveyed between a tray for storing a large number of non-processed works at the first pitch, and a process machine for simultaneously processing the plurality of works at the second pitch, the pitch of the plurality of works can be efficiently converted.

In the pitch-inclination conversion unit of the present invention, an inclination arm which holds a stationary unit of the pitch-inclination conversion unit, and the first and second slide members, and one end of which is rotatably supported is rotated by a predetermined rotational angle by a rotation means so as to incline the first work receiving members which received the plurality of non-processed works, thereby converting the inclination angle of surfaces to be processed of non-processed works into an inclination angle suitable for a process operation in the process machine. After the plurality of processed works are transferred to the second work receiving members inclined together with the first work receiving members, the inclination arm is returned to an original position by the rotation means, thereby converting the inclination angle of the processed surfaces of the processed works into an inclination angle suitable for storage in the tray. Therefore, when a plurality of works are simultaneously conveyed between the tray for storing a large number of non-processed works at the first pitch, and the process machine for simultaneously processing the plurality of works, which are aligned at the second pitch, and the surfaces to be processed of which are inclined at an inclination angle different from that when the works are stored in the tray, the pitch and inclination angle of the plurality of works can be efficiently converted.

As many apparently widely different embodiments of the present invention can be made without departing from the spirit and scope thereof, it is to be understood that the invention is not limited to the specific embodiments thereof except as defined in the appended claims.

What is claimed is:

1. A work convey method for picking up a plurality of workpieces from a storage means in which a plurality of non-processed workpieces with non-processed surfaces thereof face down are placed at a first pitch and conveying the plurality of workpieces to a process machine, said method comprising the steps of:

simultaneously picking up the plurality of non-processed workpieces in a first convey step from the storage means while maintaining the workpieces at the first pitch and with the non-processed surfaces facing down and conveying the picked-up workpieces;

simultaneously receiving the plurality of non-processed workpieces conveyed in the first convey step, and simultaneously inverting the workpieces in a first inverse step so as to turn the non-processed surfaces of the workpieces upward;

simultaneously receiving the plurality of inverted workpieces with the non-processed surfaces facing upward and converting the first pitch between the workpieces into a second pitch in a first pitch conversion step; and simultaneously receiving the plurality of non-processed workpieces, with the first pitch having been converted to the second pitch, and conveying the workpieces to the process machine in a second convey step.

2. The method according to claim 1, further comprising the steps of:

after the process machine has processed the plurality of workpieces, simultaneously conveying the processed workpieces in a third convey step while maintaining the second pitch;

simultaneously receiving the plurality of processed workpieces conveyed in the third convey step, and converting the second pitch between the workpieces into the first pitch in a second pitch conversion step; and simultaneously conveying the plurality of processed workpieces in a fourth convey step, in which the second pitch has been converted into the first pitch, to the storage means.

3. The method according to claim 2, wherein the fourth convey step includes:

an inverse substep of simultaneously receiving the plurality of workpieces, the second pitch of which has been converted into the first pitch in the second pitch conversion step, and inverting the workpieces so as to turn the processed surfaces of the workpieces downward; and a convey substep of simultaneously conveying the plurality of workpieces inverted in the inverse substep to the storage means.

4. The method according to claim 3, wherein an operation for receiving the plurality of non-processed workpieces in the second convey step, and an operation for receiving the plurality of processed workpieces in the second pitch conversion step are executed parallel to each other, and an operation for receiving the plurality of non-processed workpieces in the first pitch conversion step, and an operation for receiving the plurality of processed workpieces in the inverse substep are executed parallel to each other.

5. The method according to claim 3, wherein the workpieces are top plate members incorporated into an ink jet head unit of an ink jet printer for printing by boiling and discharging ink, each top plate member has a main portion and a plate portion which extends from the main portion and which is to be processed by the processed machine, and wherein the top plate members are stored in the storage means in a state where the plate portions are face down.

6. The method according to claim 5, wherein an operation for receiving the plurality of non-processed workpieces in the second convey step, and an operation for receiving the plurality of processed workpieces in the second position conversion step are executed parallel to each other, and an operation for receiving the plurality of non-processed workpieces in the first pitch conversion step, and an operation for receiving the plurality of processed workpieces in the convey substep are executed parallel to each other.

7. A work convey method for picking up a plurality of workpieces from storage means in which a plurality of workpieces with non-processed surfaces thereof face down are placed at a first pitch and conveying the plurality of workpieces to a process machine, said method comprising the steps of:

simultaneously picking up a plurality of workpieces from the storage means, while maintaining the workpieces at the first pitch and with the non-processed surfaces facing down, and conveying the workpieces in a first convey step;

simultaneously receiving the plurality of non-processed workpieces conveyed int he first convey step, and converting the first pitch between the workpieces into a second pitch in a first pitch conversion step;

simultaneously receiving the plurality of non-processed workpieces, the pitch of which has been converted into the second pitch in the first pitch conversion step, and simultaneously inverting the workpieces in a first inverse step so as to turn the non-processed surfaces of the workpieces upward; and simultaneously receiving the plurality of non-processed works inverted in the first inverse step, and conveying the workpieces to the process machine in a second convey step.

8. The method according to claim 7, further comprising the steps of:

after the process machine has processed the plurality of workpieces, simultaneously conveying the processed workpieces in a third convey step while maintaining the second pitch;

simultaneously receiving the plurality of processed workpieces conveyed in the third convey step, and inverting the workpieces in a second inverse step so as to turn the processed surfaces of the workpieces upward; and simultaneously conveying the plurality of processed workpieces inverted in the second inverse step in a fourth convey step to the storage means.

9. The method according to claim 8, wherein the fourth convey step includes:

a pitch conversion substep of simultaneously receiving the plurality of workpieces inverted in the second inverse step, and converting the second pitch between the workpieces into the first pitch; and a convey substep of simultaneously conveying the plurality of workpieces, the second pitch of which has been converted into the first pitch in the pitch conversion substep, to the storage means.

10. The method according to claim 9, wherein an operation for receiving the plurality of non-processed workpieces in the second convey step, and an operation for receiving the plurality of processed workpieces in the second inverse step are executed parallel to each other, and an operation for receiving the plurality of non-processed workpieces in the first pitch conversion step, and an operation for receiving the plurality of process workpieces in the convey substep are executed parallel to each other.

11. A work convey method for picking up a plurality of workpieces from a storage means in which a plurality of non-processed workpieces with non-processed surfaces thereof face down are placed at a first pitch and conveying the plurality of workpieces to a process machine, comprising:

simultaneously picking up a plurality of workpieces from the storage means, while maintaining the workpieces at the first pitch and with the non-processed surface facing down, and conveying the workpieces in a first convey step;

simultaneously receiving the plurality of non-processed workpieces conveyed in the first convey step, and simultaneously inverting the workpieces in a first inverse step so the non-processed surfaces of the workpieces face up;

simultaneously receiving the plurality of non-processed workpieces inverted in the first inverse step, converting the first pitch between the workpieces into a second pitch, and converting the first position of the workpieces into a second position corresponding to a process operation of the process machine in a first pitch-position conversion step; and simultaneously receiving the plurality of non-processed workpieces, the first pitch of which has been converted into the second pitch and the first position of which has been converted into the second position, in the first pitch-position conversion step, and conveying the workpieces to the process machine in a second convey step.

12. The method according to claim 11, further comprising the steps of:

after the process machine has processed the plurality of workpieces, simultaneously conveying the processed workpieces in a third convey step while maintaining the second pitch;

simultaneously receiving the plurality of processed workpieces conveyed in the third convey step, converting the second pitch between the workpieces into the first pitch, and converting the second position of the workpieces into the first position in a second pitch-position conversion step; and simultaneously conveying the plurality of processed workpieces in a fourth convey step, the second pitch of which has been converted into the first pitch and the second position of which has been converted into the first position in the second pitch-position conversion step, to the storage means.

13. The method according to claim 11, wherein the workpieces are top plate members incorporated into an ink jet head unit of an ink jet printer for printing by boiling and discharging ink, each top plate member has a main portion and a plate portion which extends from the main portion and which is to be processed by the process machine, wherein the top plate members are stored in the storage means in a state where the plate portions are face down, and further wherein after the top plate members have been inverted and set into the first portion in which the plate portions face up in the first reverse step, the first position is converted into the second position so that only the plate portions can receive process energy from the process machine in the first pitch-position conversion step.

14. A work convey method for picking up a plurality of workpieces from a storage means in which a plurality of non-processed workpieces with non-processed surfaces thereof face down are placed at a first pitch and conveying the plurality of workpieces to a process machine, comprising:

simultaneously picking up a plurality of workpieces from the storage means, while maintaining the workpieces at the first pitch and with the non-processed surfaces facing down, and conveying the workpieces in a first convey step;

simultaneously receiving the plurality of non-processed workpieces conveyed in the first convey step, and converting the first pitch between the workpieces into a second pitch in a first pitch conversion step;

simultaneously receiving the plurality of non-processed workpieces, the first pitch of which has been converted to the second pitch in the first pitch conversion step, and simultaneously setting the workpieces into a first position corresponding to a process operation by the process machine in a first position conversion step; and simultaneously receiving the plurality of non-processed workpieces in the first position set in the first position conversion step, and conveying the workpieces to the process machine in a second position conversion step.

15. The method according to claim 14, which further comprises the steps of:

after the process machine has processed the workpieces, simultaneously conveying the processed workpieces in a third convey step while maintaining the second pitch;

simultaneously receiving the plurality of processed workpieces conveyed in the third convey step, and converting the first position of the workpieces into a second position corresponding to a setting operation by the storage means in a second position conversion step; and simultaneously conveying the workpieces in a fourth convey step, the first position of which has been converted into the second position in the second position conversion step, to the storage means.

16. The method according to claim 15, wherein the fourth convey step includes:

a pitch conversion substep of simultaneously receiving the plurality of workpieces, the first position of which has been converted into the second position in the second position conversion step, and converting the second pitch between the workpieces into the first pitch; and a convey substep of simultaneously conveying the plurality of workpieces, the second pitch of which has been converted into the first pitch in the pitch conversion substep, to the storage means.

17. The method according to claim 16, wherein an operation for receiving the plurality of non-processed workpieces in the second convey step and an operation for receiving the plurality of processed workpieces in the second pitch-position conversion step are executed parallel to each other, and an operation for receiving the plurality of non-processed workpieces in the first pitch-position conversion step and an operation for receiving the plurality of processed workpieces in the inverse substep are executed parallel to each other.

* * * * *

UNITED STATES PATENT AND TRADEMARK OFFICE
CERTIFICATE OF CORRECTION

PATENT NO. : 5,293,179

DATED : March 8, 1994

INVENTOR(S) : Ichikawa et al.

It is certified that error appears in the above-indentified patent and that said Letters Patent is hereby corrected as shown below: Title page:

Item:
[56] REFERENCES CITED:

FOREIGN PATENT DOCUMENTS, "2-15615  8/1990  Japan" should read --2-215615  8/1990  Japan--.

[75] INVENTOR: (Title Page)

"Tsuyoshi Orikawa," should read --Tsuyoshi Orikasa,--.

Drawings:

SHEET 22:

FIG. 14B, "SECOND SYLINDER" should read --SECOND CYLINDER--.

SHEET 24:

FIG. 14D, "DIRVE" SIGNAL" should read --DRIVE SIGNAL--.

COLUMN 12:

Line 41, "of slide" should read --of the movable blocks $212_1$ and $212_2$ (the two unillustrated slide--.

Line 54, "shafts 2111 to 2114" should read --shafts $211_1$ to $211_4$--.

COLUMN 18:

Line 43, "to 7214," should read --to $721_4$,--.

UNITED STATES PATENT AND TRADEMARK OFFICE
CERTIFICATE OF CORRECTION

PATENT NO. : 5,293,179

DATED : March 8, 1994

INVENTOR(S) : Ichikawa et al.

It is certified that error appears in the above-indentified patent and that said Letters Patent is hereby corrected as shown below:

COLUMN 22:

Line 43, "70.5 pm" should read --70.5 $\mu$m--.

COLUMN 24:

Line 8, "conveyor 10" should read --conveyor 140--.

COLUMN 30:

Line 54, "plates 103 and 104" should read --plates $10_3$ and $10_4$--.

COLUMN 31:

Line 55, "rotation" should read --rotation state to the forward rotation state (step S38).--.

COLUMN 32:

Line 7, "jigs 4543 and 4544" should read --jigs $454_3$ and $454_4$--.

UNITED STATES PATENT AND TRADEMARK OFFICE
CERTIFICATE OF CORRECTION

PATENT NO. : 5,293,179
DATED : March 8, 1994
INVENTOR(S) : Ichikawa et al.

It is certified that error appears in the above-indentified patent and that said Letters Patent is hereby corrected as shown below:

COLUMN 38:

Line 9, "the processed" should read --the process--.
Line 36, "int he" should read --in the--.

Signed and Sealed this

Thirteenth Day of December, 1994

Attest:

BRUCE LEHMAN

Attesting Officer

Commissioner of Patents and Trademarks